US007419230B2

United States Patent
Tatsuta et al.

(10) Patent No.: US 7,419,230 B2
(45) Date of Patent: Sep. 2, 2008

(54) TEST CHART GEOMETRICAL CHARACTERISTIC ANALYSIS SYSTEM GEOMETRICAL CHARACTERISTIC ANALYSIS METHOD PRINTER AND INK-JET PRINTER

(75) Inventors: Seiji Tatsuta, Hachioji (JP); Toshiyuki Ebihara, Hino (JP); Yasuhiro Komiya, Hino (JP); Ken Ioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 103 days.

(21) Appl. No.: 10/509,485

(22) PCT Filed: Mar. 27, 2003

(86) PCT No.: PCT/JP03/03848

§ 371 (c)(1),
(2), (4) Date: Mar. 23, 2005

(87) PCT Pub. No.: WO03/082587

PCT Pub. Date: Oct. 9, 2003

(65) Prior Publication Data

US 2005/0179710 A1 Aug. 18, 2005

(30) Foreign Application Priority Data

Mar. 29, 2002 (JP) .............................. 2002-097419

(51) Int. Cl.
*B41J 29/46* (2006.01)
(52) U.S. Cl. .............................. 347/5; 347/104; 347/19; 347/13; 358/1.9; 358/501; 382/100; 382/194

(58) Field of Classification Search ................. 382/123, 382/194
See application file for complete search history.

(56) References Cited

U.S. PATENT DOCUMENTS

| 4,590,482 | A |   | 5/1986  | Hay et al.      |         |
|-----------|---|---|---------|-----------------|---------|
| 4,675,696 | A | * | 6/1987  | Suzuki          | 346/46  |
| 4,745,467 | A | * | 5/1988  | Sekizawa et al. | 358/523 |
| 4,805,123 | A | * | 2/1989  | Specht et al.   | 382/144 |
| 4,878,063 | A | * | 10/1989 | Katerberg       | 347/19  |

(Continued)

FOREIGN PATENT DOCUMENTS

EP          0 869 007 A2       10/1998

(Continued)

*Primary Examiner*—Matthew Luu
*Assistant Examiner*—John P Zimmermann
(74) *Attorney, Agent, or Firm*—Frishauf, Holtz, Goodman & Chick, P.C.

(57) ABSTRACT

A format storage unit stores a predetermined geometric property format. A chart data creating unit creates chart data based upon the geometric property format, and a printing unit creates a test chart by printing mark groups on a recording medium such as a paper sheet based upon the chart data. An image pickup unit outputs a chart image by scanning the test chart, and a mark center calculating unit calculates the center of each mark based upon the chart image. A fitting unit performs a fitting calculation comparing calculation results output from the mark center calculating unit and the chart based upon the geometric property format such that the squared difference therebetween becomes minimum for each mark position.

34 Claims, 29 Drawing Sheets

U.S. PATENT DOCUMENTS

| | | | |
|---|---|---|---|
| 4,982,439 A * | 1/1991 | Castelaz | 382/194 |
| 5,481,378 A * | 1/1996 | Sugano et al. | 358/501 |
| 5,655,031 A * | 8/1997 | Yukawa et al. | 382/194 |
| 5,715,498 A | 2/1998 | Takeuchi et al. | |
| 5,717,446 A * | 2/1998 | Teumer et al. | 347/35 |
| 5,748,330 A | 5/1998 | Wang et al. | |
| 5,831,658 A | 11/1998 | Iga et al. | |
| 5,848,197 A * | 12/1998 | Ebihara | 382/275 |
| 5,860,679 A * | 1/1999 | Fukuda et al. | 283/70 |
| 5,866,895 A * | 2/1999 | Fukuda et al. | 235/494 |
| 5,992,994 A * | 11/1999 | Rasmussen et al. | 347/104 |
| 6,023,537 A * | 2/2000 | Wada et al. | 382/312 |
| 6,048,045 A | 4/2000 | Nohata et al. | |
| 6,050,731 A | 4/2000 | Matsui | 400/74 |
| 6,092,939 A | 7/2000 | Nishikori et al. | |
| 6,113,231 A | 9/2000 | Burr et al. | |
| 6,121,993 A * | 9/2000 | Maekawara et al. | 347/236 |
| 6,131,807 A * | 10/2000 | Fukuda et al. | 235/494 |
| 6,168,261 B1 | 1/2001 | Miyake et al. | |
| 6,174,039 B1 | 1/2001 | Miyake et al. | |
| 6,196,675 B1 | 3/2001 | Deily et al. | |
| 6,213,580 B1 | 4/2001 | Segerstrom et al. | |
| 6,282,319 B1 * | 8/2001 | Tatsuta | 382/232 |
| 6,307,579 B1 * | 10/2001 | Kida | 347/133 |
| 6,364,209 B1 * | 4/2002 | Tatsuta et al. | 235/494 |
| 6,446,866 B1 * | 9/2002 | Tatsuta | 235/454 |
| 6,497,522 B2 * | 12/2002 | Wotton et al. | 400/578 |
| 6,538,705 B1 * | 3/2003 | Higurashi et al. | 348/745 |
| 6,558,006 B2 * | 5/2003 | Ioka | 353/94 |
| 6,633,526 B1 * | 10/2003 | Imade et al. | 369/59.1 |
| 6,707,579 B1 * | 3/2004 | Komiya et al. | 358/3.1 |
| 6,771,842 B1 * | 8/2004 | Sakai et al. | 382/290 |
| 6,789,872 B2 * | 9/2004 | Ioka et al. | 347/19 |
| 6,814,448 B2 * | 11/2004 | Ioka | 353/69 |
| 6,843,610 B2 * | 1/2005 | Ioka et al. | 400/76 |
| 6,871,931 B2 * | 3/2005 | Kaneko | 347/19 |
| 6,883,893 B2 * | 4/2005 | Ioka | 347/19 |
| 6,952,484 B1 * | 10/2005 | Higginbottom et al. | 382/100 |
| 7,003,241 B1 * | 2/2006 | Kobayashi et al. | 399/72 |
| 7,038,811 B1 * | 5/2006 | Haikin | 358/1.9 |
| 7,064,865 B2 * | 6/2006 | Ishikawa | 358/1.9 |
| 7,075,678 B2 * | 7/2006 | Ohkubo | 358/1.9 |
| 7,114,792 B2 * | 10/2006 | Kawauchi et al. | 347/19 |
| 2002/0021325 A1 | 2/2002 | Koitabashi et al. | |
| 2003/0113034 A1 * | 6/2003 | Komiya et al. | 382/284 |
| 2004/0041863 A1 * | 3/2004 | Ioka et al. | 347/10 |
| 2004/0150861 A1 * | 8/2004 | Van Der Heijden | 358/406 |
| 2004/0263603 A1 * | 12/2004 | Maki et al. | 347/104 |
| 2005/0024420 A1 * | 2/2005 | Ebihara | 347/19 |
| 2005/0036687 A1 * | 2/2005 | Ishiguro | 382/194 |
| 2005/0094170 A1 * | 5/2005 | Ichitani | 358/1.9 |
| 2006/0214960 A1 * | 9/2006 | Chiwata | 347/10 |

FOREIGN PATENT DOCUMENTS

| | | |
|---|---|---|
| EP | 0 918 432 A2 | 5/1999 |
| EP | 0 938 973 A2 | 9/1999 |
| EP | 0 938 974 A2 | 9/1999 |
| EP | 0 938 975 A2 | 9/1999 |
| EP | 0 988 990 A2 | 3/2000 |
| JP | 06-079956 A | 3/1994 |
| JP | 06-261156 A | 9/1994 |
| JP | 07-040531 A | 2/1995 |
| JP | 08-085236 A | 4/1996 |
| JP | 09-326902 A | 12/1997 |
| JP | 10-006488 A | 1/1998 |
| JP | 10-278311 A | 10/1998 |
| JP | 10-329381 A | 12/1998 |
| JP | 11-164081 A | 6/1999 |
| JP | 11-277734 A | 10/1999 |
| JP | 11-320865 A | 11/1999 |
| JP | 11-334057 A | 12/1999 |
| JP | 2000-094655 A | 4/2000 |
| JP | 2001-099711 A | 4/2001 |
| JP | 2001-113805 A | 4/2001 |
| JP | 2001-138594 A | 5/2001 |
| JP | 2001-265084 A | 9/2001 |
| JP | 2001-315389 A | 11/2001 |
| JP | 2001-325598 A | 11/2001 |
| JP | 2002-019101 A | 1/2002 |
| JP | 2002-040746 A | 2/2002 |
| JP | 2002-079657 A | 3/2002 |
| JP | 2002-096462 A | 4/2002 |
| JP | 2002-144542 A | 5/2002 |
| JP | 2002-292859 A | 10/2002 |
| JP | 2002-307666 A | 10/2002 |
| TW | 272270 | 3/1996 |
| TW | 330267 | 4/1998 |

* cited by examiner

(A)

(B)

(C)

- ⊗ MARKS PRINTED BY HEAD 20
- ⊘ MARKS PRINTED BY HEAD 21
- ⌀ MARKS PRINTED BY HEAD 23
- ○ MARKS PRINTED BY HEAD 24

⊗ MARKS PRINTED BY HEAD 20

⊗ MARKS PRINTED BY HEAD 20

⊗ MARKS PRINTED BY HEAD 20
⊘ MARKS PRINTED BY HEAD 21

⊗ MARKS M0-0 PRINTED BY HEAD 20a
⊘ MARKS M0-1 PRINTED BY HEAD 21a
⊘ MARKS M1-0 PRINTED BY HEAD 20b
○ MARKS M1-1 PRINTED BY HEAD 21b (A) IRREGULARITIES IN RECORDING POSITION WITH MARK RECORDED BY HEAD 20a AS REFERENCE (B) IRREGULARITIES IN RECORDING POSITION WITH MARK RECORDED BY HEAD 20b AS REFERENCE

D=3

D=4

D=5

⊗ MARKS M0-0 PRINTED BY HEAD 20a
⊚ MARKS M0-1 PRINTED BY HEAD 21a
⊘ MARKS M1-0 PRINTED BY HEAD 20b
○ MARKS M1-1 PRINTED BY HEAD 21b

⊗ MARKS PRINTED BY HEAD 20

4×4 MASK

6×6 MASK

INTERFERENCE (A)           (B)

⊗ DOTS PRINTED BY HEAD 20
⊚ DOTS PRINTED BY HEAD 21

(A)

(B)

TEST CHART GEOMETRICAL CHARACTERISTIC ANALYSIS SYSTEM GEOMETRICAL CHARACTERISTIC ANALYSIS METHOD PRINTER AND INK-JET PRINTER

This application is a U.S. National Phase Application under 35 USC 371 of International Application PCT/JP03/03848 filed Mar. 27, 2003.

TECHNICAL FIELD

The present invention relates to: a test chart; a geometric property analysis system and a geometric property analysis method for analyzing geometric properties of at least one of a recording device, a recording medium, and an image pickup apparatus, using the test chart; and a printer and an ink jet printer having a function for analyzing the geometric properties using the geometric property analysis system and the geometric property analysis method.

BACKGROUND ART

When an image which has been recorded in a digital format is recorded onto a recording medium such as a paper sheet and film, or conversely when an image which has been recorded on a recording medium is picked up by an image pickup apparatus such as scanner or the like, the quality of those images are greatly affected by recording properties of the recording device, the medium properties of the recording medium, or the image pickup properties of the image pickup apparatus.

In particular, with the recording devices and the image pickup apparatuses employing plural recording units (e.g., heads) or plural image pickup units (e.g., CCDS) having a smaller area than the area of the recording area on the recording medium, recording of an image on a recording medium or image picking up is performed while relatively moving these units with respect to the recording medium, thus leading to a problem of the image quality by being greatly affected by geometric properties such as the positional relation between the plural recording units or between the plural image pickup units; the mechanical error during movement of these units; and so forth.

For example, with a color ink jet printer serving as a recording device including plural heads corresponding to various color inks, even slight deviation of the head position leads to failure in superimposition of dots in various colors in printing, leading to color shift, resulting in markedly deterioration in printing quality.

Accordingly, a technique as disclosed in Japanese Unexamined Patent Application Publication No. 10-278311 is known wherein a test pattern (chart) which allows the operator to easily detect color shift is printed, following which the operator checks the printed test pattern through visual monitoring and selects a pattern which exhibits the minimum color shift so as to estimate printing properties corresponding to the geometric properties of the printing device, thereby enabling image processing for correcting color shift described above.

Also, a technique as disclosed in Japanese Unexamined Patent Application Publication No. 7-40531 is known wherein two recording heads having low resolution are arrayed and fixed one to another such that the nozzles thereof are positioned so as to complement one another, thereby achieving approximately two times resolution. With such an ink jet head assembly, the heads must be mounted while precisely measuring the positional relation therebetween. In conventional techniques, the positional relation between the heads is directly measured by mechanical measurement, or the dots or lines printed by these nozzles are measured through a microscope so as to obtain the positional relation between the heads.

However, such a method wherein the operator checks the test chart for detecting deviation requires skill of the operator to a certain degree, and adjustment even by a skilled operator has the disadvantage of depending upon the intuition of the operator.

Furthermore, mechanical measurement of the head positions described above requires a precise mechanism, leading to high costs of installation of the measurement device, and high costs of maintenance after installation thereof, as well as high manufacturing costs due to the measurement, and leading to a problem of extra space for installation of the measurement device.

Furthermore, even if the most precise positioning of the heads is performed, the positional relation between the nozzles does not exactly coincide with the positional relation between the dot impact positions in printing at all times.

Furthermore, measurement of the dots or the lines through a microscope has the disadvantage of a narrow field of view of the endoscope, time consuming measurement, and a great deal of processing amount corresponding to the data amount taken by the measurement. In order to solve these problems, a relatively small number of the dots and lines should be measured. However, this leads to a new problem of deterioration in high-precision measurement due to substandard dot fixing, blot, irregularities in the dot impact position, or the like.

The present invention has been made in order to solve the aforementioned problems, and accordingly, it is an object thereof to provide a test chart, a geometric property analysis system, a geometric property analysis method, a printer, an ink-jet printer, which allow the operator to perform high-precision analysis of geometric properties of at least one of a recording device, a recording medium, and an image pickup apparatus, with a simple and precise procedure.

DISCLOSURE OF INVENTION

A test chart according to a first invention used for analyzing geometric properties regarding at least one of a recording device, a recording medium, and an image pickup apparatus, comprises: a recording medium having a recording face; and plural marks arrayed and recorded on the recording face of the recording medium based upon a predetermined geometric property format in a layout structure which allows measurement of a predetermined position of each mark through image processing, and at a pitch which allows discrimination between each mark and the other marks through image processing.

With a test chart according to a second invention, the predetermined geometric property format according to the first invention is designed giving consideration to the geometric properties which are to be analyzed.

With a test chart according to a third invention, the number of the marks regulated based upon the predetermined geometric property format according to the second invention is determined based upon the precision of the recording positions of the marks and the required precision of the geometric properties which are to be analyzed.

With a test chart according to a fourth invention, the predetermined geometric property format according to the third invention is designed such that more marks are arrayed in the direction along which recording is made with low positional precision in a case wherein the recording positional precision is dependent upon the recording direction.

With a test chart according to a fifth invention, the plural marks according to the first invention are arrayed on the recording face at the same intervals along at least one direction.

With a test chart according to a sixth invention, the same number of marks according to the first invention are arrayed on the recording face along at least one direction.

With a test chart according to a seventh invention, each mark according to the first invention is formed of a single dot, or plural dots arrayed adjacent one to another so as to form a predetermined shape.

With a test chart according to an eighth invention, the test chart according to the first invention comprises plural chart components with each chart component formed of the plural marks recorded on the recording face of the recording medium according to the independent geometric property format.

With a test chart according to a ninth invention, the plural marks according to the eighth invention are recorded by plural recording means with each chart component being constituted by the corresponding recording means.

With a test chart according to a tenth invention, the marks according to the eighth invention are recorded in a different form corresponding to the chart component.

With a test chart according to an eleventh invention, the recording regions of the chart components arrayed one to another according to the eighth invention form therebetween at least one overlapped region on the recording face of the recording medium.

With a test chart according to a twelfth invention, the recording regions of the chart components arrayed one to another which form therebetween at least one overlapped region according to the eleventh invention are formed of the marks in the same color.

With a test chart according to a thirteenth invention, the recording regions of the chart components arrayed one to another which form therebetween at least one overlapped region according to the eleventh invention are formed of the marks in different colors.

With a test chart according to a fourteenth invention, the same number of marks according to the eighth invention are recorded along a predetermined direction for each chart component, which allows analysis while canceling out unintended deviation of the recording positions of the plural marks which are to be arrayed with uniformity along the direction orthogonal to the predetermined direction.

With a test chart according to a fifteenth invention, the plural marks according to the first invention are arrayed with a predetermined average mark density so as to analyze the geometric properties without interference between the marks.

With a test chart according to a sixteenth invention, the marks according to the fifteenth invention are recorded with the predetermined mark density of one mark recording per area where four marks can be recorded up to one mark recording per area where fifty marks can be recorded.

With a test chart according to a seventeenth invention, the marks according to the fifteenth invention are recorded with the predetermined mark density of one mark recording per area where ten marks can be recorded up to one mark recording per area where twenty marks can be recorded.

With a test chart according to an eighteenth invention, in a case that the susceptibility of the adjacent marks to interference therebetween exhibits directional dependence, the marks according to the first invention are arrayed at a smaller pitch along the direction orthogonal to the direction along which the adjacent marks exhibit maximum susceptibility to interference therebetween than the pitch of the adjacent marks along the direction along which the adjacent marks exhibit the maximum susceptibility to interference therebetween.

With a test chart according to a nineteenth invention, the plural marks according to the first invention are recorded based upon at least two kinds of the geometric property formats so as to analyze the geometric properties while preventing unintended interference between the marks.

With a test chart according to a twentieth invention, the geometric property format according to the first invention is designed so as to analyze the geometric properties while preventing unintended interference between the marks.

With a test chart according to a twenty-first invention, the test chart according to the first invention is used for detecting the marks with the test chart further including reference marks recorded in a different form from the aforementioned marks.

With a test chart according to a twenty-second invention, at least three reference marks according to the twenty-first invention are provided so as not to be arrayed on a single line.

With a test chart according to a twenty-third invention, the test chart according to the first invention is further comprises: a bar recorded with uniformity by plural dots in the shape of a belt for detecting substandard printing by the recording means for recording the plural marks.

A geometric property analyzing system according to a twenty-fourth invention for analyzing geometric properties regarding at least one of a recording device, a recording medium, and an image pickup apparatus, using the test chart according to the first invention, comprises: format storage means for storing the geometric property format; image pickup means for optically reading the test chart and creating a chart image; and analyzing means for determining at least one of a reference point and a unit vector for determining the predetermined positions of the respective plural marks in the chart image such that the difference becomes minimum between the predetermined positions of the plural marks in the chart image created by the image pickup means and the predetermined positions of the plural marks regulated based upon the geometric property format stored in the format storage means.

With a geometric property analyzing system according to a twenty-fifth invention, the analyzing means according to the twenty-fourth invention calculates the center position of each mark as the aforementioned predetermined position, and determine at least one of the reference point and the unit vector in the chart image such that the sum of squares of the differences becomes minimum between the center positions of the plural marks in the chart image and the center positions of the plural marks regulated based upon the aforementioned geometric property format.

With a geometric property analyzing system according to a twenty-sixth invention, the analyzing means according to the twenty-fourth invention divides the test chart into, plural chart components so as to perform analysis for each chart component.

With a geometric property analyzing system according to a twenty-seventh invention, the number of marks included in the chart component according to the twenty-sixth invention is determined based upon the precision of detecting the position of the mark and the required precision of the geometric properties which are to be analyzed.

With a geometric property analyzing system according to a twenty-eighth invention, the chart component according to the twenty-sixth invention is designed based upon the geometric properties which are to be analyzed and the required precision of the geometric properties.

With a geometric property analyzing system according to a twenty-ninth invention, the analyzing means according to the twenty-fourth invention divides the test chart into plural chart components so as to perform relative comparison between the geometric properties of each chart component and the geometric properties of the other chart component serving as a reference, thereby enabling analysis of the geometric properties of each chart component.

With a geometric property analyzing system according to a thirtieth invention, the geometric property analyzing system according to the twenty-fourth invention further comprises at least one recording means for recording the plural marks on the recording face of the recording medium.

With a geometric property analyzing system according to a thirty-first invention, the geometric property analyzing system according to the thirtieth invention includes the plural recording means, with the analyzing means dividing the plural marks into the chart components corresponding to the recording means for recording the marks, and determine at least one of the reference point and unit vector for each chart component thus divided.

With a geometric property analyzing system according to a thirty-second invention, each of the plural recording means according to the thirty-first invention records the marks in different forms, with the analyzing means grouping the marks based upon the form thereof, and forming a chart component for each group.

With a geometric property analyzing system according to a thirty-third invention, the geometric property format according to the thirtieth invention is reconstructed based upon the analysis results analyzed by the analyzing means so as to perform recording on the recording face of the recording medium by the recording means.

With a geometric property analyzing system according to a thirty-fourth invention, the geometric properties of the recording means according to the thirtieth invention are adjusted based upon the analysis results analyzed by the analyzing means.

With a geometric property analyzing system according to a thirty-fifth invention, adjustment of the geometric properties of the recording means according to the thirty-fourth invention is made in order of skew adjustment density adjustment and timing adjustment.

With a geometric property analyzing system according to a thirty-sixth invention, the geometric property analyzing system according to the thirtieth invention further comprises transporting means for transporting the recording medium relative to the recording means, with the image pickup means disposed on the downstream side of the recording means in the transporting direction determined by the transporting means, and formed of a line sensor for optically reading out the test chart formed of the plural marks recorded by the recording means.

With a geometric property analyzing system according to a thirty-seventh invention, the recording means according to the thirtieth invention comprises an ink-jet head for recording the plural marks on the recording medium by discharging ink.

With a geometric property analyzing system according to a thirty-eighth invention, the image pickup means according to the thirtieth invention is formed such that image pickup resolution of the image pickup means is higher than the recording resolution of the recording means.

With a geometric property analyzing system according to a thirty-ninth invention, the analyzing means according to the thirtieth invention is formed as a separate unit from the recording means and the image pickup means.

With a geometric property analyzing system according to a fortieth invention, the format storage means according to the thirtieth invention is integrally held by the recording means, for storing the geometric property format suitable for the recording means which integrally holds the format storage means.

With a geometric property analyzing system according to a forty-first invention, the transporting belt for relatively transporting the recording medium with respect to the image pickup means according to the twenty-fourth invention is used as another recording medium, with the belt face of the transporting belt serving as the recording face, and with plural marks recorded on the belt face so as to form a test chart on the belt face.

With a geometric property analyzing system according to a forty-second invention, plural openings formed on the belt face of the transporting belt serve as the plural marks according to the forty-first invention, with suctioning means being further provided for having the recording medium stuck to the belt face by air suctioning through the plural openings.

With a geometric property analyzing system according to a forty-third invention, the geometric property format according to the twenty-fourth invention is designed giving consideration to the image size handled by the geometric property analyzing system.

With a geometric property analyzing system according to a forty-fourth invention, the image pickup means according to the twenty-fourth invention analyzes the geometric properties based upon the geometric property format using a reference chart serving as a reference test chart in which the plural marks have been recorded with higher recording precision than the required analysis precision.

With a geometric property analyzing system according to a forty-fifth invention, the geometric property analyzing system according to the forty-fourth invention further comprises at least one recording means for recording the plural marks on the recording face of the recording medium, with the geometric properties of the image pickup means being analyzed prior to analysis of the geometric properties of the recording means, and with the reference chart recorded with higher recording precision than the recording precision of the recording means.

A printer according to a forty-sixth invention employs the geometric property analyzing system according to the thirtieth invention.

An ink-jet printer according to a forty-seventh invention employs the geometric property analyzing system according to the thirty-seventh invention.

A geometric property analyzing method according to a forty-eighth invention for analyzing the geometric properties regarding at least one of a recording device, a recording medium, and an image pickup apparatus, using the test chart according to claim 1, comprises: a format storing step for storing the geometric property format; an image picking-up step for optically reading out the test chart and creating a chart image; and an analyzing step for determining at least one of the reference point and the unit vector for determining the predetermined positions of the plural marks in the chart image such that the difference becomes minimum between the predetermined positions of the plural marks in the chart image formed in the image picking-up step and the predetermined positions of the plural marks regulated based upon the geometric property format stored in the format storing step.

With a geometric property analyzing method according to a forty-ninth invention, the plural marks according to the forty-eighth invention are recorded based upon at least two kinds of the geometric property formats by which interference which can be occurred between the marks during analysis of the geometric properties can be prevented in advance.

With a geometric property analyzing method according to a fiftieth invention, in the analyzing step according to the forty-eighth invention, the aforementioned test chart is divided into plural chart components, and relative comparison is made between the geometric properties of each chart component and the geometric properties of the chart component serving as a reference, thereby enabling analysis of the geometric properties of each chart component.

With a geometric property analyzing method according to a fifty-first invention, the geometric property analyzing method according to the forty-eighth invention further includes a recording step wherein at least one recording means records the plural marks on the recording face of the recording medium.

With a geometric property analyzing method according to a fifty-second invention, the geometric properties of the recording means according to the fifty-first invention are adjusted based upon the analysis results obtained in the aforementioned analyzing step.

With a geometric property analyzing method according to a fifty-third invention, adjustment of the geometric properties of the recording means according to the fifty-second invention is made in order of: skew adjustment; density adjustment; and timing adjustment.

A printer according to the fifty-fourth invention has a function for analyzing the geometric properties using the geometric property analyzing method according to the forty-eighth invention.

An ink-jet printer according to the fifty-fifth invention has a function for analyzing the geometric properties using the geometric property analyzing method according to the forty-eighth invention.

BEST MODE FOR CARRYING OUT THE INVENTION

Before detailed description of embodiments, description will be made regarding a mechanism used in the embodiments described later, i.e., means for analyzing geometric property (deviation) by fitting a predetermined geometric property format to the chart image obtained by picking up a test chart created based upon the geometric property format.

Figure 1:
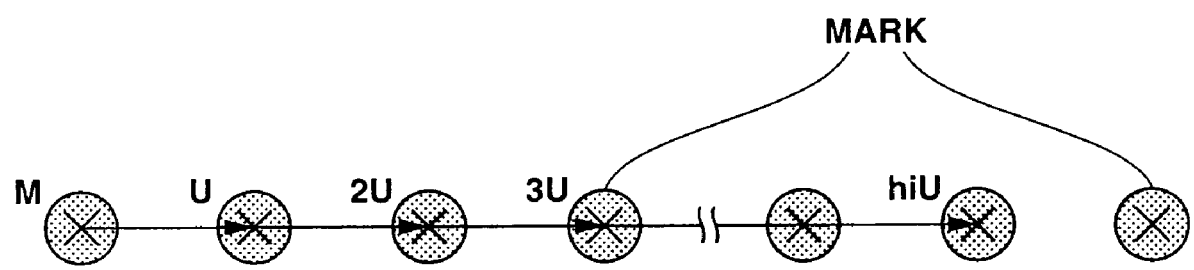
FIG. 1 is a diagram which shows chart data formed of marks arrayed in the one-dimensional direction, regarding a mechanism according to embodiments of the present invention.
Figure 2:
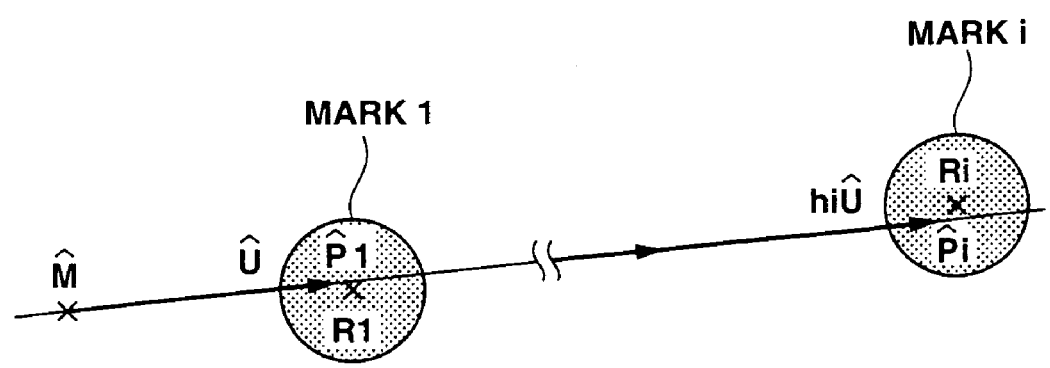
FIG. 2 is a diagram which shows the positional relation between: a reference point and a unit vector; and each mark, in a chart image obtained by scanning a test chart, regarding the mechanism according to the embodiment.
Figure 3:
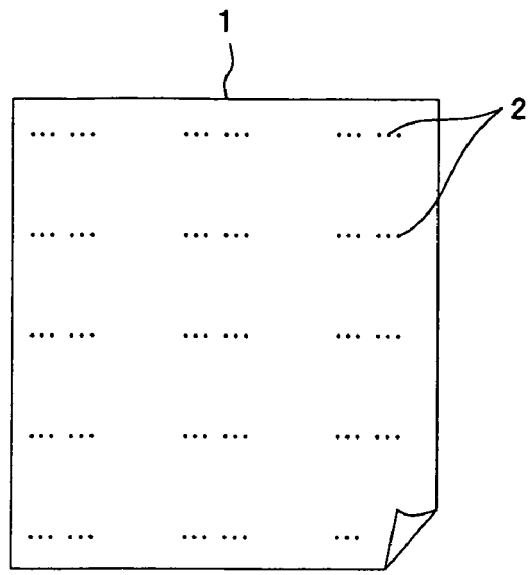
FIG. 3 is a diagram which shows a recording medium on which plural mark groups are formed, regarding the mechanism according to the embodiment.

First, description will be made regarding an example wherein plural marks are arrayed in the one-dimensional direction, with reference to FIG. 1 through FIG. 3. FIG. 1 is a diagram which shows chart data formed of plural marks arrayed in the one-dimensional direction, FIG. 2 is a diagram which shows the positional relation between: the reference point and the unit vector; and each mark, in a chart image of the test chart obtained through image pickup, and FIG. 3 is a diagram which shows a recording medium on which plural mark groups are formed.

The position Pi of the i-numbered mark of the plural individual marks is represented by the following Expression 1 using the reference point (position vector thereof) M and the unit vector U.

$$P_i = M + h_i U \qquad \text{[Expression 1]}$$

Chart data formed of image data is formed as shown in FIG. 1 based upon the geometric property format represented by the Expression 1.

Here, hi represents a scalar defined in the real-number space with the discrete number i as a parameter, and in particular, FIG. 1 shows a case wherein hi equals to i, i.e., a case wherein the marks are arrayed at the same interval on the chart data.

The chart data is recorded on a recording medium using a recording device, whereby a test chart is formed. Furthermore, the image of test chart is picked up with an image pickup apparatus, whereby the chart image is obtained as shown in FIG. 2, for example. Deviation of the chart image occurs from the original chart data due to the geometric properties of the recording device, the geometric properties of the recording medium, and the geometric properties of the image pickup apparatus.

Accordingly, as shown in FIG. 2, the initial reference point M(hat) (m(hat)x, m(hat)y) (the reference symbol "^" over another reference character will be referred to as "hat" hereafter, and each suffix is denoted by a lowercase letter) and the initial unit vector U(hat) (u(hat)x, u(hat)y), are determined. In this case, the position P(hat)i of the i-numbered mark (mark i) is obtained using the initial reference point M(hat) and the initial unit vector U(hat) based upon the geometric property format, and is represented by the following Expression 2.

$$\hat{P}_i = \hat{M} + h_i \hat{U} \quad \text{[Expression 2]}$$

Here, with the position vector of a predetermined position, particularly in this case, the center position, of the i-numbered mark obtained (measured) from the chart image as Ri(xi, yi), the error εi of the i-numbered mark obtained based upon the geometric property format from the measured position is represented by the following Expression 3.

$$\epsilon_i = |\hat{P}_i - R_i| \quad \text{[Expression 3]}$$

Accordingly, the sum of squares of the error E in each mark is represented by the following Expression (4).

$$E = \sum_i \varepsilon_i^2 = \sum_i |\hat{P}_i - R_i|^2 = \sum_i (\hat{M} + h_i \hat{U} - R_i)^2$$
$$= \sum_i \{(\hat{m}_x + h_i \hat{u}_x - x_i)^2 + (\hat{m}_y + h_i \hat{u}_y - y_i)^2\} \quad \text{[Expression 4]}$$

Here, in order to obtain the minimum E, the pair of the M(hat) and the U(hat) is obtained so as to satisfy the following Expression 5.

$$\frac{\partial E}{\partial \hat{m}_x} = 0, \ \frac{\partial E}{\partial \hat{u}_x} = 0, \ \frac{\partial E}{\partial \hat{m}_y} = 0, \ \frac{\partial E}{\partial \hat{u}_y} = 0 \quad \text{[Expression 5]}$$

As described above, E is a quadratic function of M(hat) and U(hat), and accordingly, with the total number of the marks as N (in this case, the Expression 6 holds), the following Expression 7 through Expression 10 are obtained.

$$\sum_i 1 = N \quad \text{[Expression 6]}$$

$$\frac{\partial E}{\partial \hat{m}_x} = \sum_i 2(\hat{m}_x + h_i \hat{u}_x - x_i) = 0 \quad \text{[Expression 7]}$$
$$N\hat{m}_x + \hat{u}_x \sum_i h_i = \sum_i x_i$$

$$\frac{\partial E}{\partial \hat{u}_x} = \sum_i 2(\hat{m}_x + h_i \hat{u}_x - x_i) h_i = 0 \quad \text{[Expression 8]}$$
$$\hat{m}_x \sum_i h_i + \hat{u}_x \sum_i h_i^2 = \sum_i x_i h_i$$

$$\frac{\partial E}{\partial \hat{m}_y} = \sum_i 2(\hat{m}_y + h_i \hat{u}_y - y_i) = 0 \quad \text{[Expression 9]}$$
$$N\hat{m}_y + \hat{u}_y \sum_i h_i = \sum_i y_i$$

$$\frac{\partial E}{\partial \hat{u}_y} = \sum_i 2(\hat{m}_y + h_i \hat{u}_y - y_i) h_i = 0 \quad \text{[Expression 10]}$$
$$\hat{m}_y \sum_i h_i + \hat{u}_y \sum_i h_i^2 = \sum_i y_i h_i$$

Here, the above Expression 7 through Expression 10 are represented by the following Expression 12 using Expression 11.

$$\sum_i h_i = A, \ \sum_i h_i^2 = B \quad \text{[Expression 11]}$$
$$\sum_i x_i = P_x, \ \sum_i x_i h_i = Q_x$$
$$\sum_i y_i = P_y, \ \sum_i y_i h_i = Q_y$$

$$\hat{u}_x = \frac{AP_x - NQ_x}{A^2 - NB}, \ \hat{m}_x = \frac{AQ_x - BP_x}{A^2 - NB} \quad \text{[Expression 12]}$$
$$\hat{u}_y = \frac{AP_y - NQ_y}{A^2 - NB}, \ \hat{m}_y = \frac{AQ_y - BP_y}{A^2 - NB}$$

Thus, the M(hat) and the U(hat) are calculated using the Expression 12 as the most likely reference point and unit vector in the measured chart image.

Multiple mark groups 2 are arrayed on a recording medium 1 for obtaining the most likely reference point and unit vector as shown in FIG. 3, whereby the most likely reference point and unit vector are obtained for each mark group 2 in the chart image corresponding to the layout thereof. The geometric properties of the recording device, the recording medium, or the image pickup apparatus, can be analyzed based upon the positional relation between plural pairs of the most likely reference points and unit vectors.

Note that the reference point and the unit vector can be determined to be a desired point and a desired vector in the geometric property format (note that hi must be determined corresponding to settings of the reference point and the unit vector). Accordingly, the operator can set A=0, i.e., can determine the reference point and the unit vector such that the initial reference point M(hat) is positioned at the center of gravity of the mark group. In this case, the Expression 12 is simplified as represented by the following Expression 13.

$$\hat{u}_x = \frac{Q_x}{B}, \ \hat{m}_x = \frac{P_x}{N} = \mu_x \quad \text{[Expression 13]}$$
$$\hat{u}_y = \frac{Q_y}{B}, \ \hat{m}_y = \frac{P_y}{N} = \mu_y$$

Here, (μx, μy) is the simple average of the measured center positions of the marks in a mark group, whereby the most likely reference point is the tentative reference point M(hat) which is equal to the average. Note that specific examples of the mark position group which satisfy the condition A=0 include an arrangement wherein the marks are point-symmetrically arrayed in a mark group, and the tentative reference point is determined to be the center of symmetry, for example.

Figure 4:
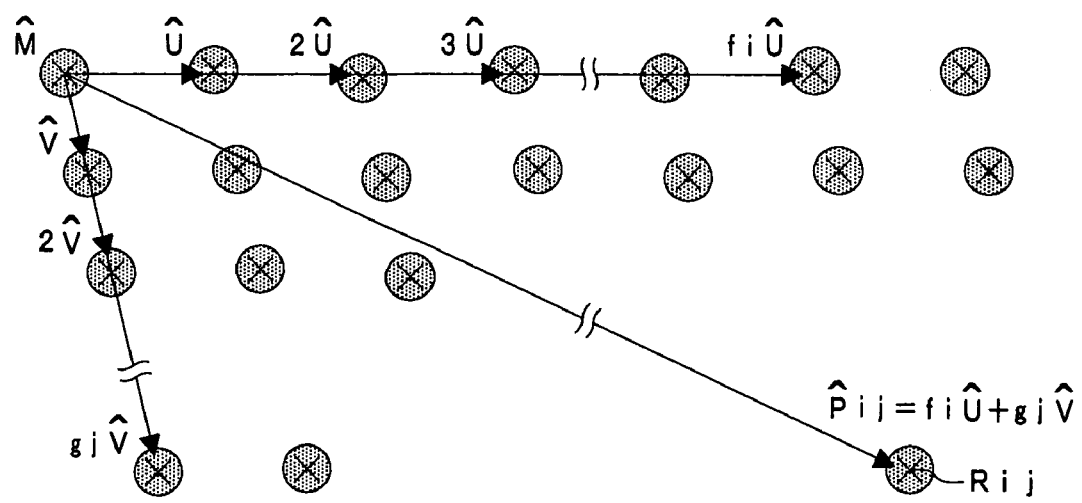
FIG. 4 is a diagram which shows the positional relation between: a reference point and unit vectors; and each mark, in a chart image obtained by scanning a test chart formed of marks two-dimensionally arrayed, regarding the mechanism according to the embodiment.

Next, description will be made regarding a two-dimensionally extended arrangement based upon the mechanism described above with reference to FIG. 4. FIG. 4 is a diagram for describing the relation between: the reference point and the unit vectors; and the marks, in a picked-up chart image of a test chart wherein the marks are two-dimensionally arrayed.

In the same way as with the one-dimensional arrangement described above, in plural individual marks, the mark position Pij which is the i-numbered position in the U direction and the j-numbered position in the V direction (which will be simply referred to as "ij-numbered position" hereafter) is represented by the following Expression 14 using the reference point (position vector thereof) M and the unit vectors U and V independent each other.

$$P_{ij}=M+f_iU+g_jV \qquad \text{[Expression 14]}$$

Then, chart data is formed of the image data based upon the geometric property format represented by Expression 14.

Here, fi and gj represent scalars defined in the real-number space with discrete numbers i and j as the parameters thereof, respectively.

The chart data is recorded on a recording medium using a recording device, whereby a test chart is formed. Furthermore, a chart image of the test chart is picked up by an image pickup apparatus. Then, the arrangement sets: the initial reference point M(hat) (m(hat)x, m(hat)y); and the initial unit vectors U(hat)(u(hat)x, u(hat)y) and V(hat)(v(hat)x, v(hat)y), on the chart image. Then, the position P(hat)ij which is the position of the ij-numbered mark (mark ij) is obtained based upon the geometric property format using the initial reference point M(hat) and the initial unit vectors U(hat) and V(hat). Thus, the position P(hat)ij is represented by the following Expression 15.

$$\hat{P}_{ij}=\hat{M}+f_i\hat{U}+g_j\hat{V} \qquad \text{[Expression 15]}$$

With a predetermined position, particularly in this case, the center position, of the ij-numbered mark obtained (measured) from the chart image as Rij(xij, yij), the error εij of the ij-numbered mark obtained based upon the geometric property format from the measured position is represented by the following Expression 16.

$$\epsilon_{ij}=|\hat{P}_{ij}-R_{ij}| \qquad \text{[Expression 16]}$$

Accordingly, the sum of squares of the error E in each mark is represented by the following Expression 17.

$$E = \sum_{ij}\epsilon_{ij}^2 = \sum_{ij}|\hat{P}_{ij}-R_{ij}|^2 \qquad \text{[Expression 17]}$$

$$= \sum_{ij}\left(\hat{M}+f_i\hat{U}+g_j\hat{V}-R_{ij}\right)^2$$

$$= \sum_{ij}\{(\hat{m}_x+f_i\hat{u}_x+g_j\hat{v}_x-x_{ij})^2 +$$

$$(\hat{m}_y+f_i\hat{u}_y+g_j\hat{v}_y-y_{ij})^2\}$$

In the same way as with the one-dimensional arrangement described above, in order to obtain the minimum E, the set of the M(hat), the U(hat) and the V(hat) is obtained so as to satisfy the following Expression 18.

$$\frac{\partial E}{\partial \hat{m}_x}=0, \frac{\partial E}{\partial \hat{u}_x}=0, \frac{\partial E}{\partial \hat{v}_x}=0, \qquad \text{[Expression 18]}$$

$$\frac{\partial E}{\partial \hat{m}_y}=0, \frac{\partial E}{\partial \hat{u}_y}=0, \frac{\partial E}{\partial \hat{v}_y}=0$$

In substantially the same way as with the one-dimensional arrangement, with the total number of the marks in the two-dimensional arrangement as N (in this case, the Expression 19 holds), the following Expression 20 is obtained.

$$\sum_{ij}1=N \qquad \text{[Expression 19]}$$

$$N\hat{m}_x + \sum_{ij}f_i\hat{u}_x + \sum_{ij}g_j\hat{v}_x = \sum_{ij}x_{ij} \qquad \text{[Expression 20]}$$

$$\sum_{ij}f_i\hat{m}_x + \sum_{ij}f_i^2\hat{u}_x + \sum_{ij}f_ig_j\hat{v}_x = \sum_{ij}f_ix_{ij}$$

$$\sum_{ij}g_j\hat{m}_x + \sum_{ij}f_ig_j\hat{u}_x + \sum_{ij}g_j^2\hat{v}_x = \sum_{ij}g_jx_{ij}$$

$$N\hat{m}_y + \sum_{ij}f_i\hat{u}_y + \sum_{ij}g_j\hat{v}_y = \sum_{ij}y_{ij}$$

$$\sum_{ij}f_i\hat{m}_y + \sum_{ij}f_i^2\hat{u}_y + \sum_{ij}f_ig_j\hat{v}_y = \sum_{ij}f_iy_{ij}$$

$$\sum_{ij}g_j\hat{m}_y + \sum_{ij}f_ig_j\hat{u}_y + \sum_{ij}g_j^2\hat{v}_y = \sum_{ij}g_jy_{ij}$$

Expression 20 can be represented by the following Expression 21 which is a matrix expression.

$$\begin{pmatrix} N & \sum_{ij}f_i & \sum_{ij}g_j \\ \sum_{ij}f_i & \sum_{ij}f_i^2 & \sum_{ij}f_ig_j \\ \sum_{ij}g_j & \sum_{ij}f_ig_j & \sum_{ij}g_j^2 \end{pmatrix} \begin{pmatrix} \hat{m}_x \\ \hat{u}_x \\ \hat{v}_x \end{pmatrix} = \begin{pmatrix} \sum_{ij}x_{ij} \\ \sum_{ij}f_ix_{ij} \\ \sum_{ij}g_jx_{ij} \end{pmatrix} \qquad \text{[Expression 21]}$$

$$\begin{pmatrix} N & \sum_{ij}f_i & \sum_{ij}g_j \\ \sum_{ij}f_i & \sum_{ij}f_i^2 & \sum_{ij}f_ig_j \\ \sum_{ij}g_j & \sum_{ij}f_ig_j & \sum_{ij}g_j^2 \end{pmatrix} \begin{pmatrix} \hat{m}_y \\ \hat{u}_y \\ \hat{v}_y \end{pmatrix} = \begin{pmatrix} \sum_{ij}y_{ij} \\ \sum_{ij}f_iy_{ij} \\ \sum_{ij}g_jy_{ij} \end{pmatrix}$$

The set of M(hat), U(hat), and V(hat), which satisfies the above matrix expression, can be calculated using the Cramer's formula. In practicality, the set of M(hat), U(hat), and V(hat), is computed using a computer or the like.

Figure 5:
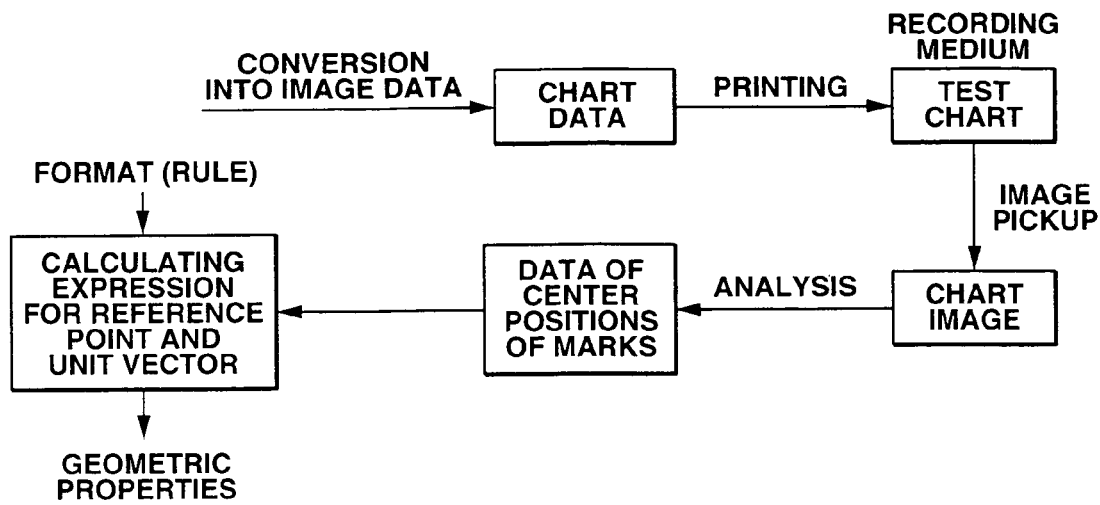
FIG. 5 is a diagram for describing the terminological relation between the components with regard to the geometric property format and the chart, regarding the mechanism according to the first embodiment.

Next, description will be made regarding the terminological relation between the components with regard to the geometric property format and the chart used here, with reference to FIG. 5. FIG. 5 is a diagram for describing the terminological relation between the components with regard to the geometric property format and the chart.

First, each mark is formed of a single dot or plural dots arrayed adjacent one to another. The position of the mark in the layout (positional relation thereof) is regulated by the geometric property format, and the marks thus arrayed are independent each other. The marks thus arrayed will be denoted by reference symbols including "M" (e.g., M0-0, M0-1, and so forth), as appropriate.

On the other hand, the geometric property format (which is also abbreviated to "format") is used as a layout rule (rule for determining the positional relation) for recording or reading the marks. The recording format is not completely same with the reading format in all cases, but in many cases, the reading format is a part of the recording format. The geometric property format will be denoted by reference symbols including "F" (e.g., F0, F1, and so forth), hereafter, as appropriate.

The chart data is image data created based upon the geometric property format.

The test chart is recorded (printed) on a recording medium such as a paper sheet, a film, or the like, based upon the aforementioned chart data, using a recording device.

The chart image is image data of the test chart picked up by an image pickup apparatus.

A chart component is a group of the plural marks grouped based upon the reading format, and is also referred to as "mark group". In practicality, in many cases, the chart is divided into the plural chart components so as to be analyzed. The chart component will be denoted by reference character including "G" (e.g., G0-0, G0-1, and so forth) hereafter, as appropriate.

The region used here represents a single region with a certain area occupied by the chart (or chart component). In other words, the region used here represents a region surrounded by lines connecting the marks positioned on the perimeter. The region will be denoted by reference character including "R" (e.g., R0-0, R0-1, and so forth) hereafter, as appropriate.

Then, a predetermined position, in particular, the center position of each mark is analyzed, whereby the data of each center position is calculated with regard to the mark group.

Then, the center-position data is compared to the geometric property format so as to calculate the most likely reference point and the unit vectors, whereby the geometric property is obtained.

Description will be made below in detail regarding a specific arrangement according to an embodiment of the present invention with reference to the drawings.

Figure 6:
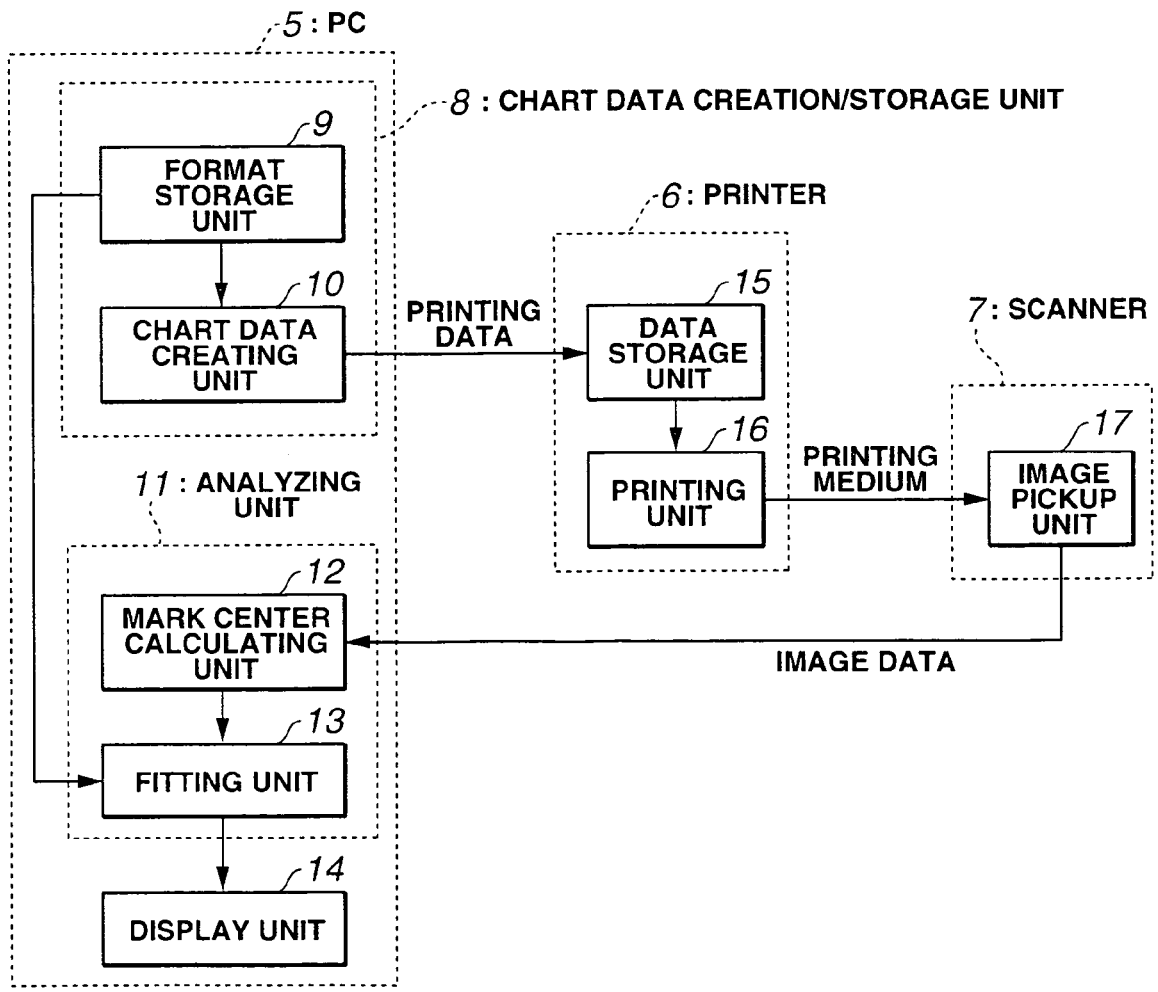
FIG. 6 is a block diagram which shows a configuration of a geometric property analyzing system according to a first embodiment of the present invention.

FIG. 6 through FIG. 32 show a first embodiment according to the present invention, wherein FIG. 6 is a block diagram which shows a configuration of a geometric property analyzing system.

The geometric property analyzing system according to the present embodiment comprises: a personal computer (PC) 5 serving as an analyzing device; a printer 6 serving as a recording device; a scanner 7 serving as an image pickup apparatus, as shown in FIG. 6.

The PC 5 comprises: a format storage unit 9 serving as format storage means for storing the geometric property format; a chart data creation/storage unit 8 including a chart data creating unit 10 for creating chart data (printed data) which is image data based upon the geometric property format read out from the format storage unit 9; a mark center calculating unit 12 for calculating the center position of each mark based upon the chart image output from an image pickup unit 17 described later; an analyzing unit 11 serving as analyzing means including a fitting unit 13 for analyzing the geometric properties by calculating the most likely reference point and unit vectors through comparison between the center positions of the marks of the mark group calculated by the mark center calculating unit 12 and the geometric property format read out from the format storage unit 9; and a display unit 14 for displaying the analysis results analyzed by the analyzing unit 11.

On the other hand, the printer 6 comprises: a data storage unit 15 for storing the chart data (data which is to be printed) output from the chart data creating unit 10; and a printing unit 16 having a function for reading chart data from the data storage unit 15 and recording (printing) the chart data on a recording medium such as a paper sheet, film, or the like, whereby a test chart is created.

On the other hand, the scanner 7 comprises the image pickup unit 17 serving as image pickup means for creating a chart image which is the picked-up image data of a test chart on a printing medium formed by the printing unit 16.

Figure 7:
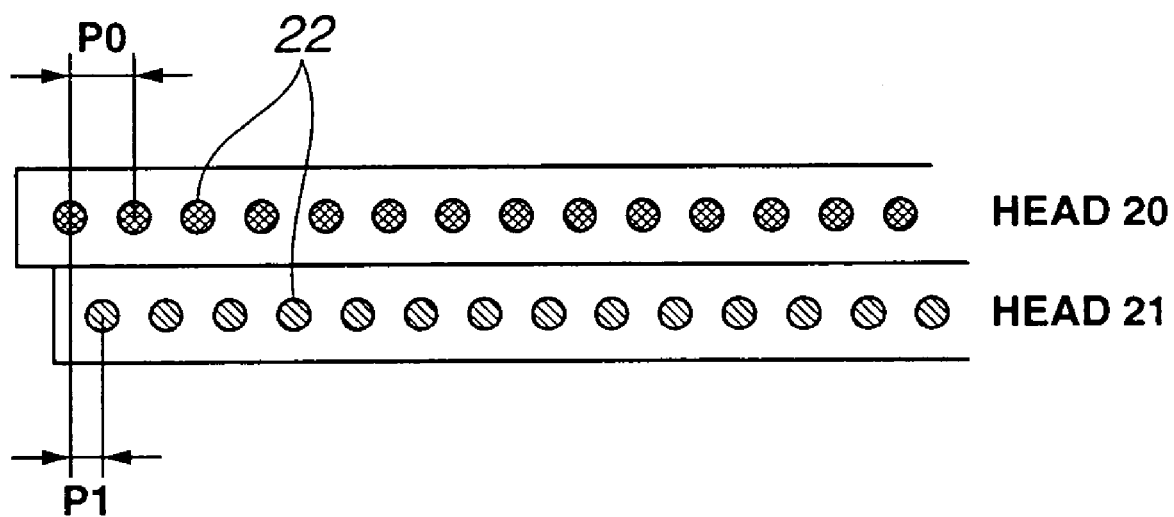
FIG. 7 is a diagram which shows a specific configuration of a printing unit according to the first embodiment.

Now, FIG. 7 is a diagram which shows a specific configuration of the ink-jet heads of printing unit 16.

The printing unit 16 has a configuration wherein two ink-jet heads each of which includes nozzles cyclically arrayed in the line direction are arrayed such that the printing width substantially overlaps one another with the phase difference therebetween of half the pitch of the nozzle array so as to realize two times resolution of each single head.

That is to say, the printing unit 16 comprises a head assembly having a configuration wherein two ink-jet heads 20 and 21 serving as recording means each of which has plural nozzles 22 arrayed at a pitch of P0 corresponding to the resolution of 150 DPI, for example, are securely fixed with phase difference therebetween of half the pitch of the array of each single head, i.e., with displacement therebetween of PI (approximately 84.7 μm) for realizing the resolution of 300 DPI, as shown in FIG. 7.

First, description will be made regarding an analysis method for analyzing the geometric property with regard to the ink-jet heads 20 and 21 forming the printing unit 16 having such a configuration. Here, examples of the geometric properties which are to be analyzed include: relation between the relative positions of the heads (the positions of the grouped nozzle groups); transporting vector; nozzle-to-nozzle vector; deviation thereof (deviation of relative position, irregularities in transporting, and distortion of the head), and so forth.

Figure 8:
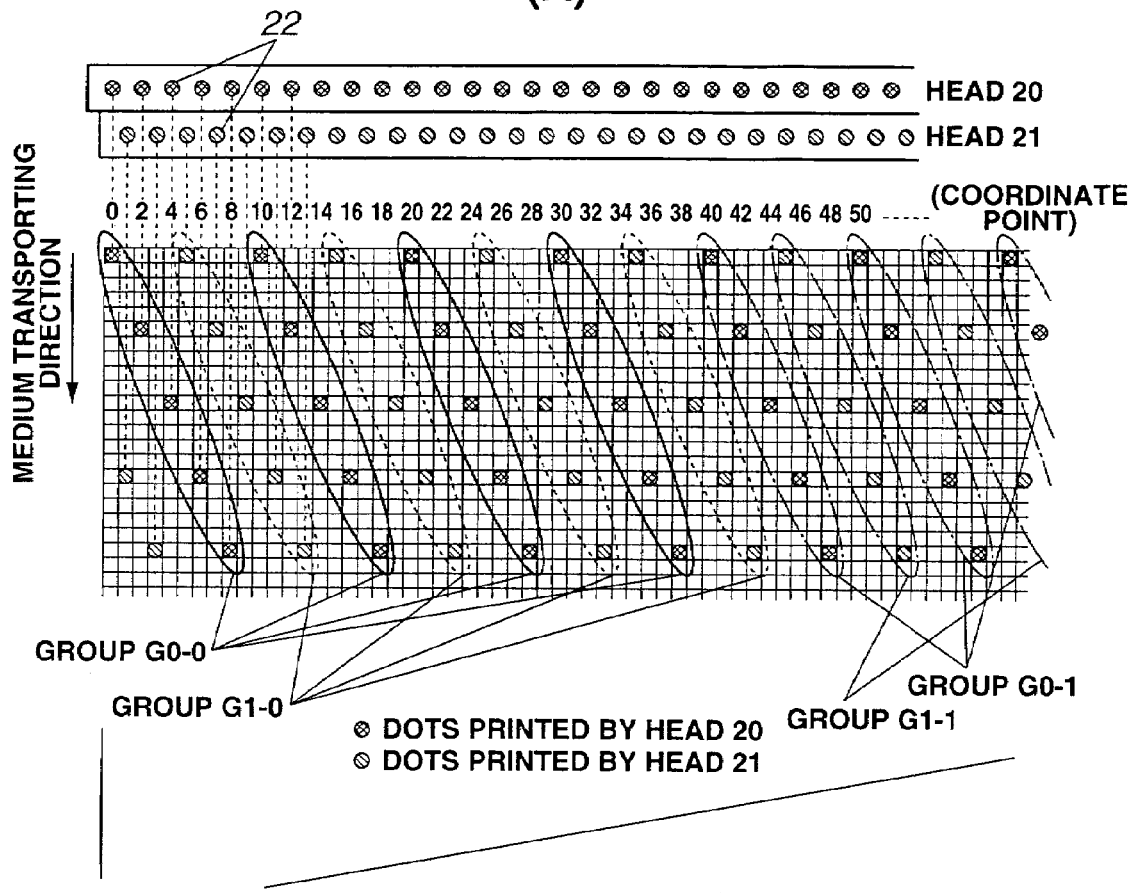
FIG. 8 is a diagram which shows the recording unit and chart data recorded by the printing unit according to the first embodiment.
Figure 8:
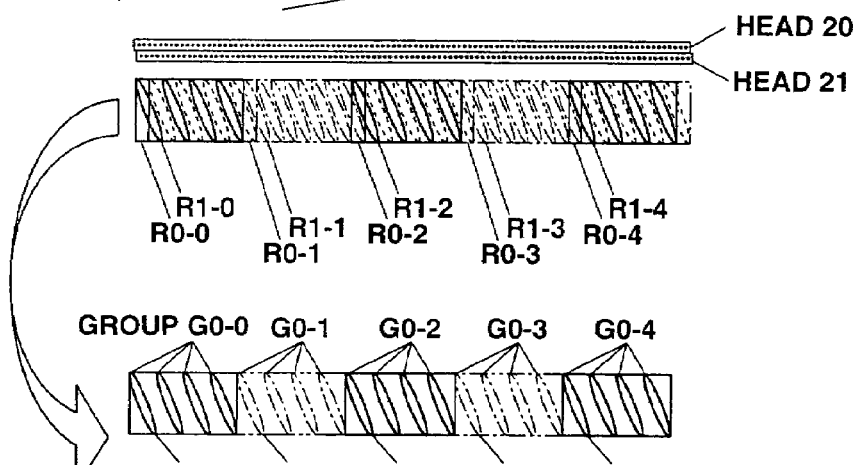
Figure 8:
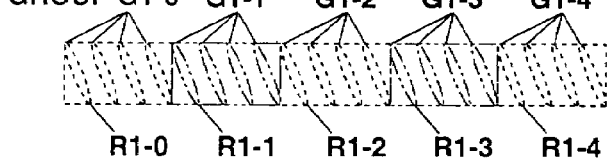

FIG. 8 is a diagram which shows the ink-jet heads of printing unit 16 and the chart data recorded by the printing unit 16.

In an example shown in FIG. 8, a single mark is formed of a single dot of ink discharged from the single nozzle 22 serving as recording means.

Each of the dots recorded by the nozzles 22 arrayed on the head 20 is positioned at an even-numbered point in the line direction. These dots are recorded according to the geometric property format (F0) of the chart component so as to be arrayed at intervals of 10 dots in a single line direction orthogonal to the transporting direction of a recording medium. This recording is made with displacement of two dots to the right every five-dot advance of the recording medium in the transporting direction up to twenty times. Let us say that the mark position is represented by (the point in the line direction, the point in the transporting direction of the recording medium). In this case, the head 20 records the dots such that the first nozzle records a dot at (0, 0), the second nozzle records a dot at (2, 5), the third nozzle records a dot at (4, 10), the fourth nozzle records a dot at (6, 15), the fifth nozzle records a dot at (8, 20), the sixth nozzle records a dot at (10, 0), the seventh nozzle records a dot at (12, 5), and so on in the same way.

On the other hand, each of the dots recorded by the nozzles 22 arrayed on the head 21 is positioned at an odd-numbered point in the line direction. These dots are recorded according to the geometric property format (F1) such that the chart component recorded by the head 20 according to the geometric property format (F0) described above is arrayed with displacement by five dots to the right. That is to say, the head 21 records the dots such that the first nozzle records a dot at (1, 15), the second nozzle records a dot at (3, 20), the third nozzle records a dot at (5, 0), the fourth nozzle records a dot at (7, 5), the fifth nozzle records a dot at (9, 10), the sixth nozzle records a dot at (11, 15), the seventh nozzle records a dot at (13, 20), and so on in the same way.

The dots thus recorded are positioned away one from another at predetermined intervals in both the line direction and the recording-medium transporting direction. As described above, the dots are arrayed away one from another, thereby preventing interference between the dots adjacent one to another due to blotting of ink dot in recording, optical blurring or phase deviation in picking up an image with the scanner 7, irregularities in transporting or head positioning during recording, and thereby maintaining independence thereof.

In order to analyze the picked-up chart image of a test chart printed according to such chart data, the chart image is divided into chart components with a small region for each of the heads 20 and 21 which are different recording systems, or furthermore, for each small region in the heads 20 and 21. The geometric properties are obtained for each chart component with a small region thus grouped, thereby obtaining precise geometric properties for each chart component.

Specifically, as shown in FIG. 8(A), the dots recorded according to the geometric property format F0 are grouped into a group G0-0, G0-1, G0-2, and so on in the same way, every twenty dots. In the same way, the dots recorded according to the geometric property format F1 are grouped into a group G1-0, G1-1, G1-2, and so on in the same way, every twenty dots. Then, as shown in FIG. 8(B) and FIG. 8(C), the geometric properties are analyzed for each region of the heads 20 and 21, i.e., for each region of regions R0-0, R0-1, R0-2, and so on, including the groups G0-0, G0-1, G0-2, and so on, and for each region of regions R1-0, R1-1, R1-2, and so on, including the groups G1-0, G1-1, G1-2, and so on, under the assumption that each group serves as a chart component.

This enables estimation of the reference point and the unit vectors of the head for each region, thereby enabling precise analysis of the geometric properties.

As described above, with the present embodiment, a picked-up chart image of a chart which has been created according to the chart data as shown in FIG. 8 and has been recorded on a recording medium is used for analysis, thereby eliminating adverse effects due to skewing, irregularities in transporting, meandering of a recording paper sheet, extension or contraction thereof, or the like, as much as possible, thereby enabling analysis of the marks recorded by the two heads 20 and 21 for each local region.

Note that various modifications may be made regarding the chart component under the condition that the dots forming a single chart component are recorded according to common geometric properties.

For example, FIG. 8 shows an arrangement wherein a region recorded by a single head having a large recording width is divided into small regions serving as chart components for analyzing the small regions thus divided and analyzing the relative relation therebetween under the assumption that the dots forming a test chart recorded by such a long head are not arrayed according to common geometric properties over the entire region thereof due to distortion of the head. On the other hand, an arrangement may be made wherein a region recorded by the head assembly is divided into two chart components each of which is formed of the dots recorded by one of the heads for analyzing only the geometric properties for each head and the geometric properties due to the relative relation between the heads. Furthermore, in a case wherein these two heads are fixed under predetermined conditions, an arrangement may be made wherein the geometric properties are analyzed for the entire region recorded by the head assembly under the assumption that the fixed heads serve as a single head.

Figure 9:
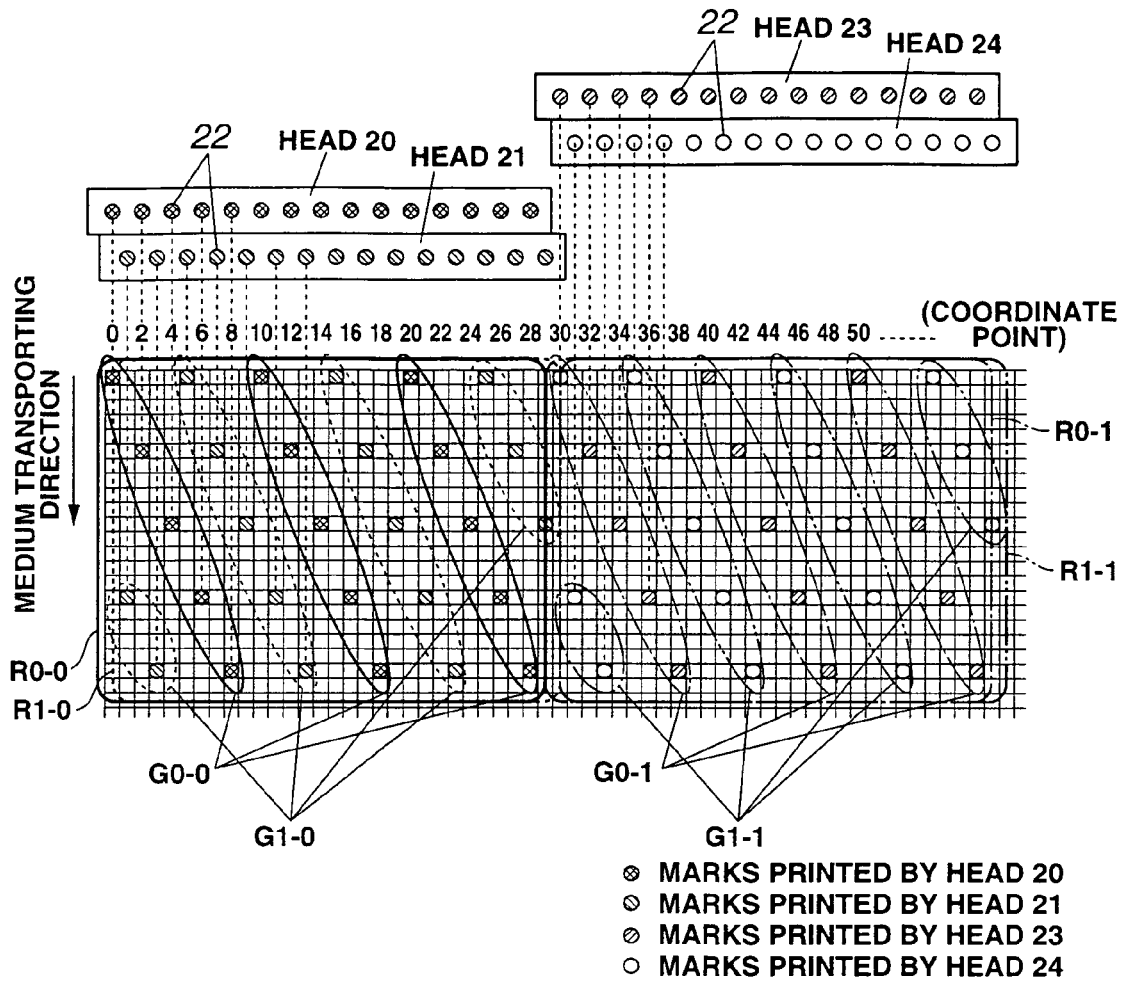
FIG. 9 is a diagram which shows an arrangement wherein the marks are grouped into chart components each of which is recorded by the corresponding head according to the first embodiment.

On the other hand, FIG. 9 is a diagram which shows an arrangement wherein the marks are grouped into chart components for each head. An arrangement may be made having such a configuration as shown in FIG. 9 for analyzing the geometric properties for each head and the geometric properties due to the relative relation between the heads.

In this arrangement, a recording region R0-0 including the chart components G0-0 recorded by the head 20 substantially shares the region with a recording region R1-0 including the chart components G1-0 recorded by the head 21. In the same way, a recording region R0-1 including the chart components G0-1 recorded by the head 23 substantially shares the region with a recording region R1-1 including the chart components G1-1 recorded by the head 24. With such a configuration, either chart components are affected by the same deviation with relatively low frequencies such as extension or contraction of a recording medium, flapping or meandering thereof during recording or image picking up, thereby enabling estimation of the relative positional relation between these heads while suppressing the adverse effects due to the aforementioned deviation, and thereby enabling more high-precision measurement.

Furthermore, with such an arrangement, each line orthogonal to the transporting direction includes the marks forming the four chart components. With such a configuration, each chart component is affected by the same deviation with relatively high frequencies due to transporting of the recording medium in the same way, thereby enabling more high measurement while suppressing the adverse effects due to such deviation in a case of estimation of the relative positional relation between these heads.

Figure 10:
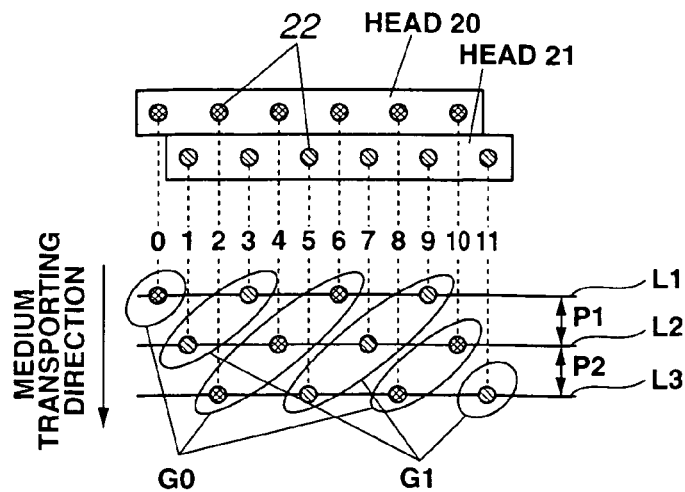
FIG. 10 is a diagram which shows an example of arrangement wherein the marks of the plural chart components are recorded on each line orthogonal to the transporting direction for analyzing the geometric properties without effect by transporting irregularities and the like according to the first embodiment.

Description will be made regarding the advantage in detail with regard to FIG. 10. FIG. 10 is a diagram which shows an arrangement wherein the marks of the plural chart components are recorded on each line orthogonal to the transporting direction, which has the advantage of analyzing the geometric properties while eliminating the adverse effects due to irregularities in transporting or the like.

In an arrangement example shown in FIG. 10, even-numbered marks are printed by the head 20, whereby a chart component G0 is formed of six marks of 0, 2, 4, 6, 8, and 10. On the other hand, odd-numbered marks are printed by the head 21, whereby a chart component G1 is formed of six marks of 1, 3, 5, 7, 9, and 11. Here, a line L1 orthogonal to the transporting direction includes: the two marks of 0 and 6 forming G0; and the two marks of 3 and 9 forming G1. In the same way, a line L2 includes: the two marks of 4 and 10 forming G0; and the two marks of 1 and 7 forming G1, and a line L3 includes: the two marks of 2 and 8 forming G0; and the two marks of 5 and 11 forming G1.

Here, the interval P1 between the line L1 and L2 is designed to be the same length as the interval P2 between the line L2 and L3. However, in some cases, a recording medium is transported with irregularities along the transporting direction. In this case, the length of the interval P1 is not equal to the one of the interval P2, leading to difference of the geometric properties obtained from each chart component. Even in such a case, with the present embodiment having such a configuration wherein the component charts are formed according to the geometric property format such that the same number of marks of each chart component are recorded on each line orthogonal to the transporting direction, and accordingly such chart components thus formed are affected by the same deviation such as irregularities in transporting or the like, thereby enabling estimation of the relative relation therebetween while canceling out such irregularities with a simple method.

Such an arrangement wherein each chart component is formed under the same conditions has not only the advantage of effectively canceling out irregularities in transporting of a recording medium, but also has the advantage of effectively canceling out directional irregularities such as irregularities in movement of the head, irregularities in movement of a line sensor during picking up images, and so forth.

Figure 11:
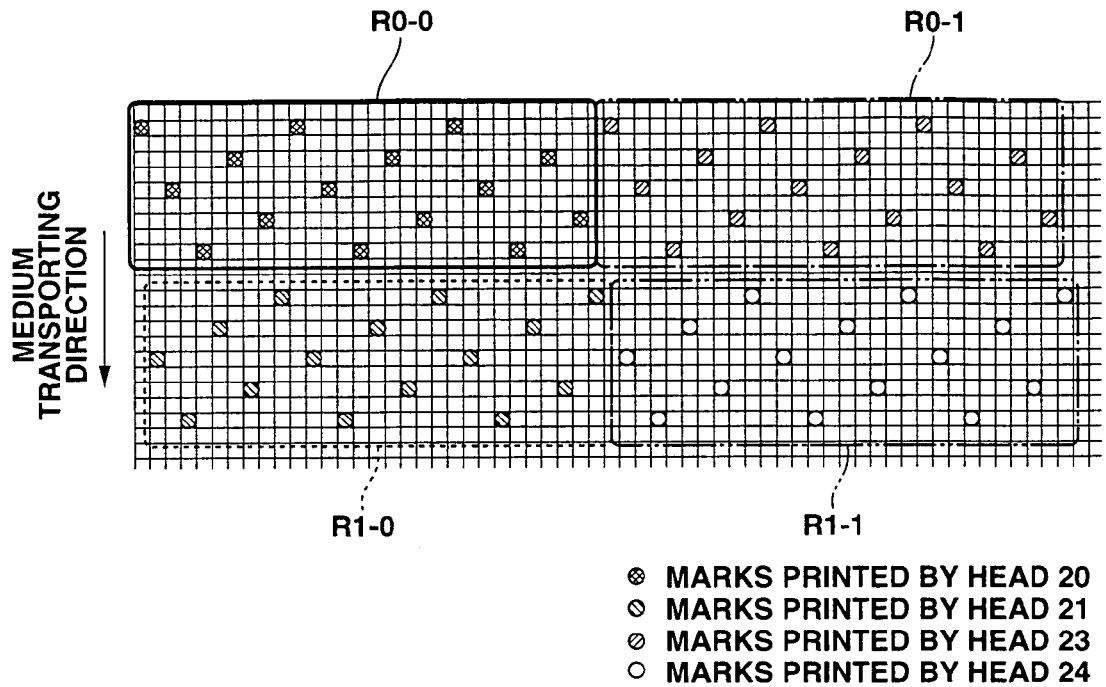
FIG. 11 is a diagram which shows an example of arrangement designed such that the recording regions of the chart components are arrayed without overlapped regions according to the first embodiment.

On the other hand, FIG. 11 is a diagram which shows an arrangement example designed such that the chart components are arrayed without overlapped regions.

With such a configuration as shown in FIG. 11, each chart component can be formed with a smaller region (area). Such an arrangement is insusceptible to the adverse effects due to distortion occurring in the head, thereby enabling more high-precision measurement of the geometric properties of these heads. However, it is thought that such a configuration leads to some deterioration in measurement precision of the relative relation between these heads.

Note that in an example shown in FIG. 11, a single chart component is formed of a mark group including the fifteen marks. In general, with the standard deviation σ of irregularities in the position detection using a single mark as σ1, the standard deviation σN of the irregularities in the position detection using N marks is represented by the following Expression 22.

$$\sigma N = \sigma 1/\sqrt{N}$$ [Expression 22]

Accordingly, the number of marks should be determined corresponding to required precision.

Figure 12:
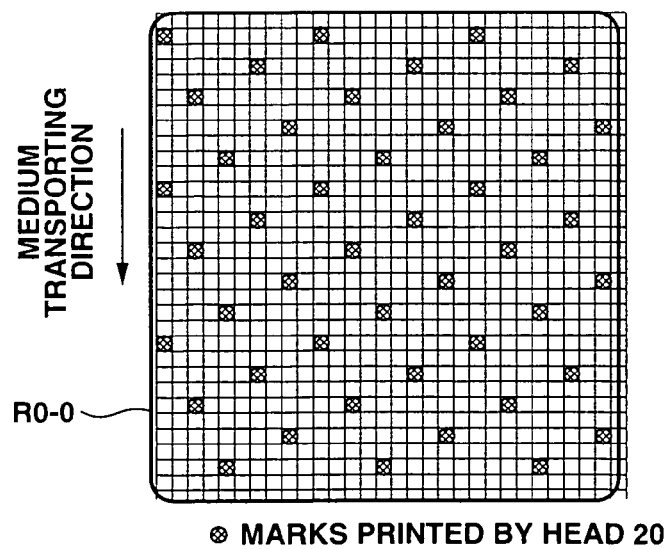
FIG. 12 is a diagram which shows an example of arrangement wherein the number of the marks included in the chart component is designed so as to satisfy the required precision according to the first embodiment.

For example, in a case wherein σ1 is 20 μm and the measurement required precision for σN is 3 μm, the required number N of the marks is determined to be 45 by calculation of: $N=(20/3)\times(20/3)\approx 45$. Accordingly, a single chart component should be formed of 45 marks as shown in FIG. 12. FIG. 12 is a diagram which shows an arrangement wherein the number of the marks included in the chart component is designed for satisfying the required precision.

Note that in a case wherein the marks are recorded with positional precision dependent upon the direction, more number of marks are preferably arrayed in the direction where recording positional precision is low, thereby improving the measurement precision along this direction.

Figure 13:
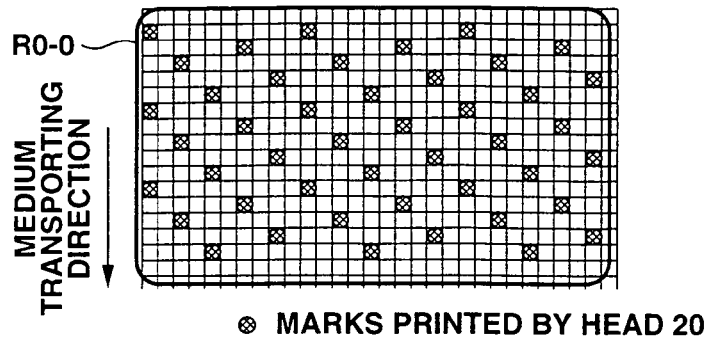
FIG. 13 is a diagram which shows an example of arrangement wherein the chart component shown in FIG. 12 is designed with high density in the recording-medium transporting direction.

On the other hand, as described later, the chart component is formed of the marks with higher density if the marks can be detected without interference therebetween. Accordingly, in this case, the chart component can be designed with a further smaller region as shown in FIG. 13. FIG. 13 is a diagram which shows an arrangement example wherein the chart component shown in FIG. 12 is formed with higher density in the recording-medium transporting direction.

Figure 14:
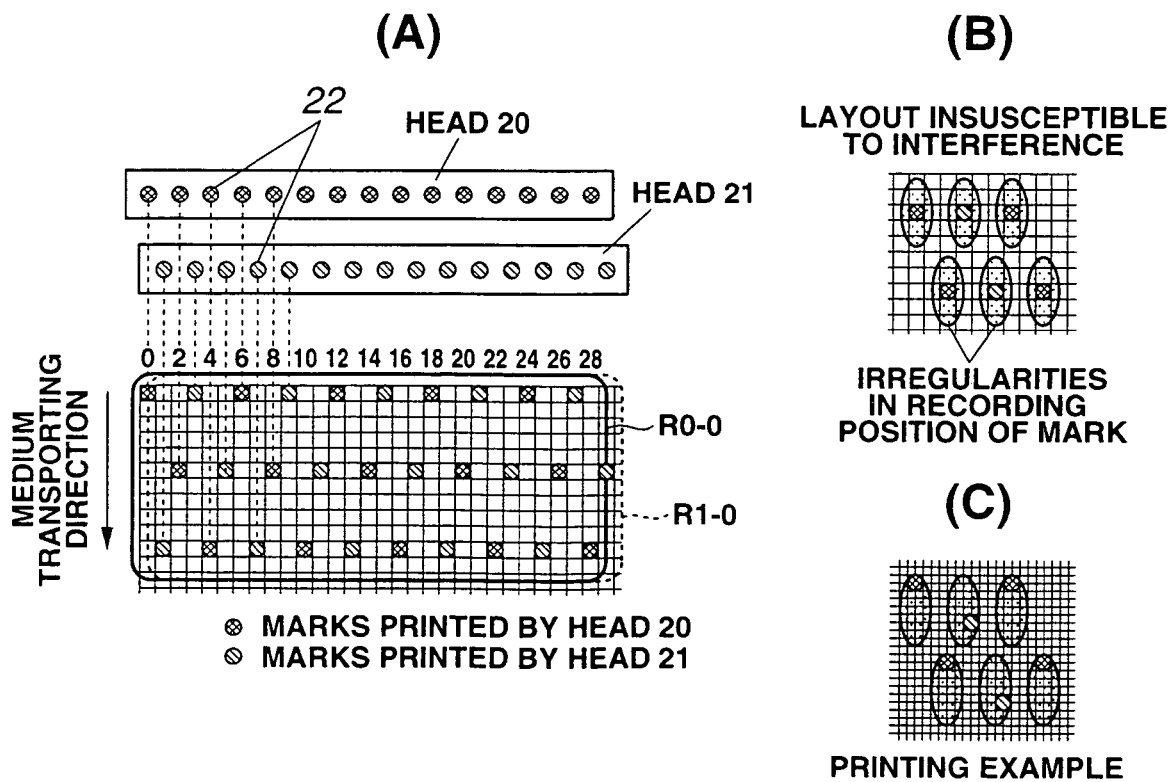
FIG. 14 is a diagram which shows an example of arrangement wherein the geometric property format is designed giving consideration to the directional dependence of irregularities in the mark-recording position according to the first embodiment.

Next, FIG. 14 is a diagram which shows an example of the mark layout wherein the marks are recorded according to the geometric property format with positional irregularities dependent upon the direction. As shown in FIG. 14, the marks are recorded with positional irregularities dependent upon the direction. Specifically, as shown in FIG. 14(B) and FIG. 14(C), the marks are recorded with great positional irregularities in the vertical direction (recording-medium transporting direction) and with small positional irregularities in the horizontal direction (line direction).

In such a case, interference readily occurs between the marks adjacent one to another in the vertical direction. In a case wherein the marks are readily recorded with interference therebetween along a particular direction (in the vertical direction, in this case), the chart component is preferably formed according to the geometric property format such that the marks are arrayed in low density in the direction susceptible to such interference, and are arrayed in high density along the direction orthogonal to the direction, as shown in FIG. 14(A). Thus, even in a case of the plural chart components with relative positional irregularities, this configuration allows the layout of the marks with high density with the overlapped region between the chart components while suppressing interference therebetween.

Figure 15:
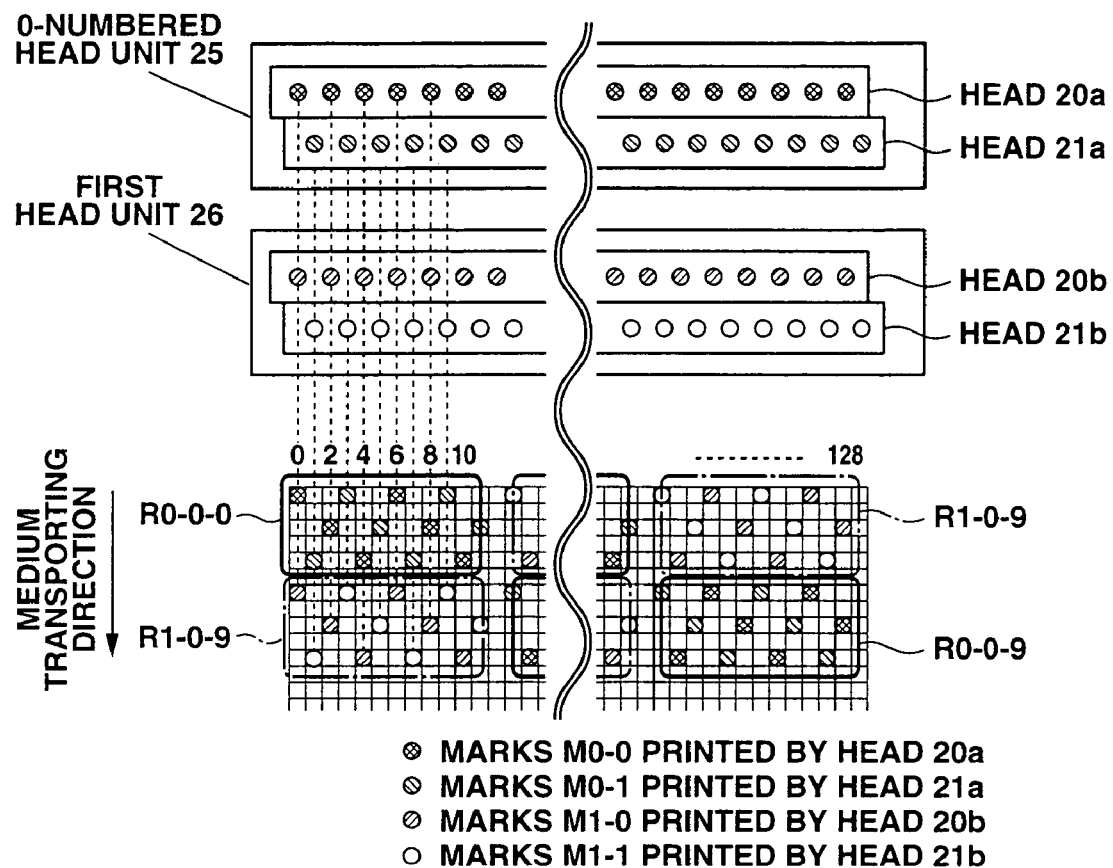
FIG. 15 is a diagram which shows an example of arrangement wherein two head units each of which is formed of the two heads fixed one to another are arrayed in the recording-medium transporting direction for recording marks according to the first embodiment.

Furthermore, a chart layout may be designed as shown in FIG. 15, which has a combination of the aforementioned configurations. FIG. 15 is a diagram which shows an arrangement example wherein two head units each of which includes two heads fixed one to another are arrayed in the recording-medium transporting direction, and the marks are recorded.

With an arrangement example shown in FIG. 15, the head 20a and the head 21a are fixed one to another, whereby a 0'th head unit 25 is formed. In the same way, the head 20b and the head 21b are fixed one to another, whereby a first head unit 26 is formed. Furthermore, the arrangement has a configuration wherein the head 20a and the head 20b are arrayed with the same phase in the line direction, and the head 21a and the head 21b are arrayed with the same phase, for recording an image on a recording medium, as shown in FIG. 15.

Specific examples having such a configuration include an arrangement for color printing. For example, the arrangement has a configuration wherein the 0'th head unit 25 is used for printing an image in black, and the first head unit 26 is used for printing an image in cyan. In general cases, unshown head units are further arranged with the same manner as the first head unit which is arranged with the same phase to the 0'th head unit for printing images in magenta and yellow, whereby color printing is performed.

With such a configuration having plural heads units, in a case wherein the interval between the heads arrayed adjacent one to another within the single head unit is greater than the interval between the head units, the marks recorded by the heads adjacent one to another within the single head unit are arrayed in positional irregularities with high correlation therebetween as compared with the marks recorded by the heads each of which is included in a different head unit.

Figure 16:
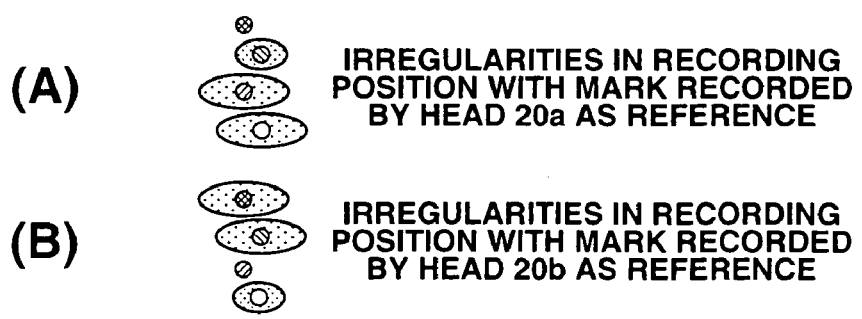
FIG. 16 is a diagram for describing: relative positional irregularities between the heads of the single head unit; and relative positional irregularities between the heads of the different head units according to the first embodiment.

FIG. 16 is a diagram which shows the marks formed with relative positional irregularities in a case wherein the marks are formed by the heads each of which is included in the single head unit, and in a case wherein the marks are formed by the heads each of which is included in a different head unit. Here, FIG. 16(A) shows the positional irregularities in recording with the mark recorded by the head 20a as a reference point, and FIG. 16(B) shows the positional irregularities in recording with the mark recorded by the head 20b as a reference point. As can be understood from FIG. 16, the marks are recorded with relatively small relative positional irregularities therebetween by the heads included in the single head unit while the marks are recorded with relatively great relative positional irregularities therebetween by the heads included in different head units.

In such a case, layout design wherein all the marks are arrayed according to a rule determined by a combination of the marks which exhibit the largest relative positional irregularities leads to the mark layout with low density, resulting in the mark layout with a large area. Accordingly, the mark layout is preferably designed with as high density as possible while suppressing interference between the marks adjacent one to another as follows.

Figure 17:
FIG. 17 is a diagram which shows a layout designed such that the marks positioned with relative irregularities are arrayed without interference therebetween under the conditions shown in FIG. 16.
Figure 17:
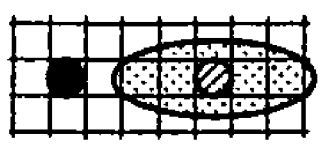
Figure 17:
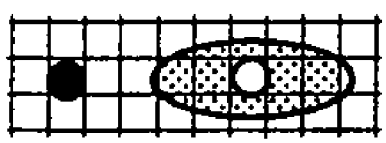
Figure 17:
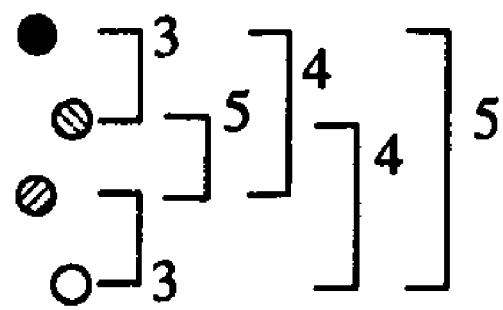

FIG. 17 is a diagram which shows a mark layout which allows printing of marks without interference therebetween with relative positional irregularities in a case shown in FIG. 16 as described above. As shown in FIG. 17, while a mark M0-0 printed by the head 20a and a mark M0-1 printed by the head 21a should be arrayed with an interval D of 3 for suppressing interference therebetween, the mark M0-0 and a mark M1-0 printed by the head 20b must be arrayed with an interval D of 4, and the mark M0-0 and a mark M1-1 printed by the head 21b must be arrayed with an interval D of 5, for suppressing interference therebetween.

In the same way, the mark M0-1 printed by the head 21a and the mark M1-0 printed by the head 20b must be arrayed with an interval D of 5, the mark M0-1 printed by the head 21a and the mark M1-1 printed by the head 21b must be arrayed with an interval D of 4, and the mark M1-0 printed by the head 20b and the mark M1-1 printed by the head 21b must be arrayed with an interval D of 3, for suppressing interference therebetween.

In this case, a mark layout regulated according to the geometric property format such that these marks are arrayed in order of these heads on a single line without interference therebetween requires cyclicity of (3+5+3+5)=16 dots for recording the four marks. Accordingly, the average distance between the adjacent marks is 4 dots in the line direction.

On the other hand, as shown in FIG. 15, a mark layout is created such that: a region along the line direction formed of dots 0 through 12 with a width of 13 dots includes two each of marks recorded by the heads 20a and 21a of the 0'th head unit 25; a next region formed of dots 13 through 25 includes two each of marks recorded by the heads 20b and 21b of the first head unit 26; and so on in the same way, whereby two each of marks by all the heads are recorded every 26 dots. In this case, the average distance between the adjacent marks is 3.25 dots in the line direction. As described above, formation of a mark layout with great head-unit switching cyclicity allows high-density recording of the chart component.

Figure 18:
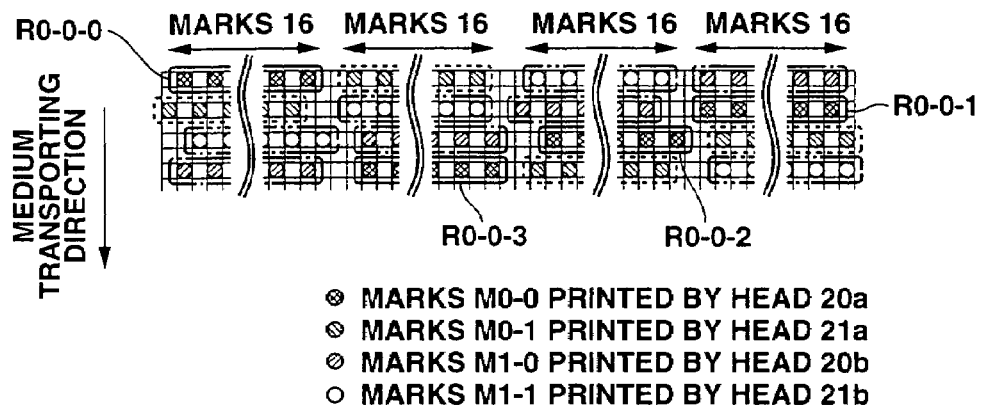
FIG. 18 is a diagram which shows an example of arrangement wherein the marks recorded by each single head are continuously arrayed in the line direction for improving recording density according to the first embodiment.

FIG. 18 is a diagram which shows an arrangement wherein each region extending in the line direction includes a series of marks recorded by a single head, thereby improving the recording density.

As shown in FIG. 18, the marks are recorded in order of M0-0, M0-0, . . . , M0-1, M0-1 . . . , and so on in the same way, for example, thereby further improving the recording density. In this case, sixteen each of marks by all the heads are recorded every 133 dots, and accordingly, the average distance between the adjacent marks is approximately 2.08 dots in the line direction.

While description has been made giving consideration to interference only in the line direction for simplification, the marks are recorded with positional irregularities in the two-dimensional direction in reality, and accordingly, a mark layout must be designed such that the marks adjacent one to another are arrayed without interference in the two-dimensional directions.

In a case of a mark layout including marks recorded by a laser printer or the like with small relative recording-position irregularities, the mark layout can be designed with the average mark density of approximately ¼ (one mark is recorded for each area where four marks can be recorded). On the other hand, in a case of a mark layout including marks recorded by various color heads of an ink-jet printer or the like with large relative recording-position irregularities, the mark layout can be designed with the average mark density of approximately ⅟50 (one mark is recorded for each area where 50 marks can be recorded). In general, with an ink-jet printer, a mark layout is preferably designed with the average mark density of approximately ⅟10 (one mark is recorded for each area where 10 marks can be recorded) to ⅟20 (one mark is recorded for each area where 20 marks can be recorded), and is more preferably designed with the average mark density of approximately ⅟16 (one mark is recorded for each area where 16 marks can be recorded), giving consideration to susceptibility to interference, precision, the image size which can be handled by the analyzing system, and so forth.

Figure 19:
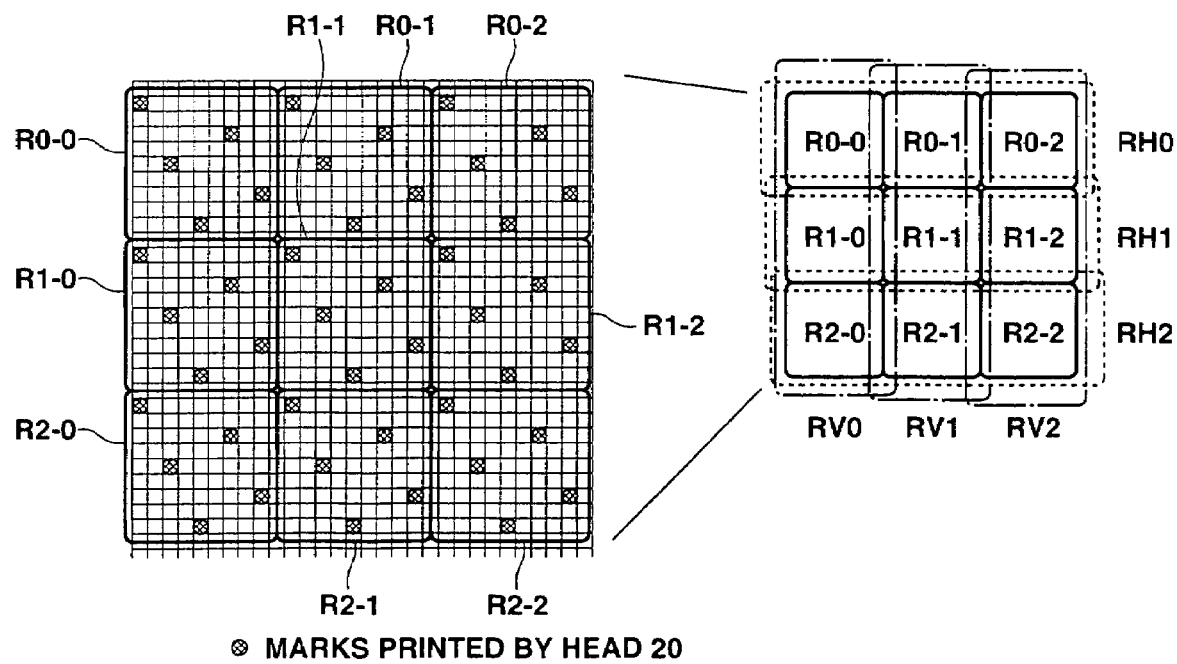
FIG. 19 is a diagram which shows an example of arrangement wherein plural small charts are grouped into the chart components according to the first embodiment.

Furthermore, an arrangement may be made wherein a single chart which is formed of marks recorded by a single head is suitably divided into plural chart components at the time of reading or analyzing. FIG. 19 is a diagram which shows an arrangement wherein plural small charts are grouped into chart components.

For example, the chart shown in FIG. 12 described above is divided into small charts of R0-0 to R2-2 as shown in FIG. 19.

Specifically, the small charts are grouped along the horizontal direction as shown in FIG. 19 at the time of analyzing the geometric properties due to irregularities in transporting, whereby the region R0-0, R0-1, and R0-2, are grouped into a single region RH0, the region R1-0, R1-1, and R1-2, are grouped into a single region RH1, and the region R2-0, R2-1, and R2-2, are grouped into a single region RH2, for analyzing the relative geometric properties of each region of RH0, RH1, and RH2.

On the other hand, in a case of analyzing the geometric properties due to distortion of the head, or analyzing the positional relation between the heads adjacent one to another in the nozzle-array direction, an arrangement may be made wherein the small charts are grouped in the vertical direction (recording-medium transporting direction) as shown in FIG. 19, whereby the region R0-0, R1-0, and R2-0, are grouped into a single region RV0, the region R0-1, R1-1, and R2-1, are grouped into a single region RV1, and the region R0-2, R1-2, and R2-2, are grouped into a single region RV2, for analyzing the relative geometric properties of each region of RV0, RV1, and RV2.

On the other hand, in a case of analyzing the geometric properties of the entire head, all the regions R0-0, R0-1, R0-2, R1-0, R1-1, R1-2, R2-0, R2-1, and R2-2, shown in FIG. 19 should be grouped into a single region, whereby the geometric properties are analyzed for the single region as shown in FIG. 12.

The present invention is not restricted to the arrangements, rather, any combination of the small charts may be grouped.

Furthermore, analysis of the geometric properties according to the present invention is not restricted to an arrangement wherein the geometric properties are analyzed for each of the grouped marks after grouping processing, rather an arrangement may be made wherein the geometric properties are calculated for each of the small charts R0-0 to R2-2, following which the geometric properties for the grouped region are calculated based upon the geometric properties of the small charts thus calculated.

As described above, the chart component can be suitably designed giving consideration to the geometric properties which are to be calculated, the desired precision, the irregularities in the recording position, directional dependence thereof (interference), and so forth. With the present embodiment, the geometric property format is designed giving consideration to the geometric properties which are to be calculated so as to optimize analyzing processing, thereby enabling more high-precision analyzing at high speed while conserving memory.

Next, description will be made regarding the operation of the geometric property analyzing system having such a configuration.

In FIG. 6, first, the chart data creating unit 10 creates chart data having a layout structure wherein dots are arrayed based upon the geometric property format stored in the format storage unit 9 as shown in FIG. 8, and transmits the chart data as printing data to the printer 6. Note that an arrangement may be made wherein the chart data is stored in the creation/storage unit 8, and is transmitted as printing data to the printer 6.

The printer 6 temporarily stores the received chart data in the data storage unit 15, following which the printer 6 sequentially reads out the chart data for each line so as to print an image with the heads 20 and 21 provided to the printing unit 16, whereby a test chart is formed corresponding to the chart data.

The test chart thus printed is read out by the scanner 7. In this case, the scanner 7 is used with higher image pickup resolution of the image pickup unit 17 thereof than with printing resolution (recording resolution) of the printing unit 16 in order to improve the measurement precision. For example, in a case of a printer including the printing unit 16 with printing resolution of 300 DPI as described above, the scanner 7 is used with image pickup resolution of the image pickup unit 17 of 600 DPI for picking up images. While it is needless to say that the scanner 7 is preferably used with as high image pickup resolution of the image pickup unit 17 as possible, an arrangement may be made wherein the scanner 7 is used with suitable image pickup resolution adjusted corresponding to the situation.

Then, the scanner 7 transmits the chart image of the test chart thus taken to the PC 5.

The PC 5 analyzes the geometric properties of the chart image transmitted from the scanner 7 in the analyzing unit 11.

That is to say, the analyzing unit 11 groups the dots printed by the nozzles arrayed adjacent one to another within a single head into a predetermined number of groups such as G0-0, G1-0, and the like, as shown in FIG. 8 or the like. Then, the analyzing unit 11 performs fitting of the geometric property format with each group as a fitting unit as described in the above mechanism description, whereby the reference point and the unit vectors are estimated.

Specifically, the approximate region of the picked-up chart image is detected (e.g., from the upper-left position and the lower-left position of the chart) based upon the acquired chart image, and the detected chart region is divided based upon the geometric property format, whereby the recording position of each dot is roughly calculated.

Figure 20:
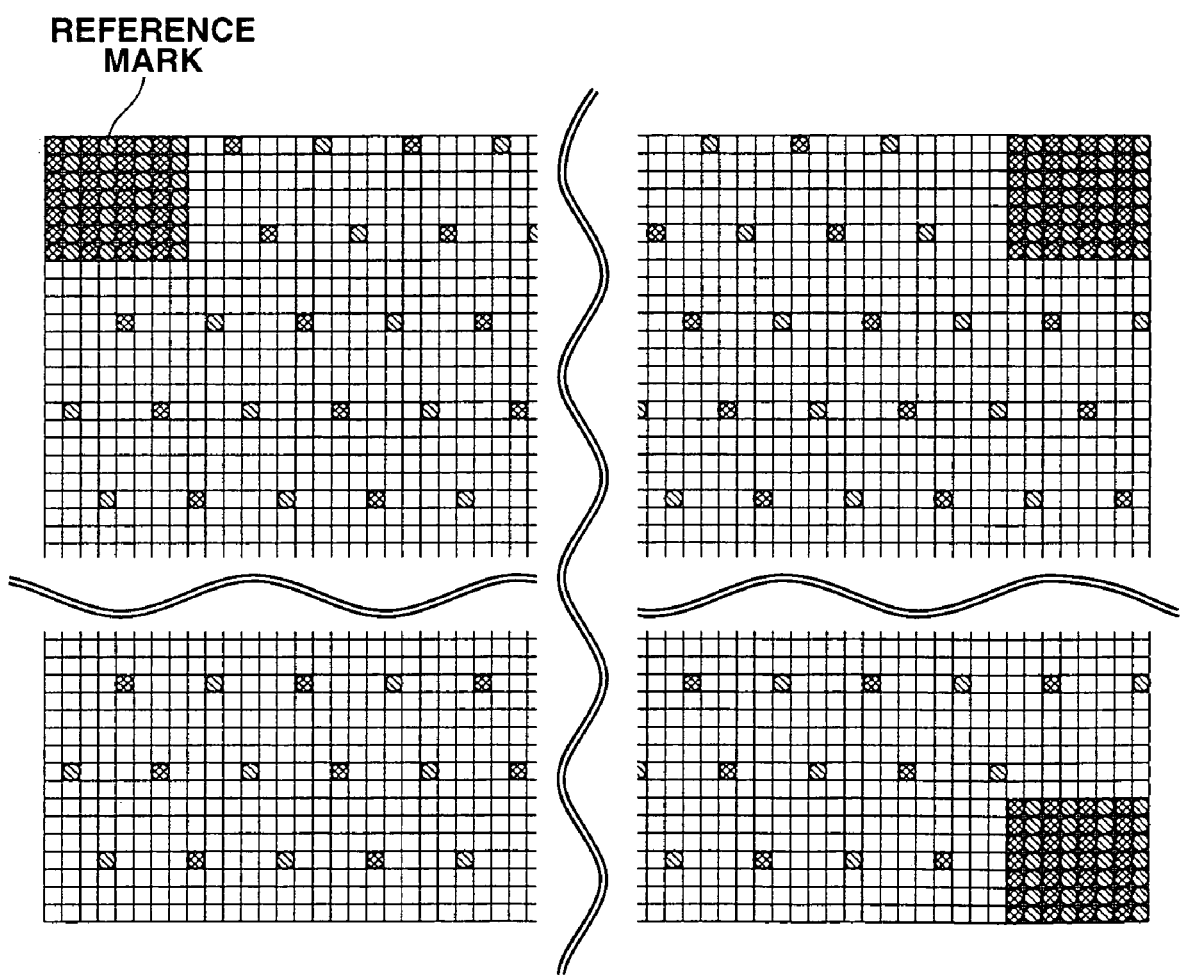
FIG. 20 is a diagram which shows an example of arrangement wherein reference marks are arrayed in the chart according to the first embodiment.
Figure 21:
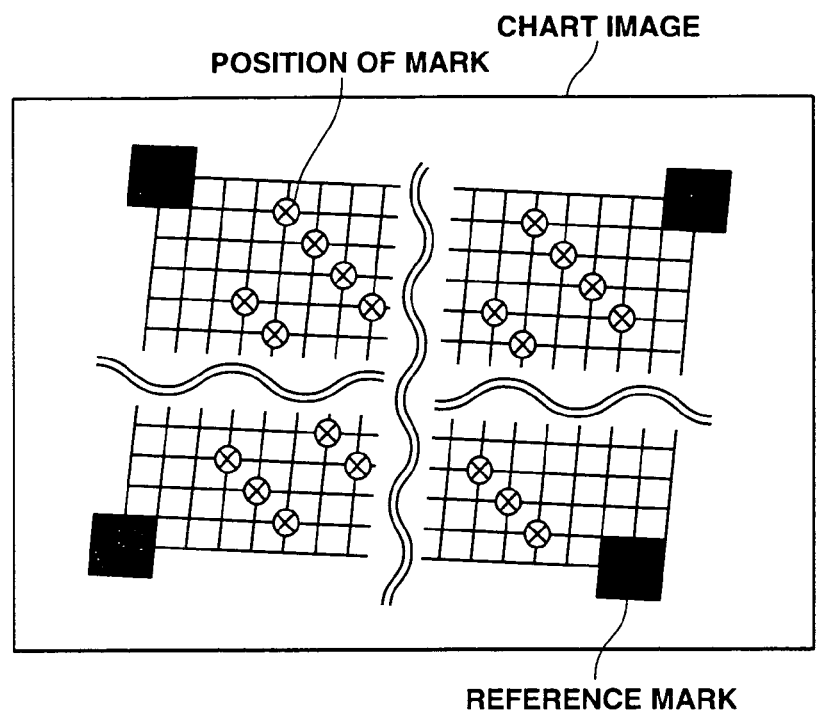
FIG. 21 is a diagram for describing rough calculation of the position of the mark based upon the positions of the reference marks according to the first embodiment.

Instead of rough positioning of the dot positions using the dots detected at predetermined positions in the chart image, an arrangement may be made wherein the dot positions are roughly positioned using the reference marks (marker) other than the aforementioned dots. FIG. 20 is a diagram which shows a layout example of the reference marks in the chart, and FIG. 21 is a diagram for describing calculation of the rough positions of the marks based upon the positions of the reference marks.

The reference mark is formed of the dots two-dimensionally arrayed in the chart, whereby a predetermined rectangular region (e.g., 7×8 dots) is formed as shown in FIG. 20, serving as a single reference mark formed of all the dots connected one to another. Accordingly, the reference mark is formed with a greater area than with the aforementioned mark. At the time of detecting the positions, first, the arrangement detects these reference marks, following which the arrangement divides the chart into mesh elements so as to roughly calculate the recording position of each mark based upon the detected positions of the reference marks and the geometric property format of the chart, as shown in FIG. 21.

In a case wherein recording and picking up images are made without skewing of a recording medium and with substantially the same aspect ratio, the arrangement may include only two reference marks. On the other hand, in a case wherein the system has problems of skewing of a recording medium, impermissible difference aspect ratio, and so forth, at the time of recording and picking up images, the system should include three or more reference marks such that no single line passes through all the reference marks.

In this case, as shown in FIG. 20, the reference marks are preferably arrayed at the ends of the chart such that lines between a certain reference mark (the upper-right reference mark, in this example shown in FIG. 20) and another reference mark intersect at the certain reference mark (the upper-right reference mark), orthogonal one to another. An arrangement example as shown in FIG. 20 is suitable for an arrangement wherein the head 20a and the head 21a are arrayed with relatively small positional irregularities as shown in FIG. 15. These reference marks are formed by both the heads 20a and 21a so as to serve as common reference marks. That is to say, these reference marks are formed as common reference marks using the dots recorded by the both heads 20a and 21a.

Figure 22:
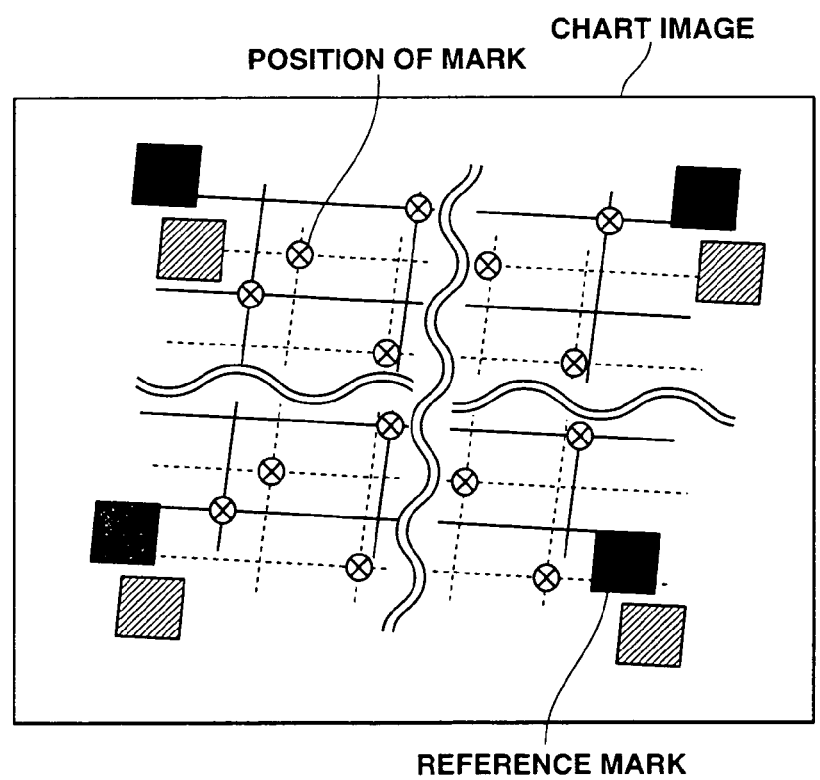
FIG. 22 is a diagram for describing rough calculation of the position of the mark based upon the positions of the reference marks arrayed for each head according to the first embodiment.

FIG. 22 is a diagram which shows an arrangement wherein individual reference mark array is prepared for each head for roughly calculating the positions of the marks. An arrangement example as shown in FIG. 22 is suitable for an arrangement wherein the head 20a and the head 20b are arrayed with relatively large positional irregularities as shown in FIG. 15. Each reference mark is formed by the corresponding single head (or head unit), and accordingly, the positions of the marks recorded by each head are calculated based upon the reference marks recorded by the corresponding head. This enables detection of the marks in a sure manner. Note that the chart shown in FIG. 22 must be designed such that the reference marks are arrayed without interference therebetween, and the reference marks and the marks are arrayed without interference therebetween, as well as the reference marks being arrayed without interference therebetween.

Description has been made regarding an arrangement wherein each reference mark is formed of dots arrayed within a particular rectangular region with high density as shown in FIG. 20, an arrangement may be made wherein the reference mark is formed of a layout of the dots continuously arrayed on a chart, such as a line or a frame, for example, which can be easily detected.

Figure 23:
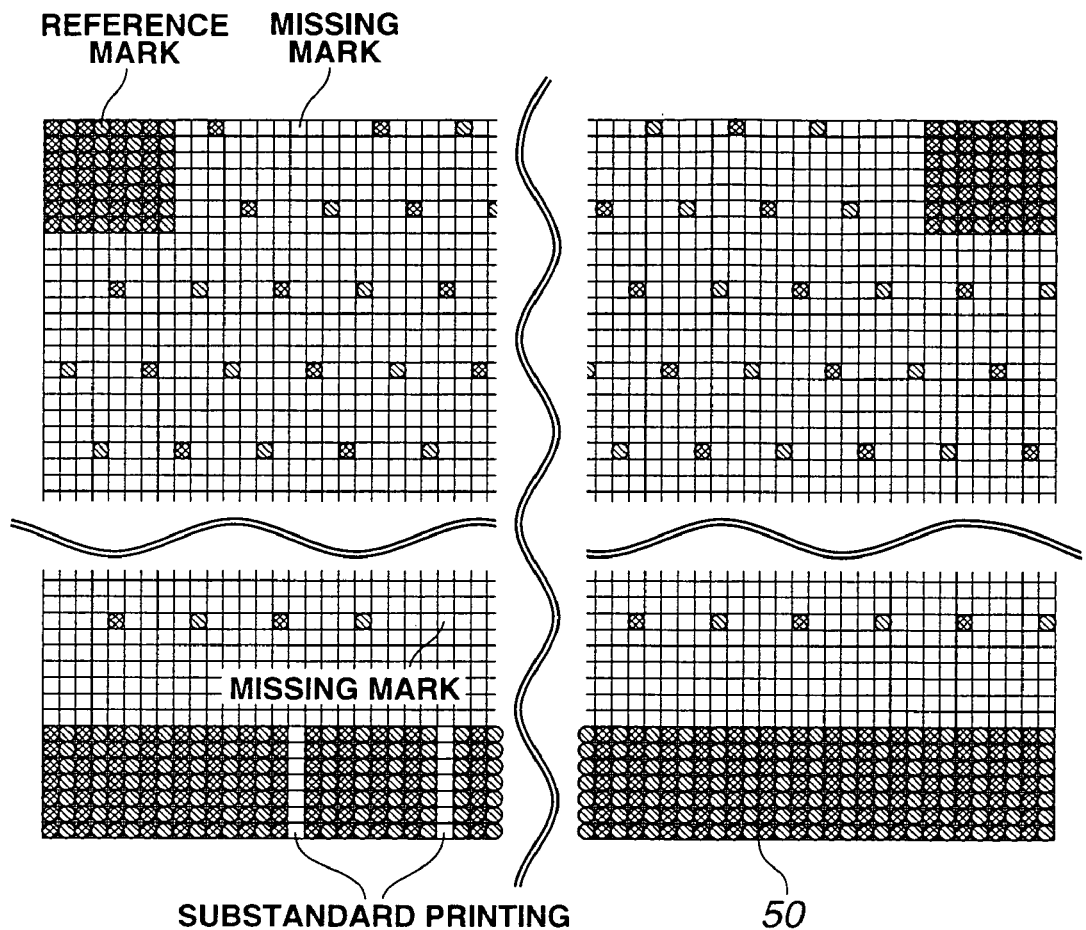
FIG. 23 is a diagram which shows an example of arrangement wherein a bar is arrayed in the chart according to the first embodiment.
Figure 36:
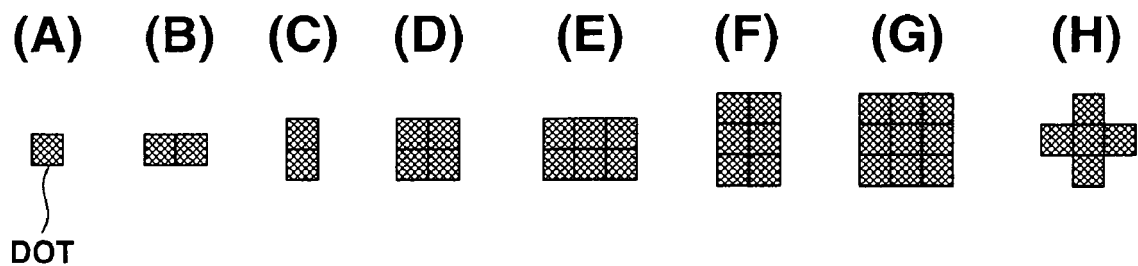
FIG. 36 is a diagram which shows various kinds of marks each of which is formed of one or more dots according to the second embodiment.

On the other hand, each mark is formed of one to several dots with an extremely small size as shown in FIG. 36 described later, for example. Accordingly, it is often difficult to immediately detect failure in printing at the time of recording of a chart on a recording medium. Accordingly, a uniform bar 50 is preferably arrayed in the chart at the time of recording as shown in FIG. 23. FIG. 23 is a diagram which shows an example wherein the bar 50 is arrayed in the chart. The bar 50 is formed of the dots arrayed in the chart in the shape of stripes as shown in FIG. 23; the longitudinal direction of each stripe becoming the line direction (nozzle-array direction).

With such a configuration, in the event of failure in printing on a recording medium at the time of printing of a chart, the failure in printing is easily detected through visual monitoring using the bar 50. This allows the operator to prevent analysis of the geometric properties having problems due to failure in printing.

Figure 24:
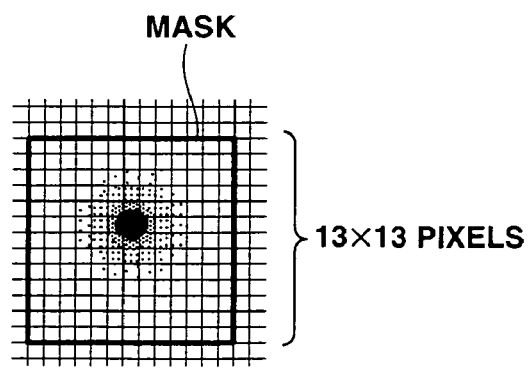
FIG. 24 is a diagram which shows a mask applied to dots for calculating the center of gravity according to the first embodiment.

Then, the arrangement sets a mask for each dot forming a group with the calculated recording position as the center thereof for calculating the center of gravity as shown in FIG. 24. Then, the center of gravity thereof is calculated within the mask. FIG. 24 is a diagram which shows a mask that is set for each dot for calculating the center of gravity.

The mask size is determined such that the center of gravity is calculated without influence of the adjacent dots. As described above, in a case of obtaining an image of a chart wherein each dot is arrayed away from the horizontally and vertically adjacent dots by 5 dots as shown in FIG. 8, with two times resolution of the printing resolution, each dot is arrayed away from the adjacent pixels by 10 pixels in the picked-up chart image. That is to say, in this case, setting a mask having more than 20 pixels of a width in the horizontal direction and more than 20 pixels of a height in the vertical direction with the center pixel of the dot as the center of the mask is affected by the other unintended dots. Accordingly, in this case, a mask with a mask size of around 13×13 pixels is set for each pixel, for example.

Figure 25:
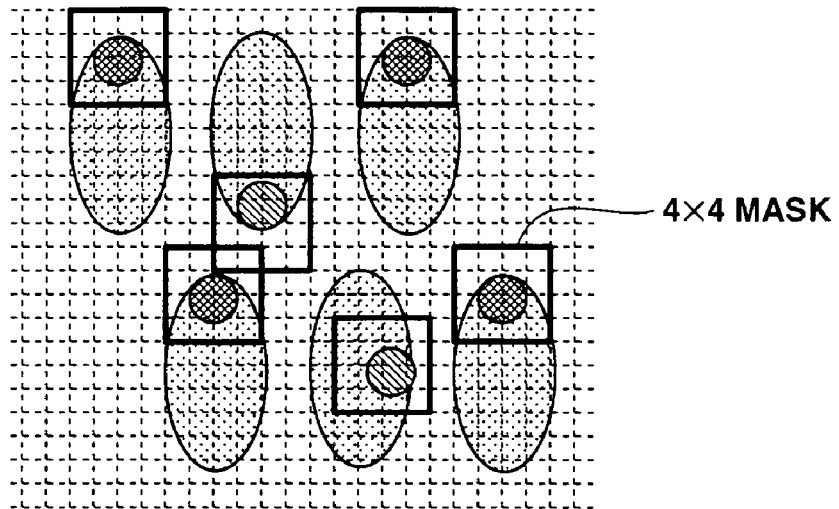
FIG. 25 is a diagram which shows an example of arrangement wherein the mask is designed with a small size corresponding to the mark position which has been estimated with relatively high precision according to the first embodiment.

The mask size is closely related to the geometric property format for designing the chart. That is to say, in a case wherein the position of the mark which is to be detected can be precisely estimated, the mask can be set with a relatively small mask size for the mark as shown in FIG. 25 (a mask is set with a mask size of 4×4 in a case shown in FIG. 25). FIG. 25 is a diagram which shows an example wherein the arrangement estimates relatively precise position of the mark, and set a mask with a small mask size.

As described above, in a case of setting a mask with a relatively small mask size for the chart as shown in FIG. 25, plural marks are not detected in one mask, thereby preventing interference between marks at the time of detection thereof.

Figure 26:
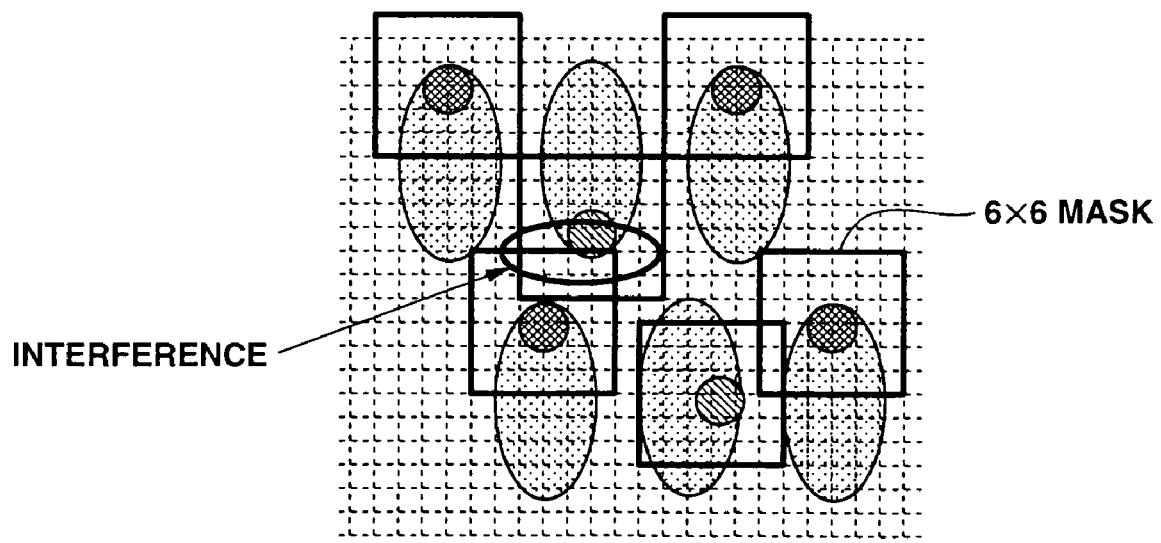
FIG. 26 is a diagram which shows an example of arrangement wherein the mask is designed with a relatively large size corresponding to the mark position which has been estimated with relatively great estimation error according to the first embodiment.

On the other hand, the position of the mark is estimated with a relatively large margin of error, the mask needs to be set with a relatively large mask size. FIG. 26 is a diagram which shows an example wherein the position of the mark is estimated with a relatively large margin of error, and the mask is set with a relatively large size. In FIG. 26, the mask is set with a mask size of 6×6, for example. Here, setting of a mask with such a relatively large mask size even for the chart shown in FIG. 26, which has the same layout structure as with the chart shown in FIG. 25, often leads to interference between the marks at the time of detection thereof.

In such a case, the geometric property format needs to be modified such that the adjacent marks are arrayed more away one from another.

Note that the means for preventing interference at the time of detection of the marks is not restricted to the aforementioned method wherein the geometric property format is modified, rather an arrangement may be made wherein the layout of the reference marks is modified so as to reduce the error in estimating the mark position, or an arrangement may be made wherein the mask size is adjusted for each mark. Note that while a single mask is formed of plural pixels, a mark is formed of a part of the pixels continuously arrayed within the mask. Accordingly, an arrangement may be made giving consideration to the aforementioned fact, wherein plural centers of gravity are calculated for sub-regions within the mask, and the center of gravity closest to the estimated center, or the center of gravity of which the mass (described later) is closest to a predetermined value, is selected as the detected mark position.

Figure 27:
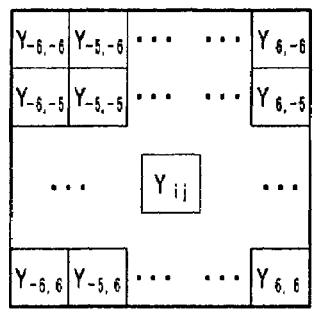
FIG. 27 is a diagram which shows the brightness level and the coordinate point in the mask for calculating the center of gravity of the mark according to the first embodiment.

FIG. 27 is a diagram which shows the brightness levels and coordinate points of the pixels within a mask for calculating the center of gravity of the mark.

Then, as shown in FIG. 27, the brightness level Yij of each pixel within the mask is subtracted from the background level (brightness level in the region having no dots) Ybg, whereby the residue is obtained (in the event that the residue is a negative value, the residue is set to zero), which is defined as the small-area mass Dij as represented by the following Expression 23.

$$D_{ij}=Y_{bg}-Y_{ij}(\text{wherein } D_{ij}\geq 0)$$ [Expression 23]

That is to say, the difference is calculated between the brightness level Yij of each pixel and the background level Ybg, and accordingly, the brightness level Yij is normalized such that the brightness level of the pixels other than the pixels forming the dot becomes zero, thereby preventing influence of the adjacent dots on calculation of the center of gravity in a case wherein the mask is set at a position deviating from the center of the dot.

Then, the arrangement calculates the sum of the moments within the mask, following which the sum is divided by the total mass, whereby the gravity C(Ci, Cj) is calculated as represented by the following Expression 24.

$$C_i = \frac{\sum_{ij} iD_{ij}}{\sum_{ij} D_{ij}}, C_j = \frac{\sum_{ij} jD_{ij}}{\sum_{ij} D_{ij}}$$ [Expression 24]

Note that pre-scanning is more preferably performed for the dots forming the group prior to calculation of the center of gravity for preventing adverse effects due to substandard dot printing, blotting, blurring, soiling near the dots, thereby improving estimation precision. With the pre-scanning, the arrangement performs processing for calculating the centers of gravity once beforehand so as to calculate the reference point and the two unit vectors for each group, and corrects the mask position based upon the results, whereby the mask center position is set to substantially the precise center of gravity of the dot. Furthermore, processing is preferably performed wherein the average mass μ and the standard deviation σ are calculated for each dot beforehand, and the dots having the mass beyond a range of μ±3σ are detected as the substandard dots which are not used for calculation. With such a configuration, the geometric properties are analyzed using only the dots printed with sufficient image quality, thereby enabling analysis with improved precision.

Note that the position serving as the dot position is not restricted to the center of gravity as described above, rather, the geometric center may be employed, or other positions suitable for representing the dot position may be employed. As a method example for calculating the geometric center, a method is known wherein the brightness level Yij for each pixel as shown in FIG. 27 is converted into a binary with a predetermined threshold value so as to obtain the geometric center of the dot pattern having dot values equal to or less than the threshold value.

Then, the reference point M and the two unit vectors are calculated by the fitting unit 13 so as to minimize the sum of squares of the error E between the group of centers of gravity thus calculated and the group of the recording positions calculated based upon the geometric property format using the mechanism as described above, whereby the fitting of the geometric property format is performed.

Figure 28:
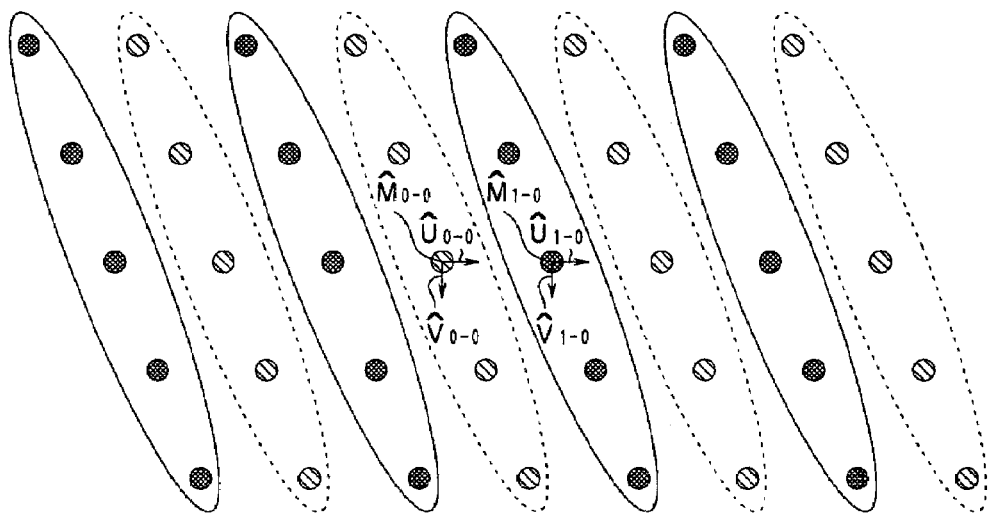
FIG. 28 is a diagram which shows the most likely reference point and two unit vectors calculated for each group according to the first embodiment.

Thus, the most likely reference point M and two unit vectors (unit vector U in the line direction and unit vector V in the recording-medium-transporting direction) are calculated for each group as shown in FIG. 28, for example.

FIG. 28 is a diagram which shows the most likely reference point M and two unit vectors calculated for each group.

As shown in the drawing, the reference point M(hat)0-0 and two unit vectors U(hat)0-0 and V(hat)0-0 are calculated for the group G0-0, and the reference point M(hat)1-0 and two reference vectors U(hat)1-0 and V(hat)1-0 are calculated for the group G1-0.

Then, the state of the two heads is analyzed for the small area based upon the calculated reference point and unit vectors.

Figure 29:
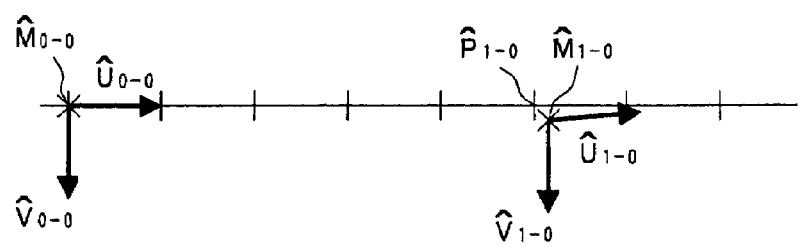
FIG. 29 is a diagram which shows an example of the reference points and the unit vectors calculated for each group, which are used for analyzing the geometric properties according to the first embodiment.

FIG. 29 is a diagram which shows an example of the reference point and unit vectors calculated for each group which are used for analyzing the geometric properties.

Specifically, as shown in FIG. 29, comparison is made for the reference point and the unit vectors within a single group or between different groups, whereby the state of the heads is analyzed as follows.

(1) Analysis of the skew angle of the head 20 (as to the transporting direction) and the resolution in the vertical and horizontal directions based upon the directions and lengths of the unit vector U(hat)0-0 and the unit vector V(hat)0-0 in the small area.

(2) Analysis of the skew angle of the head 21 (as to the transporting direction) and the resolution in the vertical and horizontal directions based upon the directions and lengths of the unit vector U(hat)1-0 and the unit vector V(hat)1-0 in the small area.

(3) Analysis of the relative positional relation between the heads 20 and 21 based upon the reference position M(hat)0-0 and the reference position M(hat)1-0 corresponding to the group reference points.

(4) Analysis of the relative skewing and positional deviation of the nozzles between the heads 20 and 21 based upon the unit vector U(hat)0-0 and the unit vector U(hat)1-0 in the small area.

(5) Analysis of deviation of the transporting amount of the recording medium and deviation of the transporting direction thereof based upon the unit vector V(hat)0-0 and the unit vector V(hat)1-0 in the small area (while such deviation does not occur in normal situations, in some cases, deviation of printing timing between the heads leads to the deviation).

Note that positional deviation between the two heads 20 and 21 may be analyzed as follows, as well, for example.

That is to say, the estimated position P(hat)1-0 of the M(hat)1-0 is obtained as M(hat)0-0+5U(hat)0-0 based upon the geometric property format with the M(hat)0-0 as the reference point. Accordingly, the difference between the estimated reference position P(hat)1-0 calculated based upon the geometric property format and the actual reference position M(hat)1-0 corresponds to estimated likely deviation from the M(hat)1-0.

$$\hat{M}_{1\text{-}0} - \hat{P}_{1\text{-}0} = \hat{M}_{1\text{-}0} - (\hat{M}_{0\text{-}0} + 5\hat{U}_{0\text{-}0})$$

The deviation is calculated in the form of a vector wherein the vector component in the U(hat) direction represents the direction and the amount of the deviation of the arrays of the nozzles in the array direction as shown in FIG. 7. On the other hand, the vector component in the V(hat) direction represents the direction and the amount of the deviation of discharging positions of the nozzles 22 of the head 20 and the nozzles 22 of the head 21.

It is needless to say that an arrangement may be made wherein deviation between the two heads 20 and 21 and the like are analyzed without such calculation by adjusting setting of the reference points or adjusting the dots forming the groups.

Figure 30:
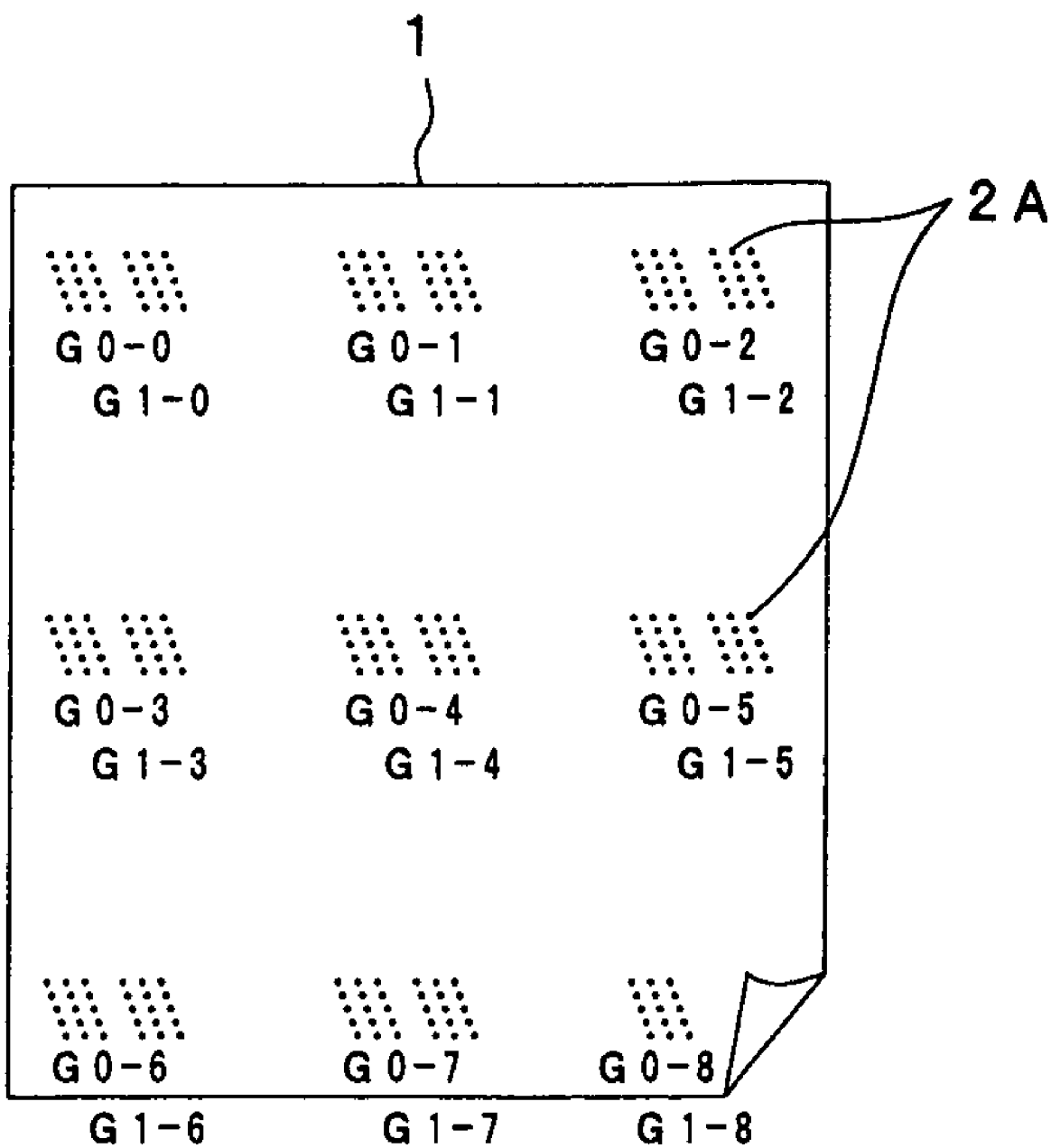
FIG. 30 is a diagram which shows a recording medium on which plural mark groups each of which is formed of different head groups are formed, according to the first embodiment.

While description has been made regarding calculation for the groups G0-0 and G0-1 in a local area, an arrangement may be made wherein plural mark groups 2A including different pairs are formed on a recording medium as shown in FIG. 30, and analysis of the relative relation between different mark groups 2A is made as well as making analysis of the mark group 2A for each local region, thereby analyzing comprehensive printing state of the two heads 20 and 21.

Figure 31:
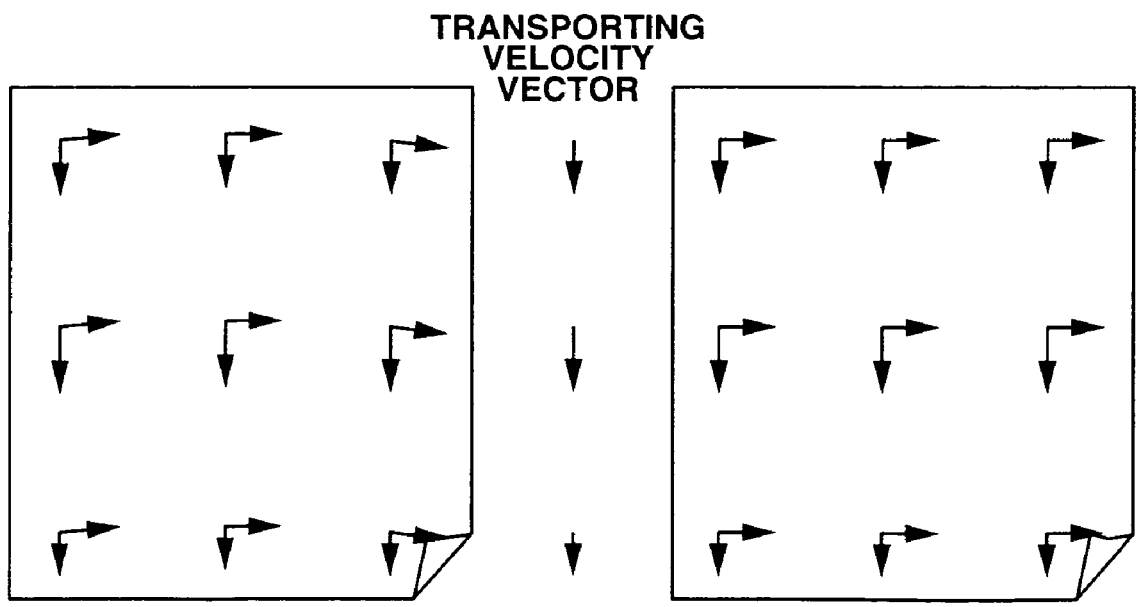
FIG. 31 is a diagram which shows distribution examples of the reference positions and the unit vectors obtained as the analysis results regarding the plural heads according to the first embodiment.

FIG. 30 is a diagram which shows a recording medium wherein the plural mark groups having different pairs, and FIG. 31 is a diagram which shows a distribution example of the reference position and the unit vectors obtained as analysis results regarding plural heads.

For example, the plural mark groups 2A having different pairs are printed on the recording medium 1 as shown in FIG. 30, whereby a test chart is formed. In this case, the analysis results regarding the head 20 is shown in FIG. 31(A), the analysis regarding the head 21 is shown in FIG. 31(B).

In this example, as can be understood from FIG. 31(A), the head 20 is curved with the convex face facing toward the upstream direction in the recording-medium transporting direction (the array of the dots printed by the head 20 is curved with the convex face facing toward the upper direction), and as can be understood from FIG. 31(A) and FIG. 31(B), change in the size of the transporting velocity vector is detected, which indicates irregularities in the recording-medium transporting speed.

With the present embodiment, the analysis results thus obtained are displayed on the display unit 14, thereby allowing the operator to adjust the state of the heads 20 and 21, and adjust the printing parameters.

Furthermore, it is needless to say that the chart data for creating a test chart is not restricted to the examples shown in FIG. 8 and so forth, rather, various kinds of chart data may be employed for creating a test chart corresponding to the geometric properties which are to be analyzed.

Furthermore, an arrangement may be made wherein plural kinds of geometric property formats are designed for analyzing various kinds of situations of deviation of the recording position under the assumption that various kinds of deviation of the recording position may occur. In this case, an arrangement may be made wherein the operator inspects the actual printing results, selects the optimum geometric property format, and a chart is reprinted based upon the optimum geometric property format thus selected. Alternatively, an arrangement may be made wherein plural charts are printed based upon all the plural geometric property formats prepared beforehand, and the most effective chart is selected for analyzing the geometric properties.

More effectively, an arrangement may be made wherein a chart is printed with relatively low recording density such that the geometric properties are analyzed based upon the printing results without interference, following which the optimum geometric property is selected from the aforementioned plural geometric property formats based upon the analysis results. Alternatively, an arrangement may be made wherein the optimum geometric property format having high recording density is designed based upon the first analysis results, and a chart is printed based upon the geometric property format thus designed, thereby enabling more detailed analysis.

On the other hand, the size of the geometric property format is preferably designed corresponding to the size of an image which can be handled with the geometric property analyzing system. That is to say, a chart (chart component) defined by a single geometric property format needs to be analyzed as a single unit, and accordingly, the chart image is preferably formed with a size which can be stored in the image memory provided to the geometric property analyzing system. Accordingly, the size of the geometric property format is preferably determined in advance based upon the size of the image memory, the resolution of the image pickup apparatus, and the resolution of the recording device.

Figure 32:
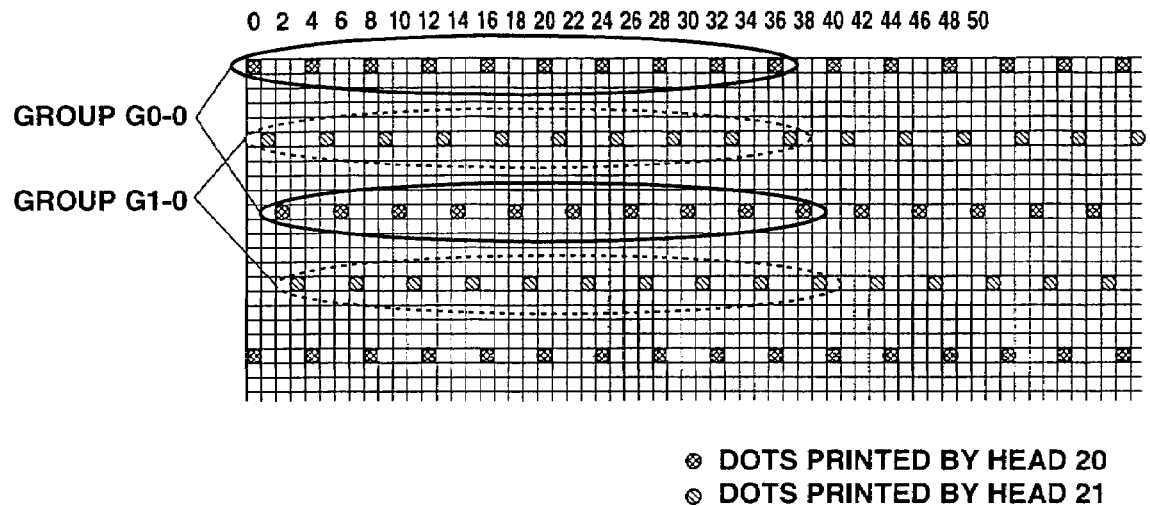
FIG. 32 is a diagram which shows a modification of the chart data according to the first embodiment.

FIG. 32 is a diagram which shows a modification of such chart data.

With an example shown in FIG. 32, the arrangement prints dots with the nozzles of a single head every four dots along a line. Furthermore, the arrangement prints dots on a line as described above with the switched head and with displacement of one dot along the line direction every five lines along the recording-medium-transporting direction.

That is to say, the head 20 records the dots at coordinate points in the line direction of 0, 4, 8, 12, and so on, along a 0'th line, records the dots at coordinate points in the line direction of 2, 6, 10, 14, and so on, along tenth line, and records the dots at the same coordinate points in the line direction as with the 0'th line along the twentieth line.

On the other hand, the head 21 records the dots at coordinate points in the line direction of 1, 5, 9, 13, and so on, along a fifth line, records the dots at coordinate points in the line direction of 3, 7, 11, 15, and so on, along a fifteenth line, and records the dots at the same coordinate points in the line direction as with the fifth line along the twenty-fifth line.

Note that while description has been made mainly regarding arrangements for analyzing the geometric properties of an ink-jet printer, the present invention is not restricted to the aforementioned arrangements, rather, the present invention may be widely applied to arrangements for analyzing the geometric properties of various kinds of devices such as: various kinds of printers such as a laser printer and so forth; recording devices for optically recording an image on a film or the like.

Such a test chart and geometric property analyzing system according to the first embodiment allows the operator to easily analyze the geometric properties of at least one of: a printer serving as a recording device; a paper sheet serving as a recording medium; and a scanner serving as an image pickup apparatus, with high precision, regardless of skill of the operator.

Figure 33:
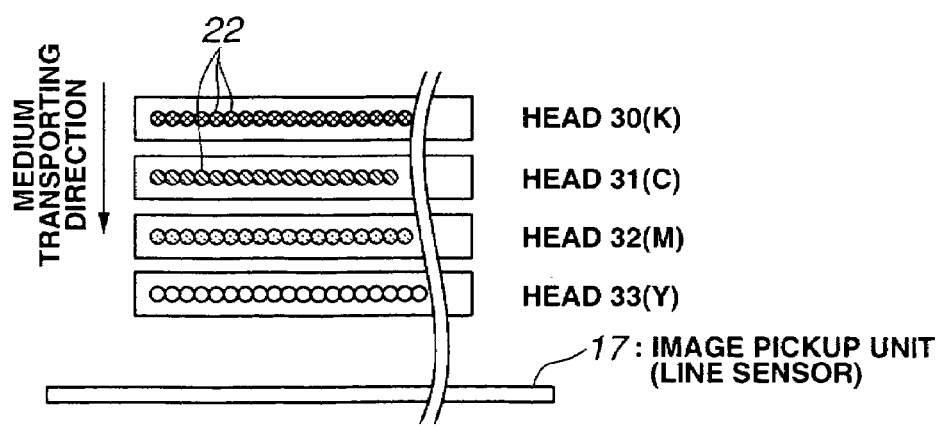
FIG. 33 is a diagram which shows the positional relation between the heads and image pickup unit arrayed along the recording-medium transporting direction according to a second embodiment of the present invention.

FIG. 33 through FIG. 36 show a second embodiment according to the present invention, wherein FIG. 33 is a diagram which shows the positional relation between the heads and the image pickup unit along the recording-medium-transporting direction. In description regarding the second embodiment, description of the same components as with the first embodiment described above will be omitted, and description will be made mainly regarding only different components.

While the arrangement according to the first embodiment has a configuration wherein image data is acquired by a scanner provided separately from the printer, an arrangement according to the second embodiment includes an image pickup unit therein for acquiring image data.

Figure 34:
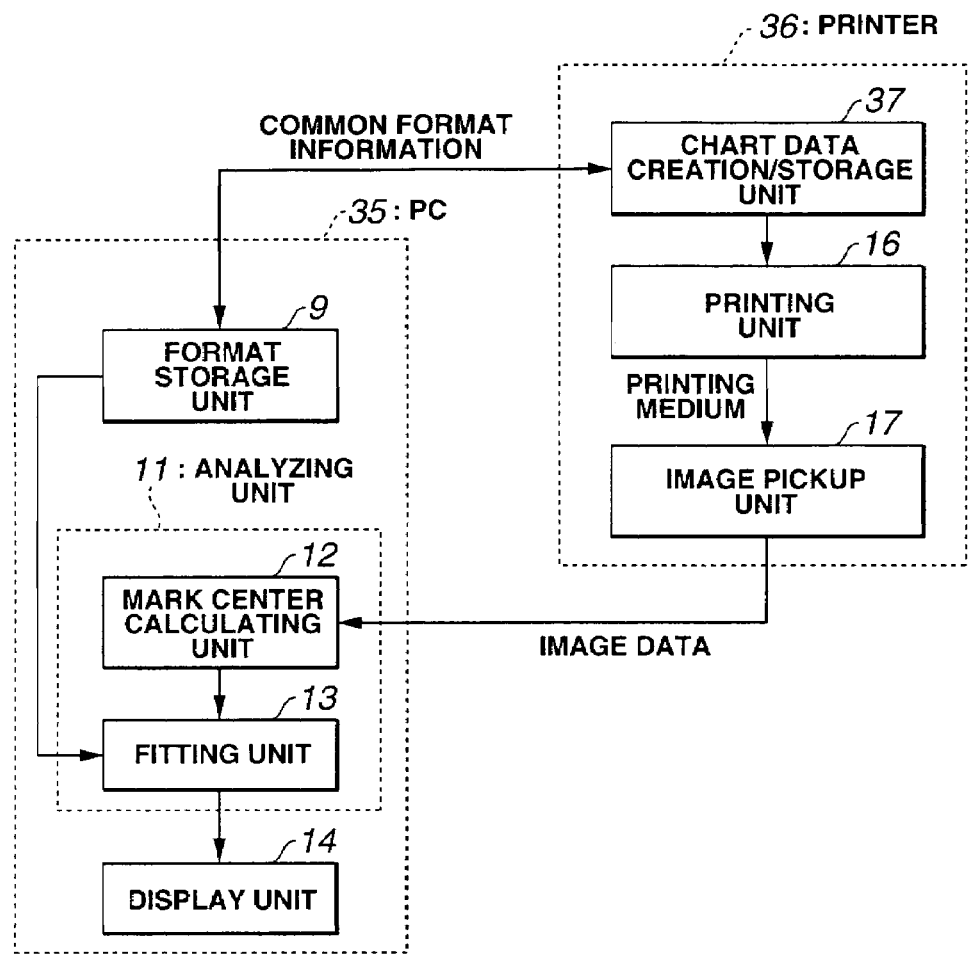
FIG. 34 is a block diagram which shows a configuration of a geometric property analyzing system according to the second embodiment.

FIG. 34 is a block diagram which shows a configuration of the geometric property analyzing system.

As shown in FIG. 34, the geometric property analyzing system according to the present embodiment comprises a personal computer (PC) 35 serving as an analyzing device and a printer 36 serving as both a recording device and an image pickup apparatus.

The PC 35 comprises: the format storage unit 9 for storing the geometric property format; the mark center calculating unit 12 for calculating the center position of each mark based upon the chart image output from the image pickup unit 17; the analyzing unit 11 including the fitting unit 13 for analyzing the geometric properties by calculating the most likely reference point and unit vectors through comparison between the center positions of the marks of the mark group calculated by the mark center calculating unit 12 and the geometric property format read out from the format storage unit 9; and the display unit 14 for displaying the analysis results analyzed by the analyzing unit 11.

On the other hand, the printer 36 comprises: a chart data creation/storage unit 37 for creating and storing chart data based upon the geometric property format which is the same as the geometric property format stored in the format storage unit 9; the printing unit 16 for creating a test chart by printing (recording) chart data read out from the chart data creation/storage unit 37 on a printing medium (recording medium); and the image pickup unit 17 for creating a chart image by scanning the test chart created by the printing unit 16.

With such a configuration, FIG. 33 shows the positional relation between the ink-jet heads 30, 31, 32 and 33 of printing unit 16 and the image pickup unit 17.

The printing unit 16 comprises: a head 30 for printing an image in black (K); a head 31 for printing an image in cyan (C); a head 32 for printing an image in magenta (M); and a head 33 for printing an image in yellow (Y), arrayed in that order from the upstream side to the downstream side along the recording-medium-transporting direction. With such a configuration, printing is made by the heads 30, 31, 32, and 33, serving as recording means, in that order while transporting the recording medium, whereby color printing is performed.

On the other hand, the image pickup unit 17 comprises a line sensor with a line length sufficient for optically reading an image with a certain printing length printed by the head 30, and is mounted downstream from all the heads 30, 31, 32, and 33, forming the printing unit 16, along the recording-medium-transporting direction.

Figure 35:
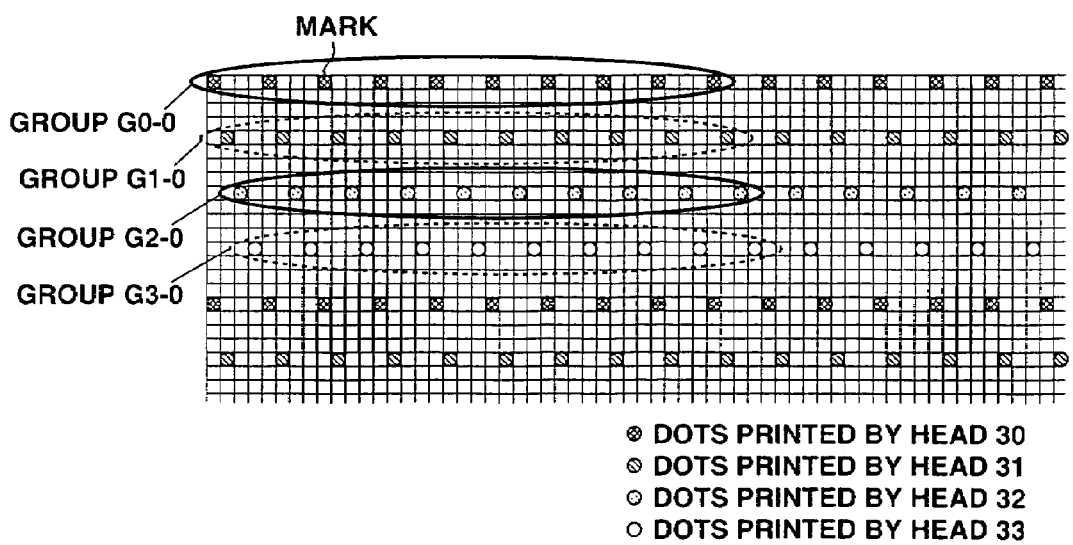
FIG. 35 is a diagram which shows an example of chart data according to the second embodiment.

On the other hand, chart data shown in FIG. 35 is desirable for the geometric property analyzing system having such a configuration, for example. That is to say, FIG. 35 shows an example of chart data.

With an example shown in FIG. 35, the arrangement prints dots with the nozzles of a single head every four dots along a line. Furthermore, the arrangement prints dots on a line as described above with the switched head and with displacement of one dot along the line direction every four lines along the recording-medium-transporting direction.

That is to say, the head 30 records the dots at coordinate points in the line direction of 0, 4, 8, 1, and so on, along a 0'th line. In this case, the head 30 records the dots at the same coordinate points in the line direction as with the 0'th line along the sixteenth line.

On the other hand, the head 31 records the dots at coordinate points in the line direction of 1, 5, 9, 13, and so on, along a fourth line, and so on in the same way. In this case, the head 31 records the dots at the same coordinate points in the line direction as with the fourth line along the twentieth line.

On the other hand, the head 32 records the dots at coordinate points in the line direction of 2, 6, 10, 14, and so on, along an eighth line, and so on in the same way. In this case, the head 32 records the dots at the same coordinate points in the line direction as with the eighth line along the twenty-fourth line.

On the other hand, the head 33 records the dots at coordinate points in the line direction of 3, 7, 11, 15, and so on, along a twelfth line, and so on in the same way. In this case, the head 33 records the dots at the same coordinate points in the line direction as with the twelfth line along the twenty-eighth line.

Note that both marks according to the present second embodiment and the first embodiment described above are not restricted to one formed of a single dot, rather the single mark may be formed of plural dots as described in FIG. 36, for example.

FIG. 36 is a diagram which shows various kinds of marks formed of one or more dots.

FIG. 36(A) shows a mark formed of a single dot as described above.

FIG. 36(B) shows a mark formed of two dots arrayed in the line direction.

FIG. 36(C) shows a mark formed of two dots arrayed in the recording-medium-transporting direction.

FIG. 36(D) shows a mark formed of four dots arrayed in the shape of a square of (2×2) dots.

FIG. 36(E) shows a mark formed of six dots arrayed in the shape of a rectangle of (3 dots in the line direction×2 dots in the recording-medium-transporting direction).

FIG. 36(F) shows a mark formed of six dots arrayed in the shape of a rectangle of (2 dots in the line direction×3 dots in the recording-medium-transporting direction).

FIG. 36(G) shows a mark formed of nine dots arrayed in the shape of a square of (3×3) dots.

FIG. 36(H) shows a mark formed of five dots arrayed in the shape of a cross.

Note that the marks according to the present invention are not restricted to the aforementioned arrangements, rather, various kinds of marks in a desirable shape may be used as long as a representative point (e.g., the center of gravity, the geometric center, and so forth, as described above) can be determined therewithin.

Next, description will be made regarding the operation of the geometric property analyzing system having such a configuration. While the operation thereof is substantially the same as with the first embodiment as described above, the main difference therebetween is that image picking-up is performed during transport of the recording medium within the printer 36 at the same time of recording an image on the recording medium, unlike the arrangement according to the first embodiment wherein a recording medium on which recording (printing) has been performed is transported to a scanner so as to perform image picking-up.

That is to say, with the present embodiment, the chart data stored in the chart data creation/storage unit 37 is read out for each line while transporting the recording medium, and is printed with the four heads 30, 31, 32, and 33, provided to the printing unit 16, in that order, whereby a test chart is formed in units of a line based upon the chart data as shown in FIG. 35.

The lines of the test chart are recorded on the recording medium by the heads 30, 31, 32, and 33, corresponding to four colors, while the recording medium passes over these heads. Furthermore, the recording medium is transported, and reaches the position where the image pickup unit 17 is mounted. At this time, images of the lines of the test chart are picked up by the image pickup unit 17, and the picked-up image data is output to the PC 35 as a chart image.

The PC 35 detects the center of the mark with the mark center calculating unit 12 of the analyzing unit 11 based upon the input chart image for the four groups of G0-0, G1-0, G2-0, and G3-0, each of which are formed of ten marks printed by the corresponding head of the heads 30, 31, 32, and 33. Note that the following operation is the same as with the first embodiment described above.

Note that while description has been made regarding an arrangement according to the present embodiment wherein the PC 35 includes the format storage unit 9 therein, and the printer 36 includes the chart data creation/storage unit 37 therein, it is needless to say that the arrangement may have the same configuration as with the first embodiment described above as shown in FIG. 6.

Such an arrangement according to the second embodiment has a configuration wherein the printer includes the image pickup unit therewithin, and accordingly, a scanner does not need to be prepared as a unit separate from the printer, thereby having the advantage of allowing the user to analyze the geometric properties without troublesome setting of the recording medium to the scanner or the like, as well as the same advantage as with the first embodiment described above. Furthermore, with the present embodiment, the transporting system for transporting a recording medium of the printer is used for both printing and picking up images, accordingly, the recording medium is transported with high repeatability of the positional relation between the printed test chart and the picked-up chart image, thereby reducing costs of the transporting system.

Furthermore, with an arrangement wherein each mark is formed of plural dots adjacent one to another, the mark can be detected in a sure manner even if the image pickup unit has relatively low resolution. Furthermore, such a large-area mark is insusceptible to noise due to deformation of the dot, soiling, blurring, and so forth, thereby facilitating geometric property analysis.

Figure 37:
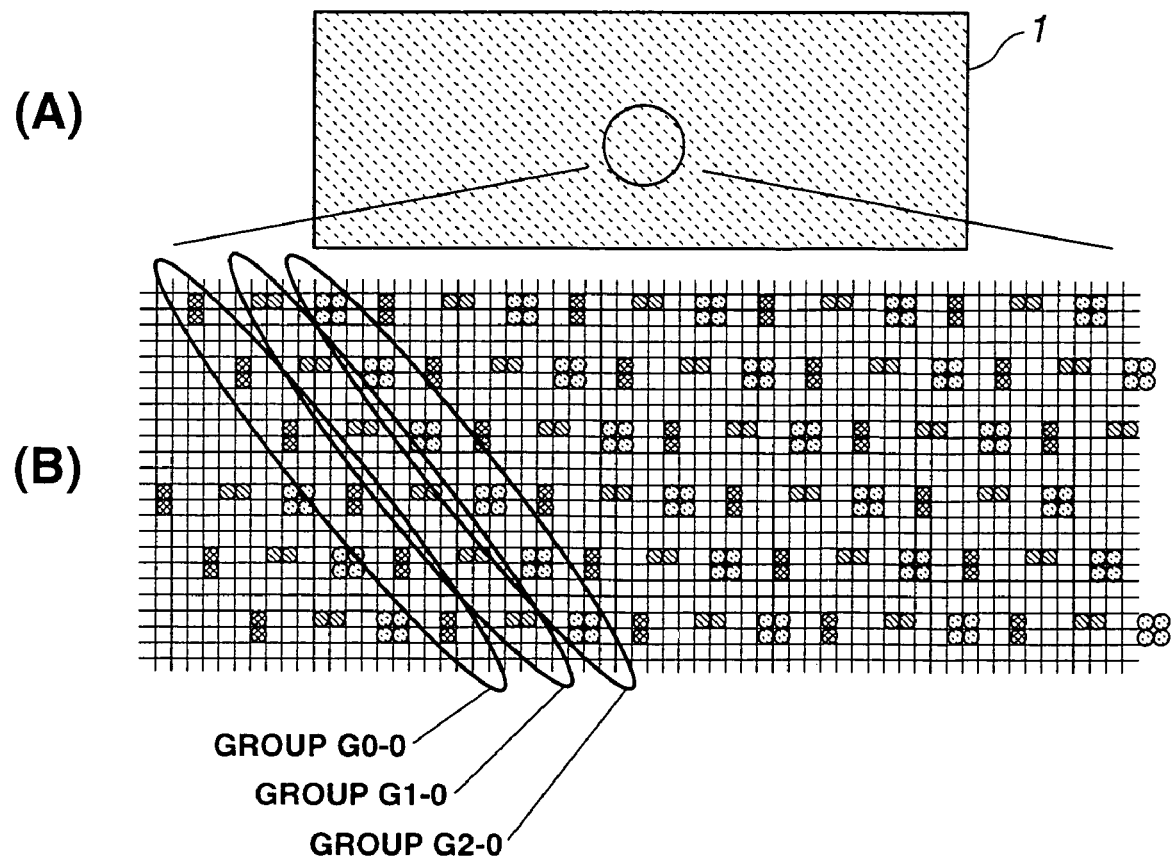
FIG. 37 is a diagram which shows an example of a test chart wherein the marks are recorded in different shapes for each group on a recording medium according to a third embodiment of the present invention.

FIG. 37 is a diagram which shows an example of a test chart wherein the marks are formed in different shapes for each group recorded on the recording medium 1 according to a third embodiment of the present invention. Note that description of the same components as with the first and second embodiments described above will be omitted, description will be made mainly regarding only different components.

With the first embodiment described above, the arrangement detects the representative points (e.g., the upper-left dot and the lower-right dot) in the chart image in order to determine by which head of the two heads each mark has been printed. However, such a method has a problem that the geometric property analysis cannot be made in a case wherein the arrangement cannot detect the representative points due to substandard printing.

On the other hand, the second embodiment described above is applied to a color printer, and accordingly, the marks are printed in different colors for each group by the color printer. Accordingly, an arrangement according to the second embodiment wherein a color sensor is employed as the line sensor or the like of the image pickup unit 17 has the advantage of allowing the operator to analyzing the geometric properties of the four heads based upon any local region alone in the chart printed on a recording face of the recording medium.

On the other hand, with the present third embodiment, the marks are formed with different shapes, sizes, or the like, for each group, thereby having the advantage of allowing the operator to analyze the geometric properties using a monochrome sensor even in a case of substandard printing of the representative dots, regardless of the printer type such as a color printer or a monochrome printer.

FIG. 37(A) shows the layout structure formed on the recording medium 1 according to the present embodiment, and FIG. 37(B) shows the layout structure thereof in further detail.

That is to say, the marks recorded in the test chart are classified into three groups of G0-0, G1-0, and G2-0, wherein the marks belonging to the group G0-0 are formed of two dots arrayed in the recording-medium-transporting direction as shown in FIG. 36(C), the marks belonging to the group G1-0 are formed of two dots arrayed in the line direction as shown in FIG. 36(B), and the marks belonging to the group G2-0 are formed of four dots arrayed in the shape of a square of (2×2) as shown in FIG. 36(D).

Note that the marks which belongs to each group are arrayed along the recording-medium-transporting direction so as to slant to the line direction in the same way as with the arrangement shown in FIG. 8.

Such an arrangement according to the third embodiment has a configuration wherein the marks are formed in different shapes for each group which is to be analyzed, thereby having the advantage of allowing the operator to analyze the geometric properties based upon any local region alone even in a case of employing a monochrome sensor, as well as substantially the same advantages as with the first and second embodiment.

Strictly, the geometric properties obtained and analyzed by the arrangements according to the first through third embodiments described above include: the geometric properties of the recording device; the geometric properties of the recording medium; and the geometric properties of the image pickup apparatus. In normal cases, the geometric properties of the recording medium and the geometric properties of the image pickup apparatus are maintained within a generally permissible range. Accordingly, while description has been made regarding an arrangement wherein the geometric properties of the recording device are mainly analyzed, it is needless to say that the present invention is not restricted to the aforementioned arrangements.

For example, with an arrangement wherein a test chart is formed by casting a laser beam on a film or a printing paper, it is thought that the geometric properties of the recording device and the geometric properties of the recording medium are maintained with a generally permissible range. Accordingly, in this case, such a geometric property analyzing system is used mainly for analyzing the geometric properties of the image pickup apparatus. Note that the geometric property analyzing system for analyzing such geometric properties may have a configuration wherein the chart data creating unit 10 of the PC 5 and the printer 6 shown in FIG. 6 are omitted, for example.

Let us say that the test chart image having such a layout structure is picked up by the scanner 7 including the image pickup unit 17 comprising a line sensor so as to analyze the geometric properties with the analyzing unit 11 of the PC 5, whereby the analysis results are obtained as shown in FIG. 31(A) described above, for example. In this case, the operator determines that the line sensor of the scanner 7 is curved with the convex face facing toward the lower direction, and the line sensor is moved with detectable irregularities in the moving speed.

Alternatively, with an arrangement wherein the geometric properties of the recording device and the image pickup apparatus are adjusted with high precision, the operator can determine that deviation of the geometric properties of the chart image thus read out indicate extension or distortion of the recording medium.

As described above, the geometric property analyzing system may be used for analyzing the geometric properties of at least one of the recording device and the recording medium and the image pickup apparatus, or of a desired combination of two or more thereof.

Now, description will be made regarding a method wherein the geometric properties of the recording device are analyzed based upon the geometric properties determined beforehand with respect to the image pickup apparatus.

The geometric property analyzing system comprises: a recording device for recording a test chart on a recording medium based upon chart data created based upon the geometric property format; an image pickup apparatus for acquiring a chart image by picking up the test chart recorded by the recording device; and an analyzing device for analyzing the geometric properties based upon the chart image acquired by the image pickup apparatus.

With such a configuration, a 2×2 matrix P3 formed of a pair of independent unit vectors in the chart image which is to be analyzed by the analyzing device is calculated as follows. That is to say, the geometric properties T1 of the recording device, the geometric properties T2 due to the physical layout of the recording medium as to the image pickup apparatus, and the geometric properties T3 of the image pickup apparatus, are applied to a 2×2 matrix P formed of a pair of independent unit vectors created based upon the geometric property format, in that order, whereby P3 is obtained as represented by the following Expression 26.

$$P3 = T3 \cdot T2 \cdot T1 \cdot P$$

Here, each of the geometric properties T1, T2, and T3, are represented in the form of a 2×2 matrix.

Note that the geometric properties T1 mainly include: deviation of the head (which can be deemed to be skewing of the head from the local perspective); the pitch of the nozzles; the recording-medium-transporting pitch, as parameters. On the other hand, the geometric properties T2 mainly include rotational parameters, and the geometric properties T3 mainly include distortion of the line sensor (which can be deemed to be skewing of the sensor from the local perspective); the sensor resolution; and the resolution in the transporting direction, as parameters.

That is to say, the geometric properties includes seven parameters. On the other hand, the above Expression 26 formed of the 2×2 matrix introduces only four simultaneous equations. Accordingly, the geometric properties T1 of the recording device cannot be calculated under the aforementioned conditions.

Accordingly, with the present embodiment, another reference chart having known geometric properties T1 is prepared. A chart pattern formed on a film or the like by a laser beam printing based upon the chart data as described above may be employed as the reference chart, for example. With the 2×2 matrix formed of a pair of independent unit vectors obtained based upon the reference chart, being P1, the following Expression 27 holds.

$$P1 = T1 \cdot P \quad \text{[Expression 27]}$$

Note that the geometric properties T1 is known as described above, and accordingly, P1 is known, as well.

Let us say that an image of the reference chart is picked up by the image pickup apparatus, and the analyzing device analyzes the geometric properties based upon the acquired chart image. In this case, the 2×2 matrix P3 formed of a pair of independent unit-vectors in the chart image which is to be analyzed is represented by the following Expression 28 using the above matrix P1.

$$P3 = T3 \cdot T2 \cdot P1$$

The matrix expression includes four parameters, and introduces four simultaneous equations, and accordingly, the geometric properties T2 and T3 can be obtained under the conditions.

Of these geometric properties thus obtained, change in the position of the recording medium on the image pickup apparatus leads to change in the geometric properties T2, i.e., the geometric properties T2 change for each analysis. On the other hand, the other geometric properties T3 are specific to the image pickup apparatus, thereby maintaining the geometric properties T3 constant. Accordingly, the geometric properties T3 thus obtained can be used for other analysis. In this case, the geometric properties T3 includes the three parameters, and accordingly, the three of the aforementioned seven parameters are known, thereby introduced four simultaneous equations including only the four parameters can be solved.

That is to say, the inverse matrix $T3^{-}(-1)$ (the symbol "$^{-}(-1)$" represents an inverse matrix) for the geometric properties T3 thus obtained is calculated so as to be applied to the geometric properties P3, whereby the matrix P2 can be obtained, which are formed of a pair of independent unit vectors in the stage where the geometric properties T1 of the recording device and the geometric properties T2 which represent the physical layout of the recording medium on the image pickup apparatus, are applied to the matrix P.

$$P2 = T3^{-}(-1) \cdot P3 \quad \text{[Expression 29]}$$
$$= T3^{-}(-1) \cdot T3 \cdot T2 \cdot T1 \cdot P = T2 \cdot T1 \cdot P$$

The Expression 29 introduces four simultaneous equations including the four parameters as described above, and accordingly, each of the unknown parameters can be calculated, thereby obtaining the geometric properties T1 of the recording device which are to be analyzed.

As described above, with the present embodiment, an image of the reference chart is picked up in order to analyze the geometric properties T3 of the image pickup apparatus prior to a calculation of the geometric properties T1 of the recording device, thereby enabling high-precision measurement of the geometric properties T1 of the recording device and the geometric properties T2 which represent the physical layout of the recording medium on the image pickup apparatus.

Figure 38:
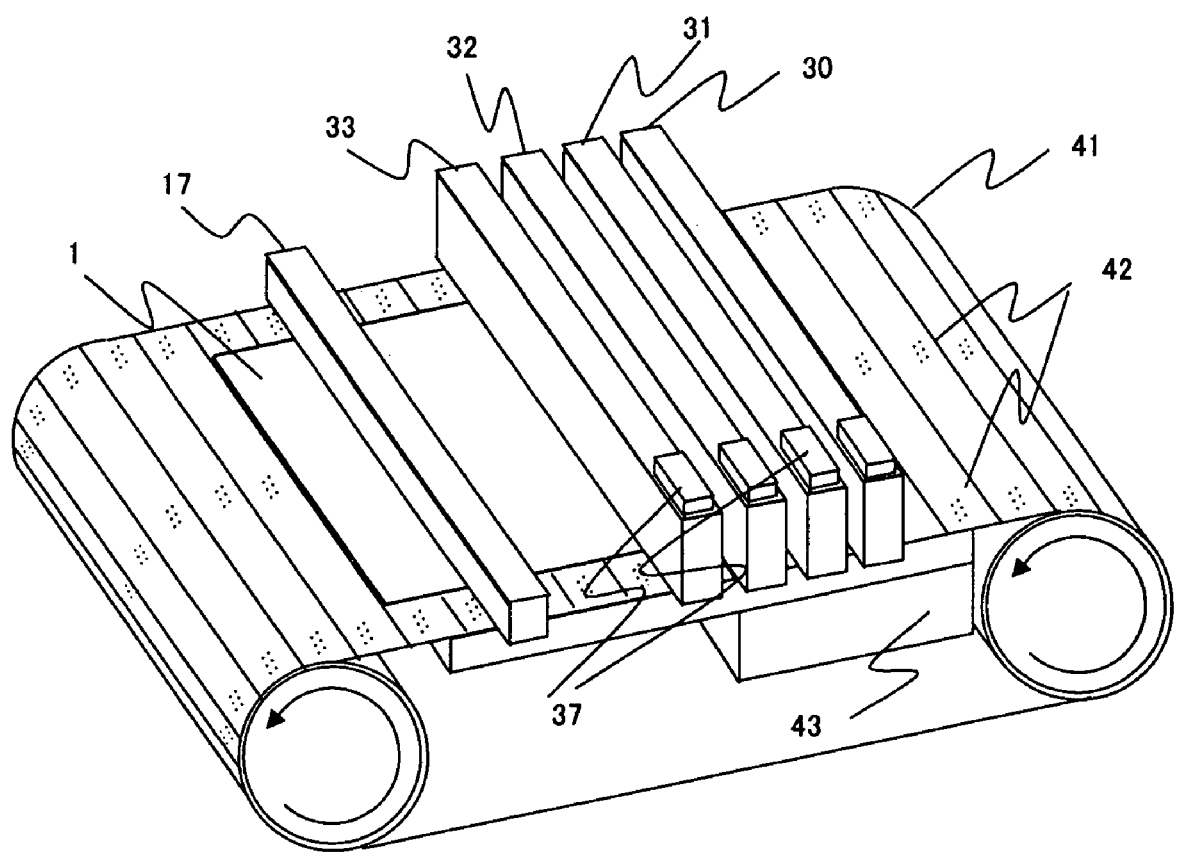
FIG. 38 is a perspective view which shows a part of a configuration of a geometric property analyzing system according to a fourth embodiment of the present invention.

FIG. 38 shows a fourth embodiment of the present invention, and is a perspective view which shows a part of a configuration of the geometric property analyzing system. With the fourth embodiment, description will be omitted regarding the same components as with the first embodiment through third embodiment described above, and description will be made mainly regarding different components.

The geometric property analyzing system according to the fourth embodiment has a configuration wherein a recording medium on which a test chart is recorded, i.e., a recording medium on which printing is made, is transported through a transporting belt.

That is to say, the heads 30, 31, 32, and 33, and the image pickup unit 17 formed of a line sensor or the like, are arrayed along the direction for transporting the recording medium 1 on which printing is made, as shown in FIG. 33.

The recording medium 1 is transported through a transporting belt 41 formed of an endless belt. The transporting belt 41 also serves as a recording medium on which a mark group 42 formed of openings are formed (recorded) according to chart data.

A vacuum mechanism 43 serving as suctioning means which employs a suctioning pump is mounted at a reverse side of the belt face on which the recording medium 1 of the transporting belt 41 is closely contacted. The vacuum mechanism 43 suctions the recording medium 1 through the mark group 42, which partly serves for openings, to tightly fix the recording medium 1 to the transporting belt 41. This mechanism improves recording precision on the recording medium 1.

While description has been made regarding an arrangement wherein the marks of the mark group 42 are formed of openings serving partly for air-suctioning openings, it is needless to say that an arrangement may be made wherein these marks may be recorded by printing or the like when the mark group 42 does not serve partly for air-suctioning openings.

While description has been made regarding an arrangement wherein the mark group 42 is provided to the transporting belt 41 for analyzing the geometric properties thereof, an arrangement may be made wherein each of the heads 30, 31, 32, and 33, includes the geometric property format and the corresponding chart data creation/storage unit 37 integrally mounted thereon for storing the chart data created based upon the chart data, thereby allowing the user to print the marks on the recording medium 1 based upon the chart data stored in the chart data creation/storage units 37, whereby the test chart is created, as shown in FIG. 38, which is partly used.

That is to say, in many cases, the geometric properties of the recording device which are to be analyzed are dependent upon the head, and accordingly, analysis is preferably made for each head. With the present embodiment, each of the chart data creation/storage units 37 mounted on the heads 30, 31, 32, and 33, stores the corresponding chart data, thereby enabling suitable analysis for each head of the heads 30, 31, 32, and 33.

With such a configuration, the chart data is not created on the PC, unlike the first embodiment through the fourth embodiment described above. Accordingly, with the present embodiment, the geometric property format stored in the chart data creation/storage unit 37 is transmitted, as well as the image data at the time of analysis in the analyzing unit of the PC, to the analyzing unit.

Alternatively, an arrangement may be made wherein the PC stores plural geometric property formats beforehand, determines based upon which geometric property format the test chart that is to be analyzed is created, and selects one from the geometric property formats stored in the PC based upon the determination results, and the geometric property format thus selected is used in the analyzing unit. In this case, the chart data creation/storage unit 37 does not need to store the geometric property format, and should store only the information which allows determination based upon which geometric property format the stored test chart is created.

In general, replacement of the head is performed for each head unit, and accordingly, the chart data creation/storage unit 37 is replaced at the same time. Accordingly, at the time of mounting a new head, the optimum chart data is stored for the new head.

The arrangements according to the fourth embodiment have a configuration wherein the transporting belt serving as a recording medium forms the marks which allow analysis of the geometric properties thereof and functions as the test chart, thereby having the advantage of detecting irregularities in transporting actions of the transporting belt, skewing thereof, meandering thereof, and the like, without printing of any test chart on a recording medium such as a paper sheet or the like, as well as substantially the same advantages as with the first through third embodiments described above.

Furthermore, the arrangement having a configuration wherein the marks serve partly for suctioning openings improves printing precision.

Furthermore, the arrangement having a configuration wherein each head includes the chart data creation/storage unit mounted thereon allows the operator to easily perform a test with high precision after replacement of the head.

Figure 39:
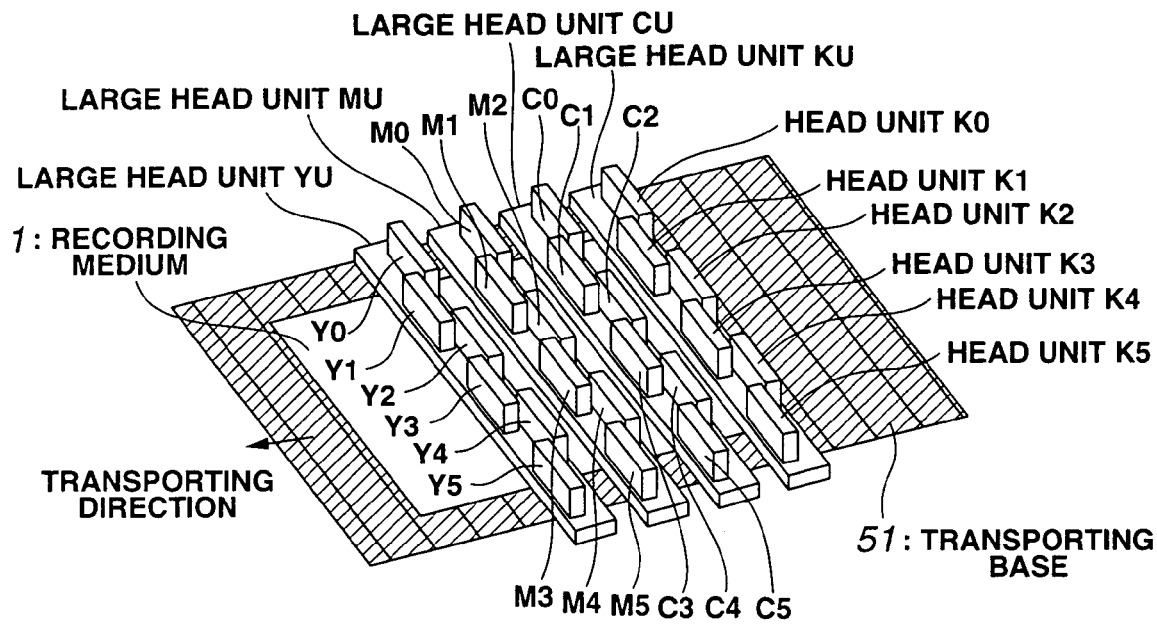
FIG. 39 is a perspective view which shows an example of arrangement wherein the geometric property analyzing system according to a fifth embodiment of the present invention is applied to a recording device having a function for printing an image in four colors of K, C, M, and Y.

FIG. 39 through FIG. 49 show a fifth embodiment, wherein FIG. 39 is a perspective view which shows an arrangement wherein the geometric property analyzing system according to the present invention is applied to a recording device having a function for printing an image in four colors of K, C, M, and Y. In description regarding the fifth embodiment, description will be omitted regarding the same components as with the first through fourth embodiments described above, and description will be made mainly regarding only different components.

The recording device according to the present embodiment has a configuration wherein the recording medium 1 is put on a transporting base 51 so as to be transported as shown in FIG. 39, and printing is made on the recording medium 1 at the time when the recording medium 1 is passing through the positions where large head units are mounted, each of which has a function for recording an image in a predetermined color, during transporting thereof. The large head units for various colors respectively include: a large black head unit KU; a large cyan head unit CU; a large magenta head unit MU; and a large yellow head unit YU, arrayed in that order from the upstream side toward the downstream side in the transporting direction, wherein the nozzles are arrayed along the direction substantially orthogonal to the transporting direction.

More specifically, each of the large head units is formed of six head units, wherein the large black head unit KU includes head units K0 through K5; the large cyan head unit CU includes head units C0 through C5; the large magenta head unit MU includes head units M0 through M5; and the large yellow head unit YU includes head units Y0 through Y5.

Figure 40:
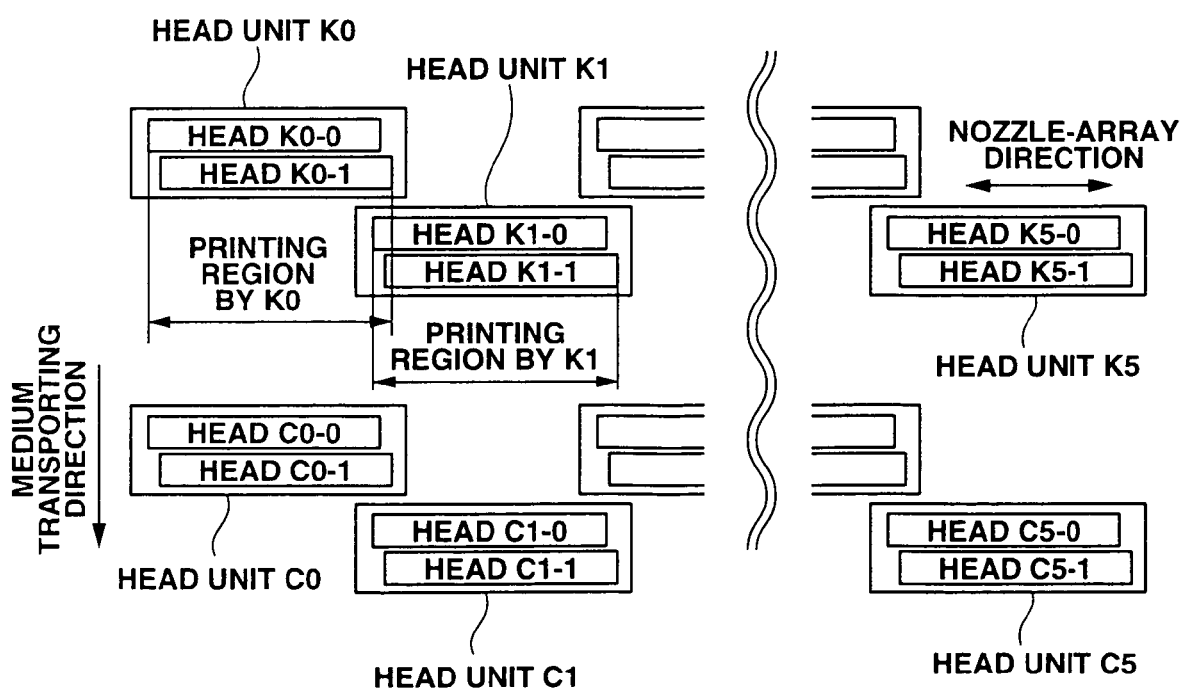
FIG. 40 is a diagram which show the positional relation between heads with the black (K) head and the cyan (C) head as an example according to the fifth embodiment.

FIG. 40 is a diagram which shows an example of the positional relation of the black (K) heads and the cyan (C) heads of each of the aforementioned heads.

As shown in the drawing, the six head units K0 through K5 forming the large black head unit KU are arrayed so as to extend along the nozzle-array direction (direction substantially orthogonal to the transporting direction), and so as to be alternately displaced in the transporting direction with overlapped portions formed of parts of the printing regions of the heads adjacent one to another.

Furthermore, each of these head units K0 through K5 have a configuration wherein two heads are fixed one to another with phase displacement of half the pitch of the nozzle array for improving resolution in the same way as in FIG. 7. Specifically, the head unit K0 is formed of the head K0-0 and the head K0-1 fixed one to another. In the same way, the head unit K1 is formed of the head K1-0 and the head K1-1 fixed one to another; the head unit K2 is formed of the head K2-0 and the head K2-1 fixed one to another; the head unit K3 is formed of the head K3-0 and the head K3-1 fixed one to another; the head unit K4 is formed of the head K4-0 and the head K4-1 fixed one to another; and the head unit K5 is formed of the head K5-0 and the head K5-1 fixed one to another.

On the other hand, the large cyan head unit CU is formed in the same way as with the large black head unit KU.

Furthermore, these large head units are arrayed with displacement in the transporting direction so as to cover substantially the same printing region, i.e., such that the positions of these large head units in the line direction matches one another.

Note that the large head units for other colors have: the same layout of the head units and the heads therein; and the same positional relation between the large head units, as described above.

With such a recording device, precise measurement of the geometric properties (position, skew angle) of each head which is a part of the recording device, and precise adjustment of the positional relation thereof, allow more precise recording. Accordingly, description will be made regarding an adjusting method which allows high-precision-recording, and a chart used for such adjustment.

Figure 41:
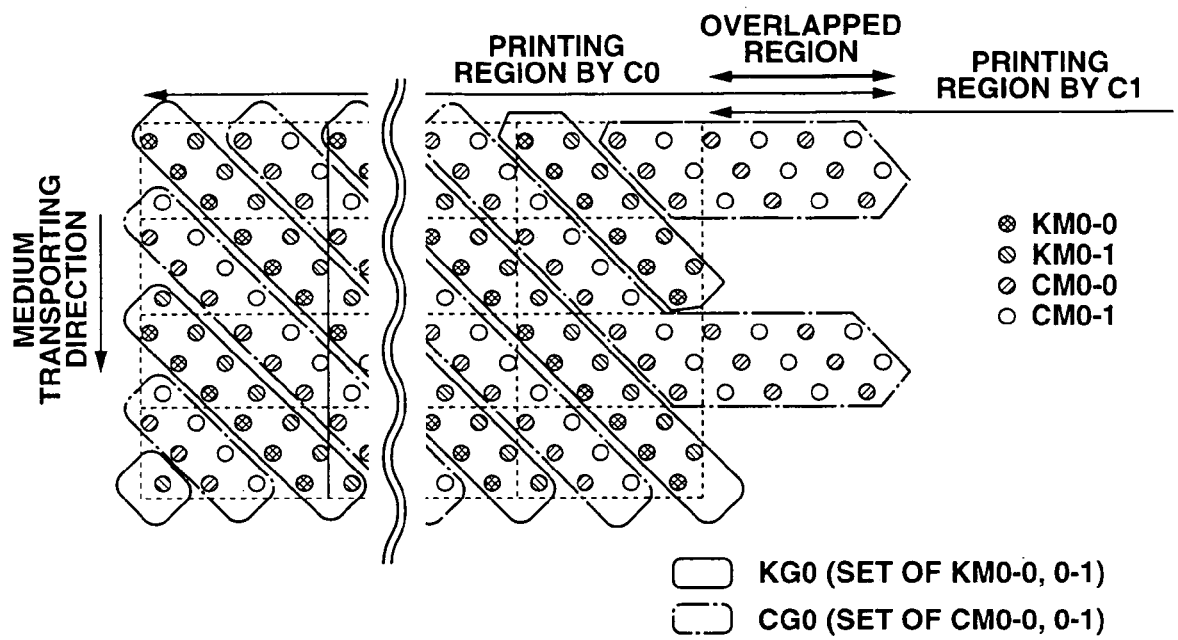
FIG. 41 is a diagram which shows a model of the chart components recorded by the head units K0 and C0 according to the fifth embodiment.

FIG. 41 is a diagram which shows a model of a chart component forming the head units K0 and C0.

Here, the geometric property format is designed such that the same number of the marks KM0-0, KM0-1, CM0-0, and CM0-1, which are printed by the heads K0-0, K0-1, C0-0, and C0-1, respectively, forming the head units K0 and C0, are formed on each line, and each chart component formed of the corresponding kind of marks is arrayed in substantially the same region.

In this case, the chart layout is designed so as to allow more high-precision detection of the positional relation between these heads. The layout model shown in the drawing is a simple example thereof, and the practical chart layout is designed with a suitable layout and number of the marks so as to allow detection of the marks without interference therebetween giving consideration to the required precision of the geometric properties which are to be obtained, and the performance of the analyzing device.

Here, description has been made regarding the geometric properties of the two heads within the head unit, and accordingly, description will be made below under the assumption that the head unit can be regarded as a single head. That is to say, description will be made regarding the heads K0-0 and K0-1 with the head unit K0 as a unit, for example.

In this case, as shown in FIG. 41, the marks (KM0-0, KM0-1) printed by the head unit K0 are grouped into a chart component KG0. In the same way, the marks (CM0-0, CM0-1) printed by the head unit C0 are grouped into a chart component CG0.

Figure 42:
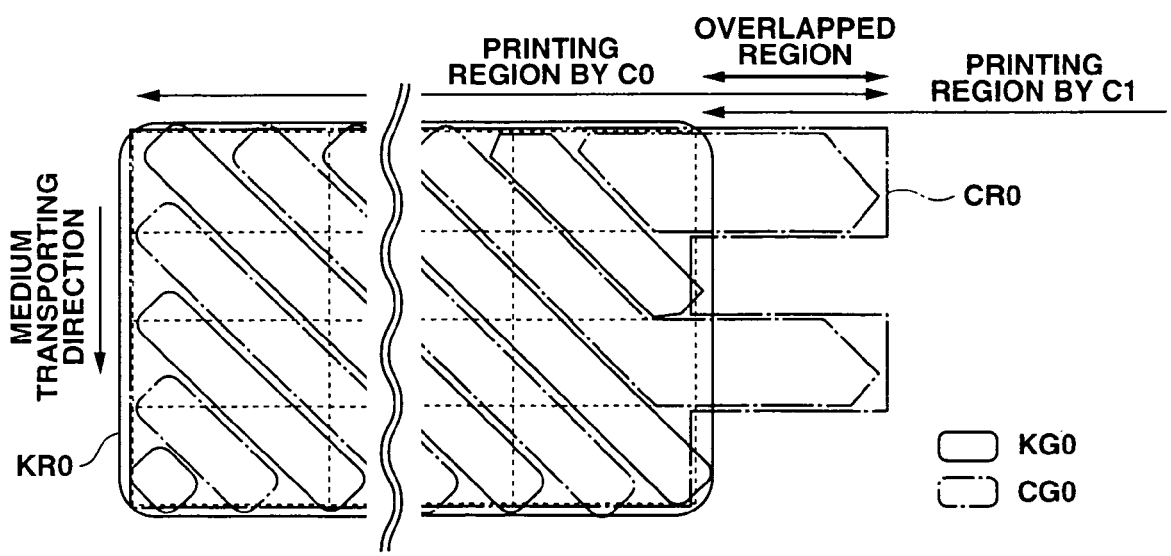
FIG. 42 is a diagram which shows the rough shapes KR0 and CR0 of the chart components KG0 and CG0 shown in FIG. 41.

FIG. 42 is a schematic diagram which shows structures KR0 and CR0 of the chart components KG0 and CG0 shown in FIG. 41, respectively.

In this case, the layout structure needs to be designed such that the marks are printed by the adjacent head units without interference therebetween in overlapped regions where printing regions of the adjacent head units may be overlapped one another. While various kinds of layout design are known, FIG. 42 shows a layout structure example wherein the chart component in the overlapped region for each head unit is designed in the shape of a comb, and the comb-shaped chart components for the adjacent head units are arrayed so as to mesh with each other, thereby enabling calculation while suppressing adverse effects due to relatively low-frequency deviation.

Note that the layout structure in the comb-shaped regions is designed giving much consideration to the positional relation between the chart component CG0 and the chart component CG1 (i.e., the positional relation between the charts in the same color printed by the adjacent head units C1) as compared with the positional relation between the chart component KG0 printed by the head unit K0 and the chart component CG0 printed by the head unit C0. Accordingly, while in the comb-shaped region, the marks are not recorded by the head unit K0, and instead the marks are recorded by the head unit C0 with high recording density. Furthermore, when further improving precision of the measurement is needed, an arrangement may be made wherein a chart component is formed of only the marks forming the comb-shaped chart component in order to analyze the relative positional relation therebetween based upon the obtained geometric properties.

Figure 43:
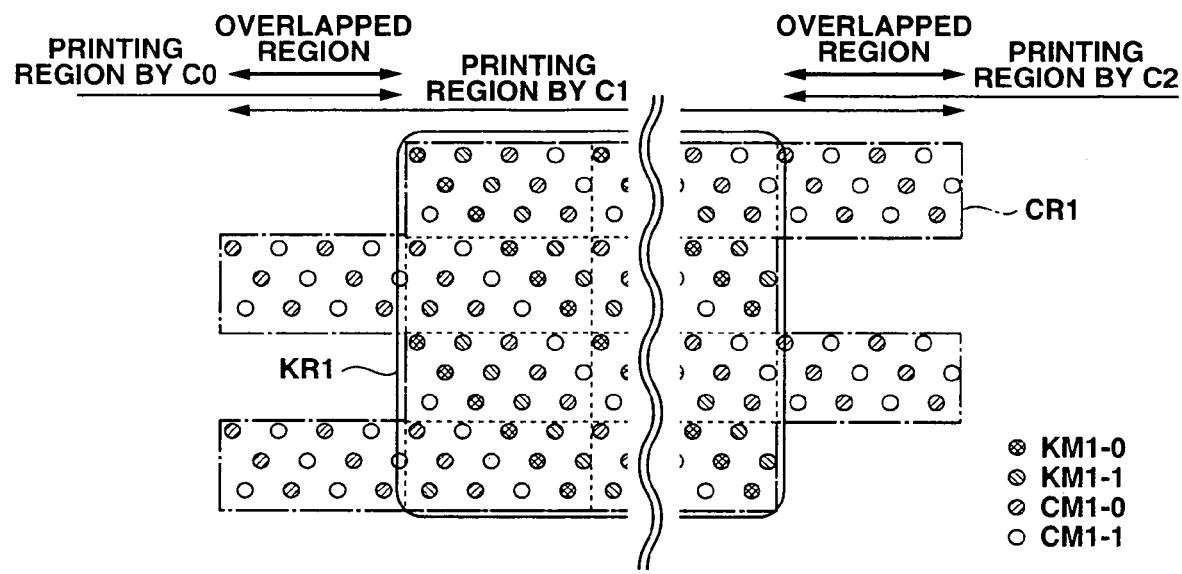
FIG. 43 is a diagram which shows a model of the chart components recorded by the head units K1 and C1 according to the fifth embodiment.

FIG. 43 is a diagram which shows a model of the chart component printed by the head units K1 and C1.

In the same way as described above, the marks KM1-0, KM1-1, CM1-0, and CM1-1, are printed by the heads K1-0, K1-1, C1-0, and C1-1, forming the head units K1 and C1.

Furthermore, the layout structure is designed such that the marks are printed by the adjacent head units without interference therebetween in overlapped regions where printing regions of the adjacent head units may be overlapped one another. Note that the schematic structure of the chart component printed by the head unit K1 is denoted by reference character "KR1", and the schematic structure of the chart component printed by the head unit C1 is denoted by reference character "CR1", in the same way as shown in FIG. 42.

Figure 44:
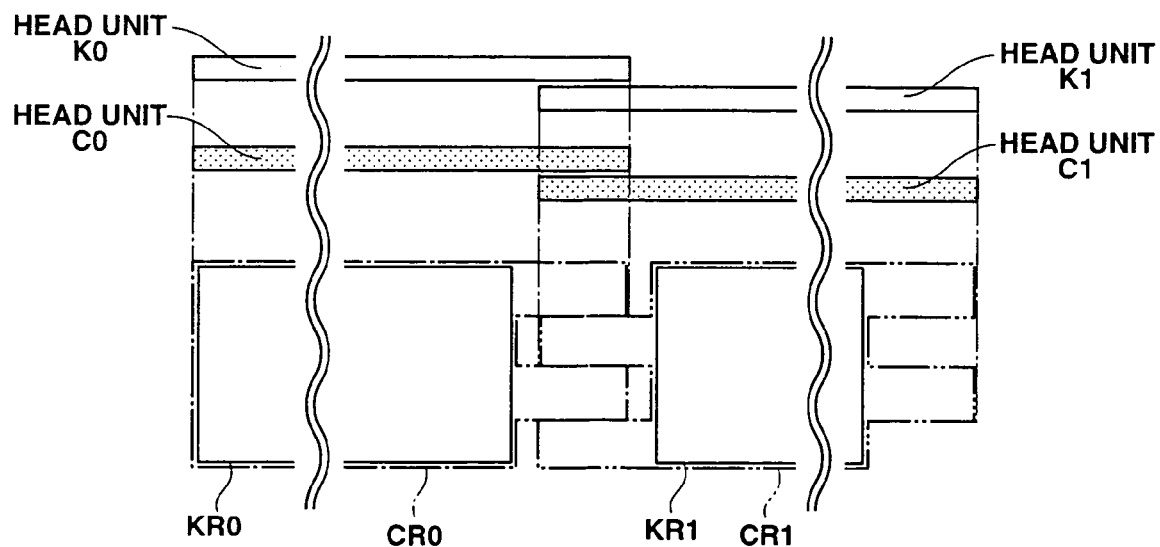
FIG. 44 is a diagram which shows a test chart obtained by printing the chart data based upon the geometric property format as shown in FIG. 43.

FIG. 44 is a diagram which shows a test chart obtained by printing a chart data formed of based upon the geometric property format shown in FIG. 43. FIG. 44 shows a schematic structure of the test chart for simplification.

As shown in the drawing, the layout structure is designed such that the chart components KR0 and KR1 are arrayed within a rectangular region, and the chart components CR0 and CR1 are formed in the shape of a comb, and the comb-shaped chart components CR0 and CR1 printed by the adjacent head units are arrayed so as to mesh with each other.

The chart thus obtained allows the operator to calculate not only the geometric properties of each chart component but also the relative positional relation between different colors of the head unit K0 and the head unit C0 based upon the geometric properties in the chart component CR0 and the geometric properties in the chart component CR0, and the relative positional relation between the adjacent heads of the head unit C0 and the head unit C1 based upon the geometric properties in the chart component CR0 and the geometric properties of the chart component CR1.

Figure 45:
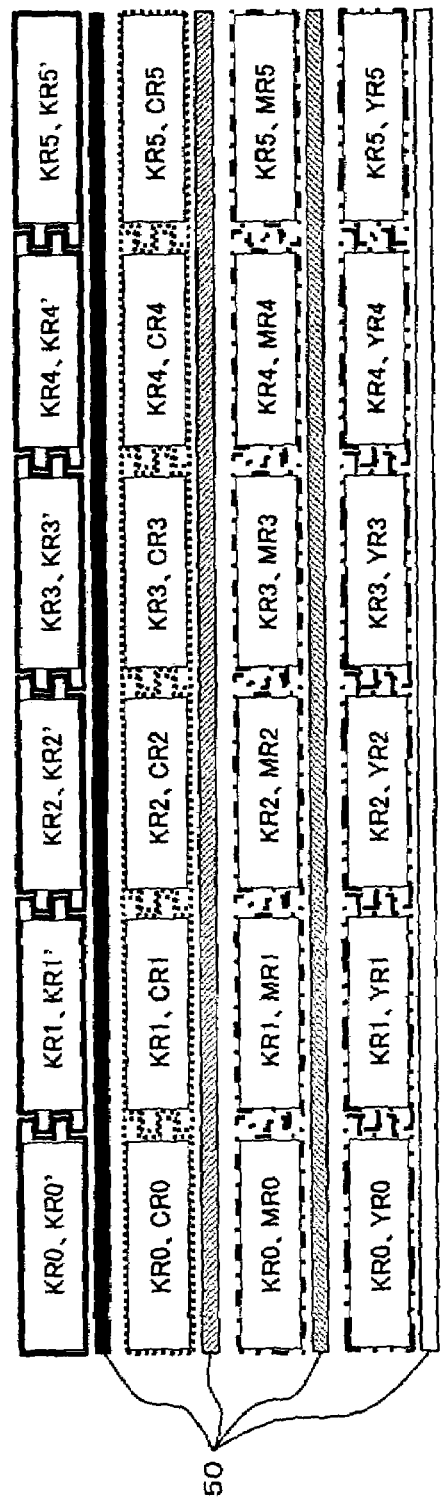
FIG. 45 is a diagram which shows an overall structure of the test chart wherein the chart components recorded by the head units adjacent one to another in the nozzle-array direction are arrayed so as to mesh with each other according to the fifth embodiment.

Note that the chart structure is formed for other head units in the same way. FIG. 45 is a diagram which shows an overall structure of the test chart wherein the chart components printed by the head units adjacent one to another in the nozzle-array direction are arrayed so as to mesh one another.

Here, KRn' (n denotes 0 through 5) denotes the schematic structure of the chart component having the same structure of the chart component CRn described above, except for the color of the marks of black instead of cyan. In the same way, the chart component MRn has the same layout structure except for the color of the marks of magenta instead of cyan, and the chart component YRn has the same layout structure except for the color of the marks of yellow instead of cyan. Note in the example shown in FIG. 45, the bars 50 are printed for detecting substandard printing.

The present arrangement employs the black (K) heads as reference heads. Corresponding to it, the layout structure is designed such that each region of the chart component overlaps with the region in black (K) every color for precise measurement of the positional relation between these heads.

Such a layout structure allows chart layout design with small area of the chart components as compared with the layout structure wherein the marks printed in all kinds of colors are arrayed within a substantially common region without interference therebetween, thereby suppressing adverse effects due to low-frequency deviation.

Note that while description has been made regarding an arrangement wherein the black (K) head is employed as a reference head, the reference head according to the present embodiment is not restricted to the black (K) head. The head having important properties is preferably selected as the reference head. For example, the head for printing an image in one of the colors in combination, in which images need to be printed with high relative-positional relation, may be selected as the reference head.

As an example, description will be made regarding a case wherein the relative relation is important between the magenta (M) head and the cyan (C) head. In this case, analysis based upon the chart shown in FIG. 45 allows the operator to obtain the relation between the magenta (M) head and the black (K) head, and the relation between the cyan (C) head and the black (K) head. Accordingly, the relation between the magenta (M) head and the cyan (C) head is indirectly calculated based upon the relations. On the other hand, analysis based upon the chart including a combination of the marks printed in magenta (M) and the marks printed in cyan (C), i.e., analysis wherein the magenta (M) head is selected as the reference head, allows the operator to directly calculate: the relative relation between the magenta (M) head and the black (K) head; the relative relation between the magenta (M) head and the cyan (C) head; and the relative relation between the magenta (M) head and the yellow (Y) head. That is to say, the relative relation between the magenta (M) head and the cyan (C) head is directly measured, thereby improving measurement precision as compared in indirect measurement.

Furthermore, an arrangement may be made wherein the color of the reference head is selected giving consideration to the contrast between the color and the recording medium, or giving consideration to the sensitivity of the sensor of the image pickup apparatus. Furthermore, the present invention is not restricted to these arrangements, rather, the head for a suitable color is employed as the reference head corresponding to the object and situation.

As described above, with the present embodiment, the head having important properties is set as the reference head, and the geometric properties of other heads are measured as relative values with the reference head as a reference, thereby allowing the operator to easily perform high-precision measurement of the geometric properties.

Note that there are many chart components printed by the reference heads over the entire chart, and accordingly, the geometric properties thereof are analyzed based upon all the chart components thereof. In this case, the vectors are preferably defined with the transporting direction as the reference direction thereof and with the dot pitch as the reference size thereof. This allows the operator to detect the geometric properties in a sure manner.

Then, each head is adjusted so as to exhibit desired properties based upon the geometric properties of the head thus obtained.

Figure 46:
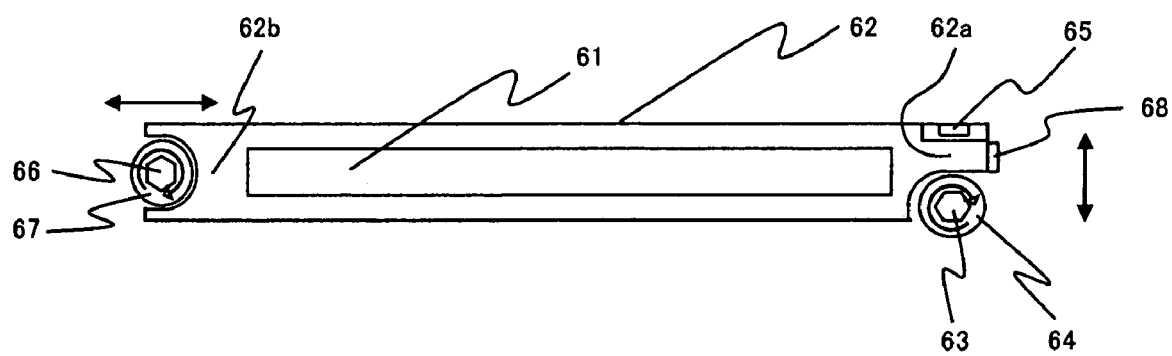
FIG. 46 is a plan view which shows an example of a geometric adjusting mechanism for adjusting the head according to the fifth embodiment.
Figure 47:
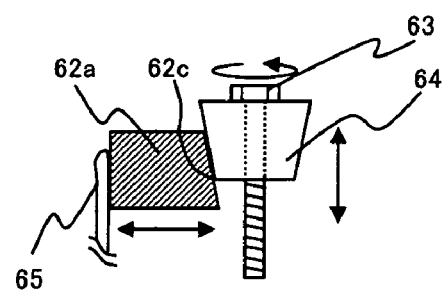
FIG. 47 is a side view which shows a partial cross-sectional configuration of the head geometric adjusting mechanism according to the fifth embodiment.

Let us say that the arrangement detects the positional deviation of a certain head of 150 μm to the left, and the skewing thereof of 0.03° in the clockwise direction, for example. In this case, the head should be displaced to the right by 150 μm, and should be turned in the counterclockwise direction by 0.03°. FIG. 46 and FIG. 47 show examples of adjusting mechanisms for adjusting such deviation. FIG. 46 is a plan view which shows an example of a head geometric adjusting mechanism, and FIG. 47 is a side view which shows a partial cross-sectional configuration of the head geometric adjusting mechanism.

As shown in FIG. 46, a head 61 is fixed to a head base 62, and positioning of the head base 62 is made on the printer main unit through a geometric adjusting mechanism. The geometric adjusting mechanism comprises: a horizontal-position adjusting mechanism for adjusting the head position in the horizontal direction; and a skew-angle adjusting mechanism for adjusting the skew angle.

Now, description will be made regarding a configuration of the skew-angle adjusting mechanism with reference to FIG. 47.

A screwing member 64 is formed with a tapered circumference, and is screwed to a skew-angle adjusting screw 63. Furthermore, a slant face 62c is formed on one end 62a of the head base 62, and is pressed into contact with the screwing member 64 with a plate spring 65. Thus, the slant face of the one end 62a of the head base 62 is pressed into contact with the tapered face of the screwing member 64.

At the time of adjustment, upon turning the skew-angle adjusting screw 63, the screwing member 64 is moved in the vertical direction. This actions move the one end 62a of the head base 62 along the tapered face of the screwing member 64 in the horizontal direction in FIG. 47. In this case, the plate spring 65 provided as described above maintains the state wherein the one end 62a of the head base 62 is pressed into contact with the taper face of the screwing member 64 in any situations wherein the operator drives or looses the skew-angle adjusting screw 63.

On the other hand, the horizontal-position adjusting mechanism has the same configuration wherein upon turning a horizontal-position adjusting screw 66, a screw member 67 including a tapered face is moved in the vertical direction, and the tapered face is pressed into contact with the slant face formed on the other end 62b of the head base 62, thereby moving the head base 62 in the horizontal direction in FIG. 46. In this case, a plate spring 68 is provided on the end 62a of the head base 62 so as to press the slant face of the end 62b of the head base 62 toward the screw member 67, thereby maintaining the state wherein the slant face of the head base 62 is pressed into contact with the tapered face of the screw member 67.

As described above, upon turning the horizontal-position adjusting screw 66, the head 61 fixed on the head base 62 is moved in the horizontal direction. On the other hand, upon turning the skew-angle adjusting screw 63, the head 61 fixed on the head base 62 is turned around the horizontal-position adjusting screw 66 serving as the turning axis. These actions allow the operator to adjust the layout of the head 61. With the present embodiment, each head (each head unit, or each large head unit) includes such a geometric adjusting mechanism, thereby allowing the operator to perform geometric adjustment for all the heads.

On the other hand, positional deviation in the transporting direction can be handled by adjusting printing timing. That is to say, an arrangement may be made wherein the detected deviation in the transporting direction is converted into time deviation based upon the corresponding transporting speed, and ink discharge timing is corrected based upon the time deviation.

In addition to the above adjustment, there is the need to perform ink density adjustment for each head for improving printing quality. The ink density of each head is adjusted as follows. That is to say, a solid bar is printed by each head, the density of the printed bar is measured, and the voltage applied to the head is adjusted such that the measured density becomes a predetermined value.

Figure 48:
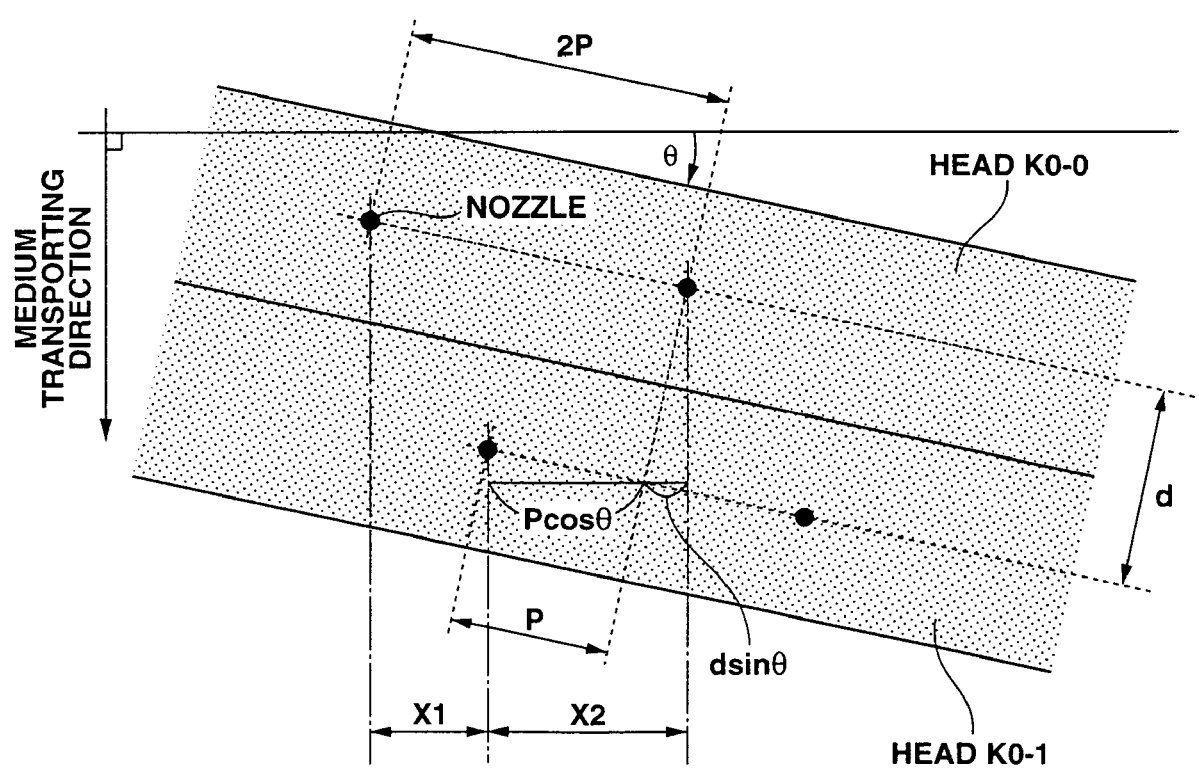
FIG. 48 is a diagram for describing the dot pitch in a case wherein the head unit has a certain skew angle, which has a configuration wherein two heads are fixed one to another with displacement of the half phase of the array pitch of the nozzles according to the fifth embodiment.

Here, let us say a case wherein skewing of the head unit occurs as shown in FIG. 48, which has a configuration wherein two heads are fixed one to another with displacement of half the dot pitch so as to achieve two times resolution as described in description of the fifth embodiment. In this case, the pitch of the printed dots changes corresponding to the skew angle.

FIG. 48 is a diagram for describing the dot pitch in a case wherein the head unit has a certain skew angle, the head unit having a configuration wherein two heads are fixed one to another with displacement of the half phase (P) of the array pitch (2P) of the nozzles.

With the skew angle in the clockwise direction as $\theta$, the nozzle interval of the head unit as 2P, and with the nozzle-array interval between two heads as d, the pitch X1 and the pitch X2 of the dots in the direction orthogonal to the recording-medium-transporting direction are represented by the following Expression 30.

$$X1 = P\cos\theta - d\sin\theta$$

$$X2 = P\cos\theta + d\sin\theta \qquad \text{[Expression 30]}$$

Figure 49:
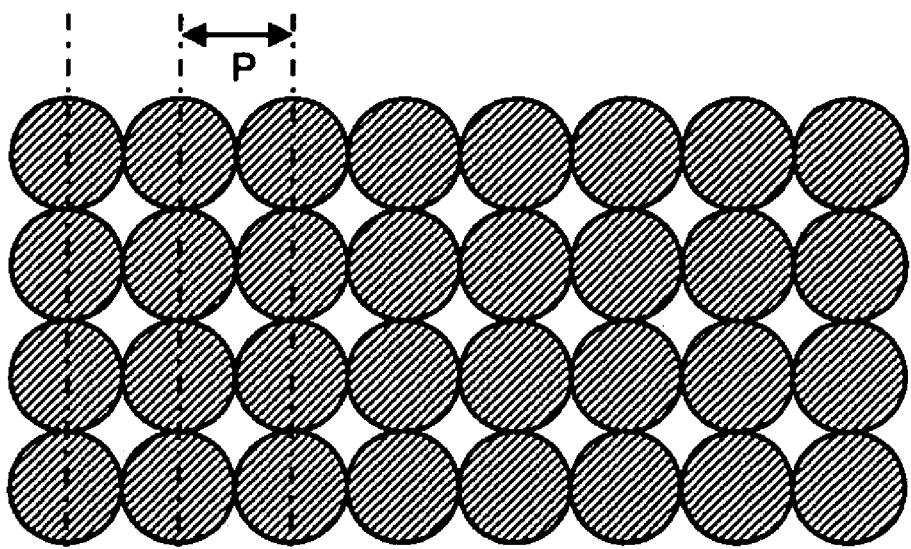
FIG. 49 is a diagram which shows comparison between cases wherein printing is made by the head unit having a configuration wherein two heads are fixed one to another with phase displacement of half the nozzle-array pitch with and without the skew angle according to the fifth embodiment.
Figure 49:
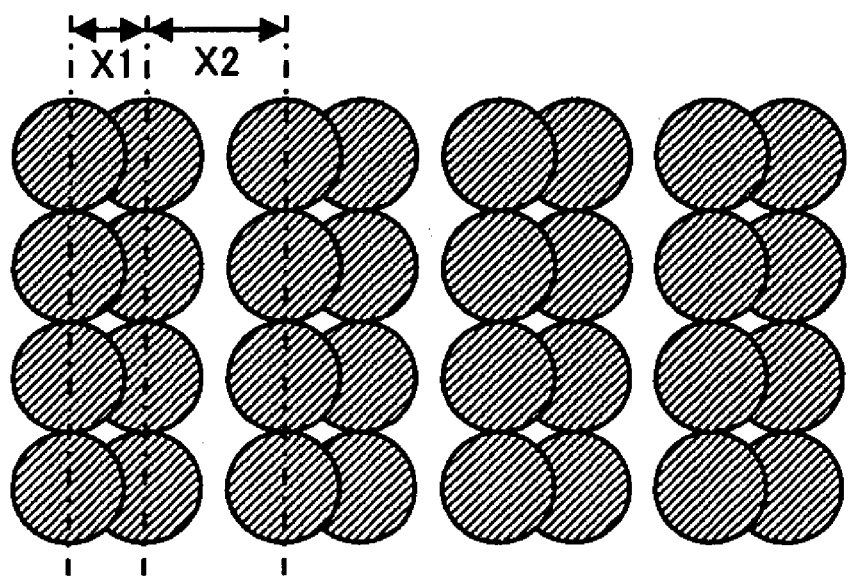

Accordingly, in an ideal case wherein the head unit is mounted without skewing, the dots are printed at a uniform dot pitch P as shown in FIG. 49(A). However, the skewing of the head unit causes irregularities in the dot layout as shown in FIG. 49(B). FIG. 49 is a diagram which shows comparison between cases wherein printing is made by the head unit having a configuration wherein two heads are fixed one to another with phase displacement of half the nozzle-array pitch with and cases without the skew angle. In a case wherein printing of a solid pattern is made in such a state as shown in FIG. 49(B), low density is detected in the solid pattern. Accordingly, the ink density of the head is preferably adjusted after adjustment of the skew angle.

On the other hand, in some cases, adjustment of the voltage applied to the head for adjusting the ink density causes change in printing timing for printing an image on a recording medium. Accordingly, the printing timing is preferably adjusted after adjustment of ink density. Note that in some cases, timing adjustment needs to be performed before printing a bar for ink-density adjustment. In this case, it is needless to say that an arrangement may be made wherein timing adjustment is performed both before and after the ink-density adjustment.

With an arrangement according to the fifth embodiment as described above, the heads having important geometric properties are set as the reference heads, and the geometric properties of each head are measured using the chart components printed by the reference heads and the chart components printed by the other heads based upon the relative relation between the reference heads and the other heads.

Furthermore, the geometric properties of the reference heads can be measured with high precision based upon the chart components printed over the entire chart region.

In this case, analysis using the reference vector with the size of the dot pitch and with the direction being the transporting direction allows the operator to perform measurement in a sure manner. Then, the operator adjusts the geometric properties of each head so as to exhibit predetermined properties based upon the analyzed geometric properties of the corresponding head, thereby improving printing quality. Furthermore, the adjustment procedure is preferably performed as follows. That is to say, first, the skew angle is adjusted, following which the ink density is adjusted, and finally, timing adjustment is preferably made. Adjustment performed according to such a procedure allows the operator to perform efficient adjustment.

Note that the present invention is not restricted to the embodiments described above, rather, it is needless to say that various modifications and applications can be made without departing from the spirit and scope of the invention.

INDUSTRIAL APPLICABILITY

As described above, a test chart, a geometric property analyzing system, a geometric property analyzing method, a printer, and an ink-jet printer, according to the present invention, allow the operator to easily analyze the geometric properties with high precision regarding at least one of a recording device, a recording medium, and an image pickup apparatus.

The invention claimed is:

1. A geometric property analyzing system for analyzing geometric properties regarding at least one of a recording device, a recording medium, and an image pickup apparatus, the system comprising:
   format storage means for storing a geometric property format;
   recording means for recording a test chart including a plurality of marks on a recording face of a recording medium based on the geometric property format;
   image pickup means for optically reading the test chart including the plurality of marks recorded on the recording face of the recording medium, and creating a chart image; and
   analyzing means for determining a reference point and two mutually independent reference vectors for determining the predetermined positions of the plurality of marks in the chart image such that the sum of squares of the difference becomes minimum between: respective positions of the plurality of marks in the chart image created by the image pickup means, and respective positions of the plurality of marks based upon the geometric property format stored in the format storage means.

2. The geometric property analyzing system according to claim 1, wherein the analyzing means divide the test chart into a plurality of chart components so as to perform analysis for each chart component.

3. The geometric property analyzing system according to claim 2, wherein the number of marks included in the chart component is determined based upon: the precision of detecting the position of the mark; and the required precision of the geometric properties which are to be analyzed.

4. The geometric property analyzing system according to claim 2, wherein the chart component is designed based upon:
   the geometric properties which are to be analyzed; and
   the required precision of the geometric properties.

5. The geometric property analyzing system according to claim 1, wherein the analyzing means divide the test chart into a plurality of chart components so as to perform relative comparison between the geometric properties of each chart component and the geometric properties of the other chart component serving as a reference, thereby enabling analysis of the geometric properties of each chart component.

6. The geometric property analyzing system according to claim 1, wherein the system comprises a plurality of said recording means, wherein the analyzing means divides the plurality of marks into chart components corresponding to the recording means for recording the marks, and determines at least one of the aforementioned reference point and unit vector for each chart component thus divided.

7. The geometric property analyzing system according to claim 6, wherein each of the plurality of recording means records the marks in different forms, and wherein the analyzing means group the marks based upon the form thereof, and forms a chart component for each group.

8. The geometric property analyzing system according to claim 1, wherein the geometric property format is reconstructed based upon the analysis results analyzed by the analyzing means so as to perform recording on the recording face of the recording medium by the recording means.

9. The geometric property analyzing system according to claim 1, wherein the geometric properties of the recording means are adjusted based upon the analysis results analyzed by the analyzing means.

10. The geometric property analyzing system according to claim 9, wherein adjustment of the geometric properties of the recording means are made in order of:
   skew adjustment;
   density adjustment; and
   timing adjustment.

11. The geometric property analyzing system according to claim 1, further comprising transporting means for transporting the recording medium relative to the recording means, wherein the image pickup means is disposed on the downstream side of the recording means along the transporting direction determined by the transporting means, and is formed of a line sensor for optically reading out the test chart formed of the plurality of marks recorded by the recording means.

12. The geometric property analyzing system according to claim 1, wherein the recording means comprises an ink-jet head for recording the plurality of marks on the recording medium by discharging ink.

13. The geometric property analyzing system according to claim 1, wherein the image pickup means is formed with higher image pickup resolution than the recording resolution of the recording means.

14. The geometric property analyzing system according to claim 1, wherein the analyzing means is formed as a separate unit from the recording means and the image pickup means.

15. The geometric property analyzing system according to claim 1, wherein the format storage means is integrally held by the recording means.

16. The geometric property analyzing system according to claim 1, further comprising a transporting belt for relatively transporting the recording medium as to the image pickup means.

17. The geometric property analyzing system according to claim 16, wherein a plurality of openings are formed in the transporting belt, and wherein the system further comprises suctioning means for fixing the recording medium on the belt face by air suctioning through the plurality of openings.

18. The geometric property analyzing system according to claim 1, wherein the geometric property format is designed giving consideration to the image size handled by the geometric property analyzing system.

19. The geometric property analyzing system according to claim 1, wherein the image pickup means analyzes the geometric properties based upon the geometric property format using a reference chart serving as a reference test chart in which the plurality of marks have been recorded with higher recording precision than the required analysis precision.

20. The geometric property analyzing system according to claim 19, wherein the geometric properties of the image pickup means are analyzed before analysis of the geometric properties of the recording means, and wherein the reference chart is recorded with higher recording precision than the recording precision of the recording means.

21. A printer employing the geometric property analyzing system according to claim 1.

22. A ink-jet printer employing the geometric property analyzing system according to claim 12.

23. A geometric property analyzing method for analyzing the geometric properties regarding at least one of a recording device, a recording medium, and an image pickup apparatus, the method comprising:
   a format storing step for storing a predetermined geometric property format;
   a printing step for printing a test chart including a plurality of marks on a recording face of a recording medium, based on the predetermined geometric property format;
   an image picking-up step for optically reading out the test chart and creating a chart image; and an analyzing step for determining a reference point and two mutually independent reference vectors for determining the predetermined positions of the plurality of marks in the chart image such that the sum of squares of the difference becomes minimum between: respective positions of the plurality of marks in the chart image formed in the image picking-up step and respective positions of the plurality of marks based upon the geometric property format stored in the format storing step.

24. The geometric property analyzing method according to claim 23, wherein the plurality of marks are recorded based upon at least two kinds of the geometric property formats which allow analysis of the geometric properties without unintended interference between the marks.

25. The geometric property analyzing method according to claim 23, wherein in the analyzing step, the test chart is divided into a plurality of chart components, and relative comparison is made between the geometric properties of each chart component and the geometric properties of the chart component serving as a reference, thereby enabling analysis of the geometric properties of each chart component.

26. The geometric property analyzing method according to claim 23, further the printing step is performed using at least one recording means for recording the plurality of marks on the recording face of the recording medium.

27. The geometric property analyzing method according to claim 26, wherein the geometric properties of the recording means are adjusted based upon the analysis results obtained in the analyzing step.

28. The geometric property analyzing method according to claim 27, wherein adjustment of the geometric properties of the recording means is made in order of:
   skew adjustment;
   density adjustment; and
   timing adjustment.

29. A printer having a function for analyzing the geometric properties using the geometric property analyzing method according to claim 23.

30. An ink-jet printer having a function for analyzing the geometric properties using the geometric property analyzing method according to claim 23.

31. A geometric property analyzing system for analyzing geometric properties regarding at least one of a recording device, a recording medium, and an image pickup apparatus, the system comprising:
   a format storing unit for storing a geometric property format that causes a same number of marks between chart components to exist along a predetermined direction for each of a plurality of chart components;
   a printing unit for printing a test chart on a recording face of the recording medium based on the predetermined geometric property format such that unintended deviations of recording positions of a plurality of marks which are to be arrayed with uniformity along a direction orthogonal to the predetermined direction can be canceled out;
   an image picking-up unit for optically reading out the test chart and creating a chart image; and
   an analyzing unit for determining a reference point and two mutually independent reference vectors for determining the predetermined positions of the plurality of marks in the chart image such that the sum of squares of the difference becomes minimum between respective positions of the plurality of marks in the chart image formed in the image picking-up unit and respective positions of the plurality of marks based on the geometric format stored in the format storing unit.

32. A geometric property analyzing system for analyzing geometric properties regarding at least one of a recording device, a recording medium, and an image pickup apparatus, the system comprising:
   format storage means for storing a geometric property format;
   recording means for recording a test chart including a plurality of marks on a recording face of a recording medium based on the geometric property format;
   image pickup means for optically reading the test chart including the plurality of marks recorded on the recording face of the recording medium, and creating a chart image; and
   analyzing means for calculating respective center positions of the plurality of marks in the chart image created by the image pickup means, and for determining at least one of a position vector of a reference point and a reference vector for determining the predetermined positions of the plurality of marks in the chart image such that the sum of squares of the difference becomes minimum between: respective center positions of the plurality of marks in the chart image created by the image pickup means, and respective positions of the plurality of marks based upon the geometric property format stored in the format storage means.

33. A geometric property analyzing method for analyzing geometric properties regarding at least one of a recording device, a recording medium, and an image pickup apparatus, the method comprising:
   a format storing step for storing a predetermined geometric property format;
   a printing step for printing a test chart including a plurality of marks on a recording face of a recording medium, based on the predetermined geometric property format;
   an image picking-up step for optically reading out the test chart and creating a chart image; and
   an analyzing step calculating respective center positions of the plurality of marks in the chart image, and for determining at least one of a position vector of a reference point and a reference vector for determining the predetermined positions of the plurality of marks in the chart image such that the sum of squares of the difference becomes minimum between: the respective center positions of the plurality of marks in the chart image formed in the image picking-up step and respective positions of the plurality of marks based upon the geometric property format stored in the format storing step.

34. A geometric property analyzing system for analyzing geometric properties regarding at least one of a recording device, a recording medium, and an image pickup apparatus, the system comprising:
   a format storing unit for storing a geometric property format that causes a same number of marks between chart components to exist along a predetermined direction for each of a plurality of chart components;
   a printing unit for printing a test chart on a recording face of the recording medium based on the predetermined geometric property format such that unintended deviations of recording positions of a plurality of marks which are to be arrayed with uniformity along a direction orthogonal to the predetermined direction can be canceled out;
   an image picking-up unit for optically reading out the test chart and creating a chart image; and
   an analyzing unit for calculating respective center positions of the plurality of marks in the chart image created by the image pickup means, and for determining at least one of a position vector of a reference point and a reference vector for determining the predetermined positions of the plurality of marks in the chart image such that the sum of squares of the difference becomes minimum between the respective center positions of the plurality of marks in the chart image formed in the image picking-up unit and respective positions of the plurality of marks based on the geometric format stored in the format storing unit.

* * * * *